US012574939B2

(12) United States Patent
Oh et al.

(10) Patent No.: US 12,574,939 B2
(45) Date of Patent: Mar. 10, 2026

(54) CELL ACTIVATION METHOD AND DEVICE IN WIRELESS COMMUNICATION SYSTEM

(71) Applicant: Samsung Electronics Co., Ltd., Suwon-si (KR)

(72) Inventors: Jinyoung Oh, Suwon-si (KR); Taehyoung Kim, Suwon-si (KR); Jinhyun Park, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 18/033,265

(22) PCT Filed: Oct. 14, 2021

(86) PCT No.: PCT/KR2021/014250
§ 371 (c)(1),
(2) Date: Apr. 21, 2023

(87) PCT Pub. No.: WO2022/086056
PCT Pub. Date: Apr. 28, 2022

(65) Prior Publication Data
US 2024/0032057 A1 Jan. 25, 2024

(30) Foreign Application Priority Data
Oct. 22, 2020 (KR) ........................ 10-2020-0137523

(51) Int. Cl.
*H04W 72/231* (2023.01)
*H04B 7/06* (2006.01)
*H04L 5/00* (2006.01)

(52) U.S. Cl.
CPC ........ *H04W 72/231* (2023.01); *H04B 7/0626* (2013.01); *H04L 5/0051* (2013.01)

(58) Field of Classification Search
CPC ..... H04L 5/0051; H04L 5/001; H04L 5/0048; H04L 5/0057; H04L 5/00; H04L 5/0053;
(Continued)

(56) References Cited

U.S. PATENT DOCUMENTS

2021/0344405 A1* 11/2021 Yuan ..................... H04W 76/19
2021/0392627 A1 12/2021 Kim et al.
(Continued)

FOREIGN PATENT DOCUMENTS

EP          3817252 B1 * 2/2025 .......... H04L 5/0055
KR    10-2017-0128331 A    11/2017
KR    10-2020-0098087 A    8/2020

OTHER PUBLICATIONS

Zte, 'Discussion on Supporting Efficient Activation/De-activation Mechanism for SCells in NR CA', R1-2005442, 3GPP TSG RAN WG1 Meeting #102-e, e-Meeting, Aug. 2020.
(Continued)

*Primary Examiner* — Rownak Islam
(74) *Attorney, Agent, or Firm* — Jefferson IP Law, LLP

(57) ABSTRACT

The present disclosure relates to a communication technique for merging IoT technology with a 5G communication system for supporting a data transmission rate higher than that of a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of 5G communication technology and IoT-related technology. Embodiments of the present disclosure relate to a wireless communication system and, more particularly, to a cell activation method and device in a wireless communication system.

12 Claims, 19 Drawing Sheets

(58) Field of Classification Search

CPC .... H04L 5/0098; H04W 72/23; H04W 72/21; H04W 72/231; H04B 7/0626

USPC ........................................................ 370/329

See application file for complete search history.

(56) References Cited

U.S. PATENT DOCUMENTS

| | | | | |
|---|---|---|---|---|
| 2022/0046735 A1* | 2/2022 | Wang | ..................... | H04L 5/0053 |
| 2022/0086676 A1* | 3/2022 | Al | .......................... | H04L 1/0026 |
| 2022/0182951 A1* | 6/2022 | Zhou | ..................... | H04W 52/52 |

OTHER PUBLICATIONS

Catt, 'Discussion on efficient activation and de-activation mechanism for SCell in NR C', R1-2005698, 3GPP TSG RAN WG1 Meeting #102-e, e-Meeting, Aug. 2020.

Samsung, 'Efficient activation/deactivation mechanism for SCells', R1-2006178, 3GPP TSG RAN WG1 #102-e, e-Meeting, Aug. 2020.

Moderator (Huawei), 'Summary#1 of efficient SCell activation/de-activation mechanism of NR CA', R1-2007422, 3GPP TSG RAN WG1 #102-e, E-Meeting, Aug. 2020.

3GPP TS 38.321 V16.2.0 (Sep. 2020) 3rd Generation Partnership Project; Technical Specification Group Radio Access Network; NR; Medium Access Control (MAC) protocol specification (Release 16), Sep. 2020.

3GPP TS 38.133 V16.5.0 (Sep. 2020) 3rd Generation Partnership Project; Technical Specification Group Radio Access Network; NR; Requirements for support of radio resource management (Release 16), Sep. 2020.

3GPP TS 38.214 V16.3.0 (Sep. 2020) 3rd Generation Partnership Project; Technical Specification Group Radio Access Network; NR; Physical layer procedures for data (Release 16), Sep. 2020.

APPLE; Rapportuer editorial CR in 38.133; 3GPP TSG-RAN4 Meeting #95e; R4-2009271; revision of R4-2006218 and R4-2008661; Online; May 25-Jun. 5, 2020; Jun. 10, 2020.

Huawei et al.; Discussion on remaining issues in direct SCell activation; 3GPP TSG-RAN WG4 Meeting #96-e; R4-2011149; Electronic Meeting; Aug. 17-28, 2020; Aug. 7, 2020.

Korean Office Action with English translation dated Dec. 15, 2025; Korean Appln. No. 10-2020-0137523.

* cited by examiner

START

Receive PDCCH set with P-RNTI at set paging occasion ~401

Receive PDSCH including paging message including identifier of UE based on PDCCH ~402

END

FIG. 10

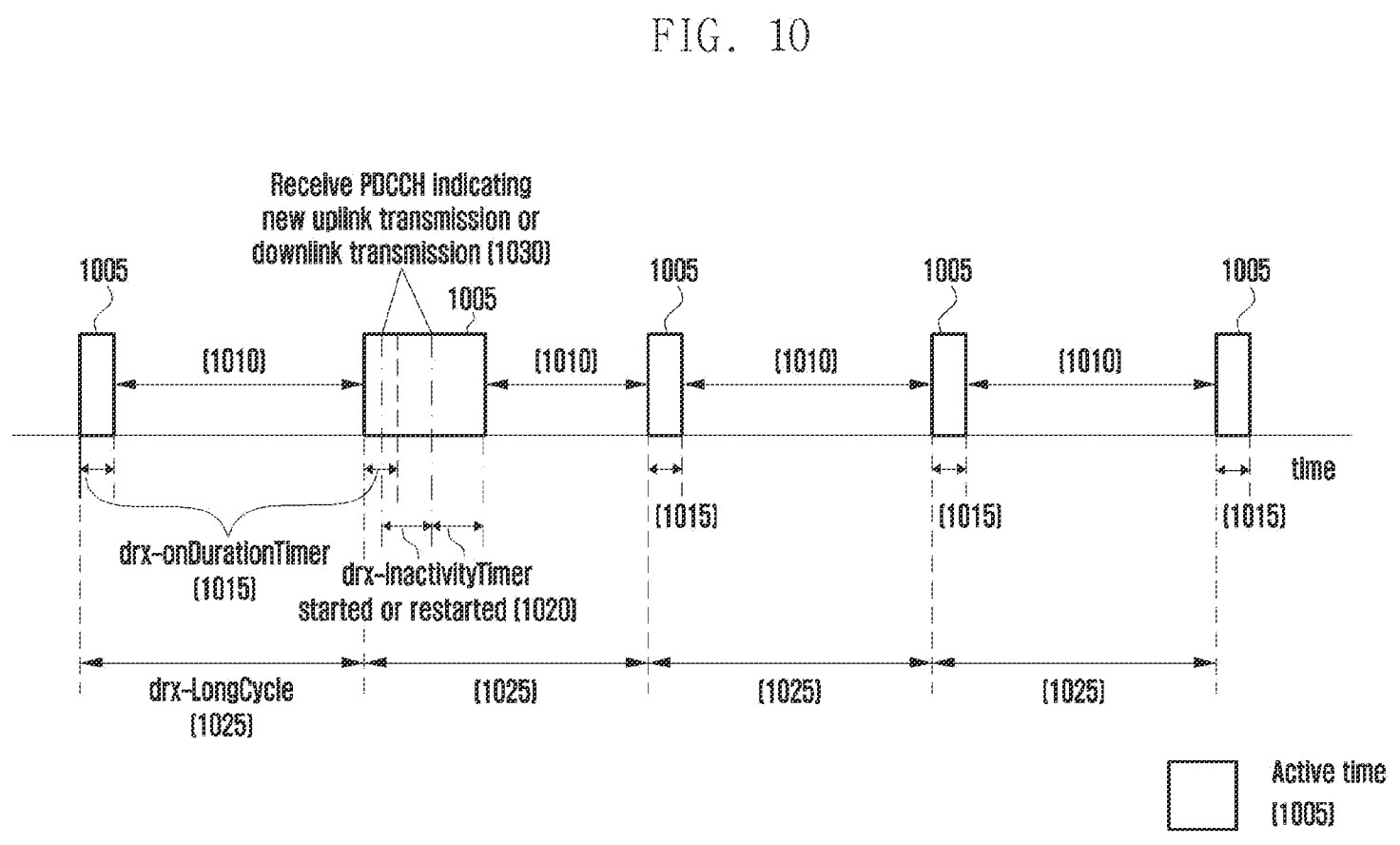

Receive PDCCH indicating new uplink transmission or downlink transmission [1030]

drx-onDurationTimer [1015]

drx-InactivityTimer started or restarted [1020]

drx-LongCycle [1025]

time

Active time [1005]

1005  [1010]  [1015]  [1025]

TCI state #0
(1300)

TCI state #1
(1305)

TCI state #2
(1310)

CELL ACTIVATION METHOD AND DEVICE IN WIRELESS COMMUNICATION SYSTEM

TECHNICAL FIELD

The disclosure relates generally to a wireless communication system, and more particularly, to a method and device for activating a cell in a wireless communication system.

BACKGROUND ART

In order to satisfy increases in demand for wireless data traffic now that a 4th generation (4G) communication system is commercially available, efforts are being made to develop an enhanced 5th generation (5G) communication system or a pre-5G communication system. Therefore, a 5G communication system or a pre-5G communication system is referred to as a beyond 4G network communication system or a post long term evolution (LTE) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

The 5G system is considering support for various services compared to the existing 4G system. For example, the most representative services may include an enhanced mobile broad band (eMBB), ultra-reliable and low latency communication (URLLC), massive machine type communication (mMTC), evolved multimedia broadcast/multicast service (eMBMS), and the like. A system providing the URLLC service may be referred to as a URLLC system, and a system providing the eMBB service may be referred to as an eMBB system. Further, terms service and system may be used interchangeably.

The URLLC service is a service newly considered in the 5G system, unlike the existing 4G system and requires ultra-high reliability (e.g., about 10-5 packet error rate) and low latency (e.g., about 0.5 msec) requirements compared to other services. In order to satisfy these strict requirements, the URLLC service may need to apply a shorter transmission time interval (TTI) than the eMBB service, and various operating methods using this are being considered.

Innovation of Internet from a human-centered connection network in which a human generates and consumes information to an Internet of Things (IoT) network that gives and receives and processes information to and from distributed constituent elements such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things.

In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

DISCLOSURE OF INVENTION

Technical Problem

The disclosure provides a device and method for activating a cell in a wireless communication system based on the above discussion.

Technical problems to be achieved in the disclosure are not limited to the above-described technical problems, and other technical problems not mentioned may be clearly understood by those of ordinary skill in the art to which the disclosure belongs from the description below.

Solution to Problem

According to an embodiment of the disclosure to solve the above problems, a method performed by a terminal of a wireless communication system may include receiving, from a base station, a first message including first information for activating a secondary cell (SCell), receiving, from the base station, a second message including downlink control information (DCI) including second information requesting a channel state report for the SCell to be activated, measuring a channel state for the SCell based on the second information, and transmitting, to the base station, the channel state report including a result of the measured channel state.

According to the embodiment, the first message may include a medium access control (MAC) control element (CE) or DCI.

According to the embodiment, the first message and the second message may be received at the same time.

According to the embodiment, the second information may include a resource setting for an aperiodic tracking reference signal (TRS), and the terminal may be configured to measure the channel state of the SCell to be activated based on the aperiodic TRS.

Further, according to an embodiment of the disclosure, a method performed by a base station of a wireless communication system may include transmitting, to a terminal, a first message including first information for activating a secondary cell (SCell), transmitting, to the terminal, a second message including downlink control information (DCI) including second information requesting a channel state report for the SCell to be activated, and receiving, from the terminal, the channel state report including a result of the measured channel state for the SCell based on the second information.

According to the embodiment, the first message may include a medium access control (MAC) control element (CE) or DCI.

According to the embodiment, the first message and the second message may be received at the same time.

According to an embodiment, the second information may include a resource setting for an aperiodic tracking reference signal (TRS), and the channel state of the SCell to be activated may be measured based on the aperiodic TRS.

Further, according to an embodiment of the disclosure, a terminal of a wireless communication system may include a transceiver, and a controller configured to receive a first message including first information for activating a secondary cell (SCell) from a base station through the transceiver, to receive a second message including downlink control information (DCI) including second information requesting a channel state report for the SCell to be activated from the base station through the transceiver, to measure a channel state of the SCell based on the second information, and to transmit the channel state report including a result of the measured channel state to the base station through the transceiver.

Further, according to an embodiment of the disclosure, a base station of a wireless communication system may include a transceiver, and a controller configured to transmit a first message including first information for activating a secondary cell (SCell) to a terminal through the transceiver, to transmit a second message including downlink control information (DCI) including second information requesting a channel state report for the SCell to be activated to the terminal through the transceiver, and to receive the channel state report including a result of the measured channel state for the SCell based on the second information from the terminal through the transceiver.

Advantageous Effects of Invention

A device and method according to various embodiments of the disclosure can provide a device and method for efficiently transmitting and receiving a reference signal in a wireless communication system.

Effects obtainable in the disclosure are not limited to the above-mentioned effects, and other effects not mentioned may be clearly understood by those of ordinary skill in the art to which the disclosure belongs from the description below.

BRIEF DESCRIPTION OF DRAWINGS

FIG. 10 is a diagram illustrating an example of a discontinuous reception (DRX) operation in a wireless communication system according to various embodiments of the disclosure.

MODE FOR THE INVENTION

Hereinafter, embodiments of the disclosure will be described in detail with reference to the accompanying drawings.

Terms used in the disclosure are used only for describing specific embodiments, and may not be intended to limit the scope of other embodiments. The singular expression may include the plural expression unless the context clearly dictates otherwise. Terms used herein, including technical or scientific terms, may have the same meanings as those commonly understood by one of ordinary skill in the art described in the disclosure. Among the terms used in the disclosure, terms defined in a general dictionary may be interpreted with the same meaning as or a meaning similar to that in the context of the related art, and unless explicitly defined in the disclosure, it is not interpreted in an ideal or overly formal sense. In some cases, even terms defined in the disclosure cannot be interpreted to exclude embodiments of the disclosure.

In various embodiments of the disclosure described below, a hardware approach method will be described as an example. However, because various embodiments of the disclosure include technology using both hardware and software, various embodiments of the disclosure do not exclude a software-based approach.

Figure 1:
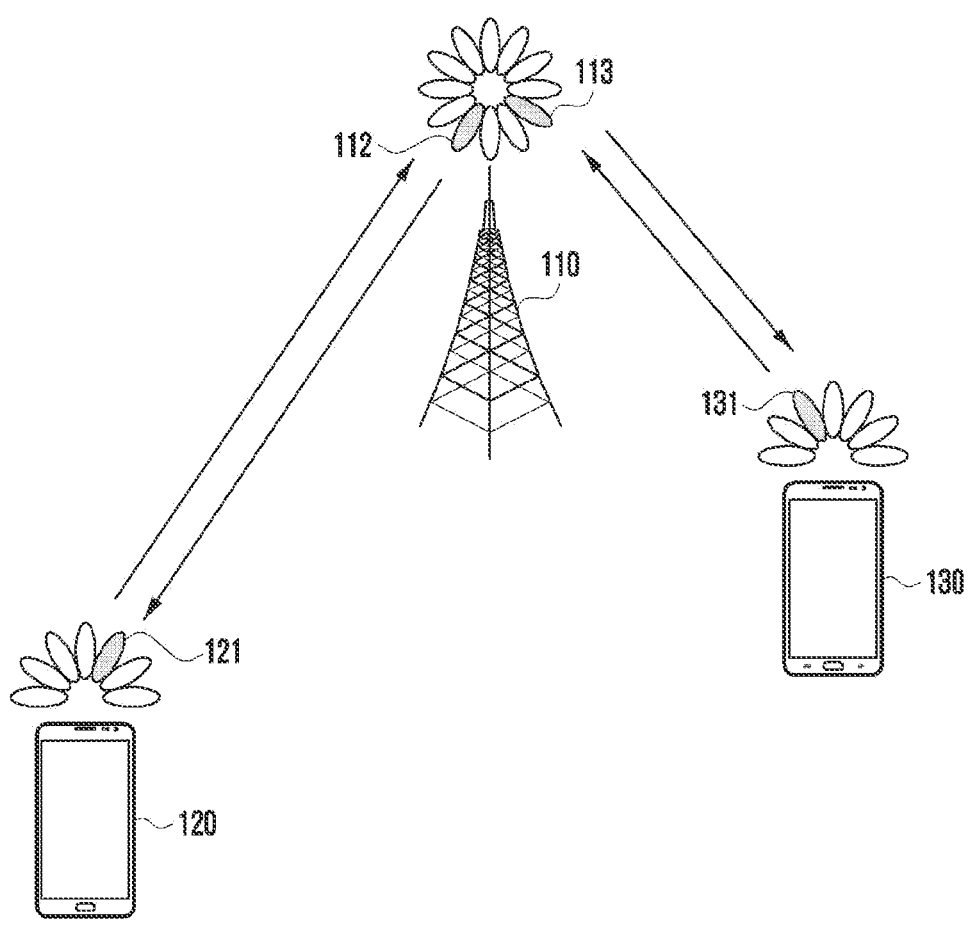
FIG. 1 is a diagram illustrating a wireless communication system according to various embodiments of the disclosure.

FIG. 1 illustrates a wireless communication system according to various embodiments of the disclosure.

With reference to FIG. 1, as some of nodes using a radio channel in a wireless communication system, a base station 110, a terminal 120, and a terminal 130 may be included. Although FIG. 1 illustrates only one base station, the wireless communication system may further include other base stations identical to or similar to the base station 110.

The base station 110 is a network infrastructure that provides wireless access to the terminals 120 and 130. The base station 110 has coverage defined as a certain geographical area based on a distance that may transmit signals. The base station 110 may be referred to as an 'access point (AP)', 'eNodeB (eNB)', '5th generation node (5G node)', 'next generation nodeB (gNB)', 'wireless point', 'transmission/reception point (TRP)', or other terms having equivalent technical meanings in addition to the base station.

Each of the terminal 120 and the terminal 130 is a device used by a user and communicates with the base station 110 through a radio channel. In some cases, at least one of the terminal 120 or the terminal 130 may be operated without user involvement. That is, at least one of the terminal 120 or the terminal 130 is a device that performs machine type communication (MTC) and may not be carried by a user. Each of the terminal 120 and the terminal 130 may be referred to as a 'user equipment (UE)', 'mobile station', 'subscriber station', 'remote terminal', 'wireless terminal', 'user device', or other terms having equivalent technical meanings other than the terminal.

Figure 2:
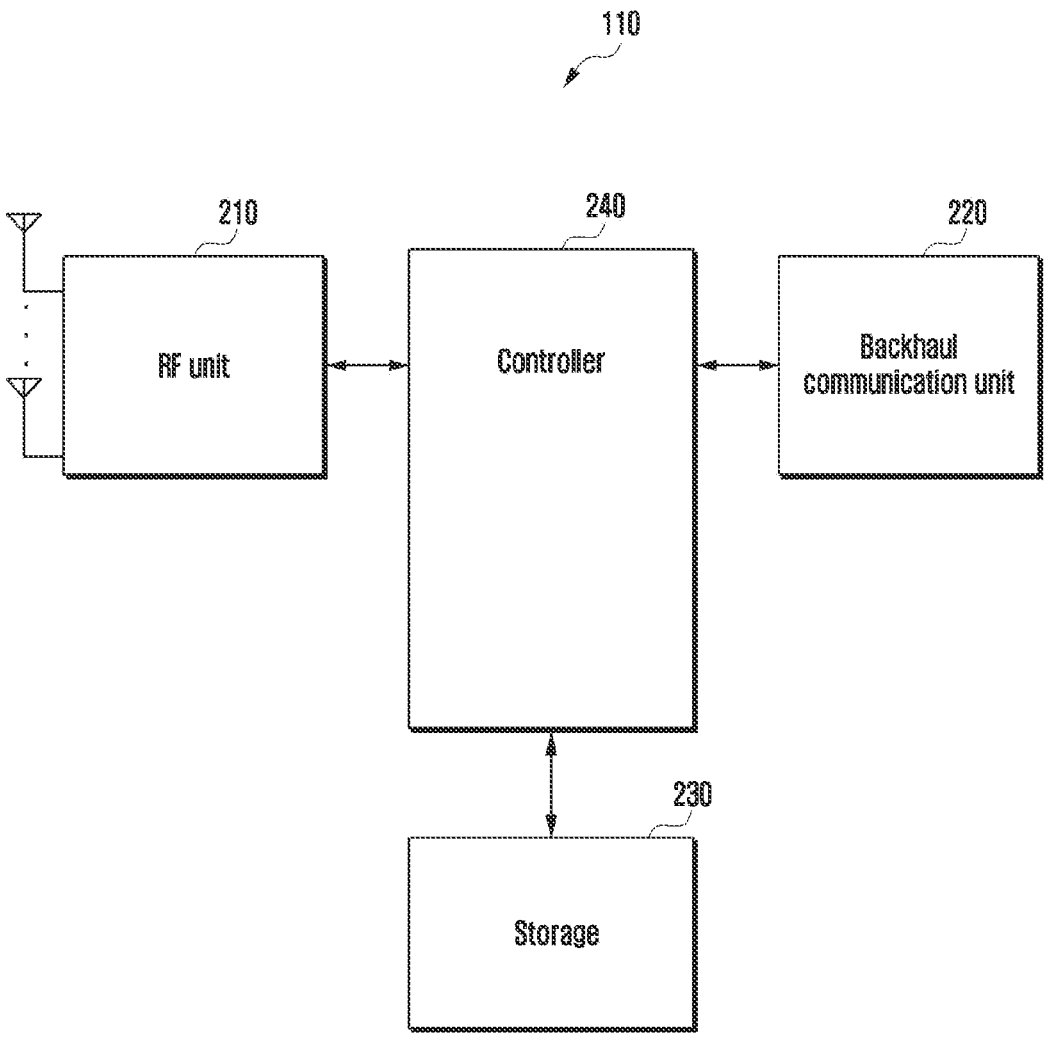
FIG. 2 is a block diagram illustrating an example of a constitution of a base station in a wireless communication system according to various embodiments of the disclosure.

FIG. 2 illustrates a constitution of a base station in a wireless communication system according to various embodiments of the disclosure.

The constitution illustrated in FIG. 2 may be understood as a constitution of the base station 110. Terms such as '~unit' and '~device' used below refer to a unit that processes at least one function or operation, and may be implemented by hardware or software, or a combination of hardware and software.

With reference to FIG. 2, the base station includes a RF unit 210, a backhaul communication unit 220, a storage 230, and a controller 240.

The RF unit 210 performs functions for transmitting and receiving signals through a wireless channel. For example, the RF unit 210 may perform a conversion function between a baseband signal and a bit string according to a physical layer standard of a system. For example, when transmitting data, the RF unit 210 may encode and modulate a transmission bit string to generate complex symbols. Further, when receiving data, the RF unit 210 restores a received bit string through demodulation and decoding of the baseband signal.

Further, the RF unit 210 up-converts the baseband signal into a radio frequency (RF) band signal, transmits the signal through an antenna, and down-converts the RF band signal received through the antenna into a baseband signal. To this end, the RF unit 210 may include a transmission filter, a reception filter, an amplifier, a mixer, an oscillator, a digital to analog converter (DAC), an analog to digital converter (ADC), and the like. Further, the RF unit 210 may include a plurality of transmission and reception paths. Furthermore, the RF unit 210 may include at least one antenna array composed of a plurality of antenna elements.

In terms of hardware, the RF unit 210 may be composed of a digital unit and an analog unit, and the analog unit may be composed of a plurality of sub-units according to operating power, operating frequency, and the like. The digital unit may be implemented with at least one processor (e.g., digital signal processor (DSP)).

The RF unit 210 transmits and receives signals, as described above. Accordingly, all or part of the RF unit 210 may be referred to as a 'transmitter', a 'receiver', or a 'transceiver'. Further, in the following description, transmission and reception performed through a radio channel are used as a meaning including that the above-described processing is performed by the RF unit 210.

The backhaul communication unit 220 provides an interface for communicating with other nodes in the network. That is, the backhaul communication unit 220 converts a bit string transmitted from the base station to another node, for example, another access node, another base station, an upper node, a core network, and the like into a physical signal, and converts a physical signal received from the other node into to a bit string.

The storage 230 stores data such as a basic program for operation of the base station, an application program, and setting information. The storage 230 may include a volatile memory, a non-volatile memory, or a combination of the volatile memory and the non-volatile memory. The storage 230 provides stored data according to the request of the controller 240.

The controller 240 controls overall operations of the base station. For example, the controller 240 may transmit and receive signals through the RF unit 210 or the backhaul communication unit 220. Further, the controller 240 writes and reads data in the storage 230. The controller 240 may perform functions of a protocol stack required by communication standards. According to another implementation example, the protocol stack may be included in the RF unit 210. To this end, the controller 240 may include at least one processor.

Figure 3:
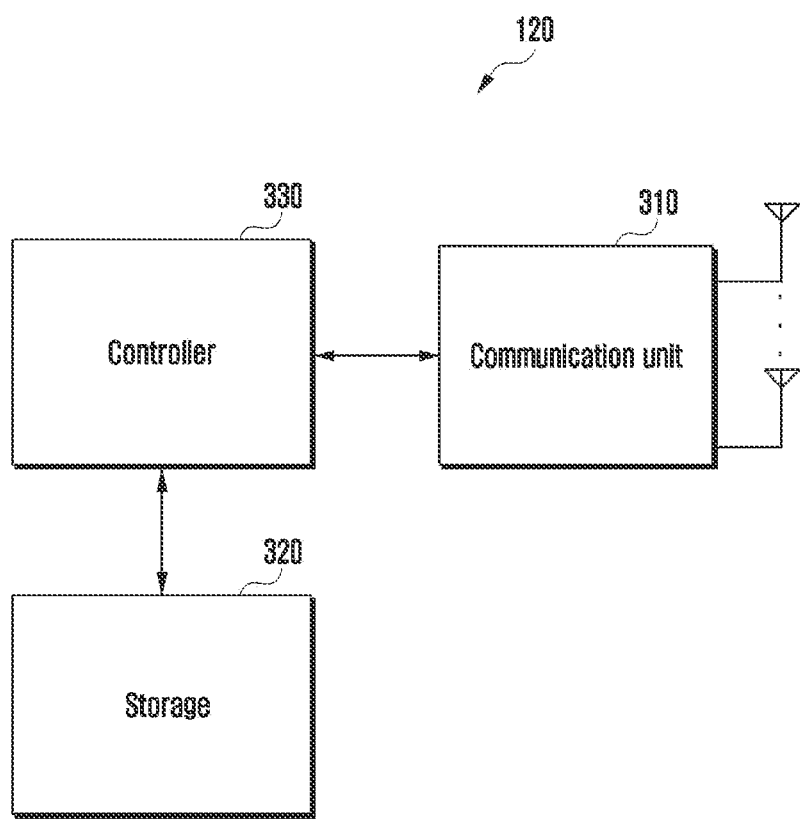
FIG. 3 is a block diagram illustrating an example of a constitution of a terminal in a wireless communication system according to various embodiments of the disclosure.

FIG. 3 illustrates a constitution of a UE in a wireless communication system according to various embodiments of the disclosure.

The constitution illustrated in FIG. 3 may be understood as a constitution of the UE 120. Terms such as '~unit' and '~device' used below refer to a unit that processes at least one function or operation, and may be implemented by hardware or software or a combination of hardware and software.

With reference to FIG. 3, the UE includes a communication unit 310, a storage 320, and a controller 330.

The communication unit 310 performs functions for transmitting and receiving signals through a wireless channel. For example, the communication unit 310 may perform a conversion function between a baseband signal and a bit string according to the physical layer standard of the system. For example, when transmitting data, the communication unit 310 may encode and modulate a transmission bit string to generate complex symbols. Further, when receiving data, the communication unit 310 demodulates and decodes the baseband signal to restore a received bit string. Further, the communication unit 310 up-converts the baseband signal into an RF band signal, transmits the signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Furthermore, the communication unit 310 may include at least one antenna array composed of a plurality of antenna elements. In terms of hardware, the communication unit 310 may include a digital circuit and an analog circuit (e.g., radio frequency integrated circuit (RFIC)). Here, the digital circuit and the analog circuit may be implemented into one package. Further, the communication unit 310 may include a plurality of RF chains. Furthermore, the communication unit 310 may perform beamforming.

The communication unit 310 transmits and receives signals, as described above. Accordingly, all or part of the communication unit 310 may be referred to as a 'transmitter', 'receiver' or 'transceiver'. Further, in the following description, transmission and reception performed through a radio channel are used as a meaning including that the above-described processing is performed by the communication unit 310.

The storage 320 stores data such as basic programs for operation of the UE, application programs, and setting information. The storage 320 may include a volatile memory, a non-volatile memory, or a combination of the volatile memory and the non-volatile memory. The storage 320 provides stored data according to the request of the controller 330.

The controller 330 controls overall operations of the UE. For example, the controller 330 may transmit and receive signals through the communication unit 310. Further, the controller 330 writes and reads data in the storage 320. The controller 330 may perform protocol stack functions required by communication standards. To this end, the controller 330 may include at least one processor or microprocessor or may be a part of the processor. Further, a part of the communication unit 310 and the controller 330 may be referred to as a communication processor (CP).

Figure 4:
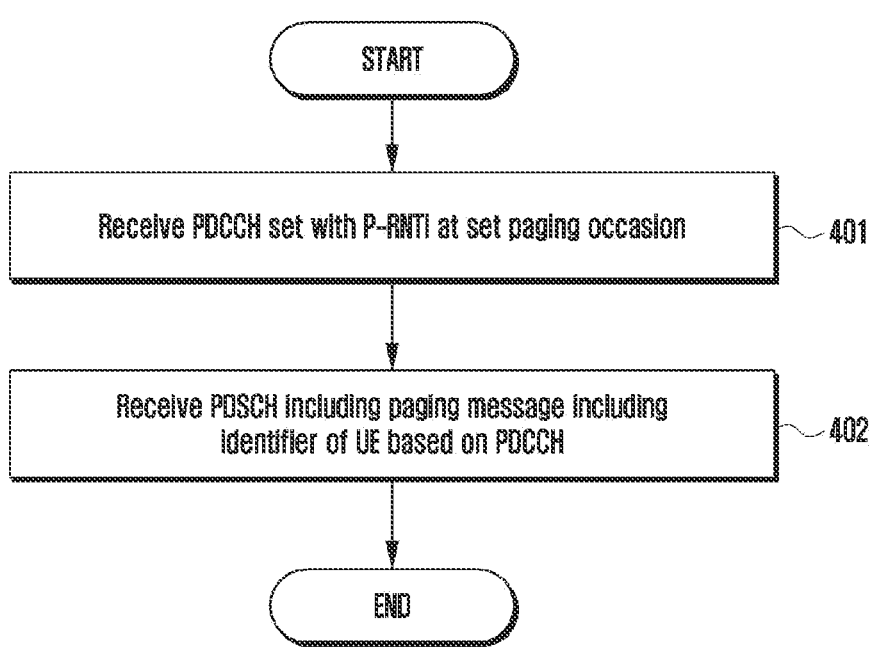
FIG. 4 is a flowchart illustrating an example of an operation of a terminal performed in a wireless communication system according to various embodiments of the disclosure.

FIG. 4 is a flowchart illustrating an operation of a UE in a wireless communication system according to various embodiments of the disclosure.

FIG. 4 illustrates an operation method of the UE 120.

With reference to FIG. 4, in step 401, the UE receives a physical downlink control channel (PDCCH) set with a paging-radio network temporary identifier (P-RNTI) at a set paging occasion. The paging procedure may be used for notifying when an incoming call occurs to a UE in an IDLE or INACTIVE state and starting network access to UEs or notifying UEs in a CONNECTED state that system information has changed. (The IDLE state or the INACTIVE state may mean a state that the UE camps on in a random cell and is not connected to radio resource control (RRC), and the CONNECTED state may mean a state that the UE is connected to RRC through an initial access procedure.) Paging starts from an access and mobility management function (AMF) and is delivered to a UE via a base station (gNB). More specifically, paging starts from an AMF 1104 and is delivered to a gNB 1102 through S1 application protocol (S1AP) signaling and then delivered to a UE 1101 through RRC signaling. In this case, the UE may monitor a PDCCH set with a P-RNTI at a paging occasion to know whether there is a paging message. The paging occasion may be determined based on a discontinuous reception (DRX) cycle set by the base station to the UE.

In step 402, the UE receives a physical downlink shared channel (PDSCH) including a paging message including an identifier of the UE based on the PDCCH. Upon receiving the PDCCH set with the P-RNTI, the UE may receive a PDSCH including a paging message 1106. The paging message may include UE ID information of the UE to be woken up by the base station.

A wireless communication system has evolved from providing voice-oriented services in the early days to a broadband wireless communication system that provides high-speed and high-quality packet data services as in communication standards such as high speed packet access (HSPA), long term evolution (LTE) or evolved universal terrestrial radio access (E-UTRA), LTE-Advanced (LTE-A), and LTE-Pro of 3GPP, high rate packet data (HRPD) and ultra mobile broadband (UMB) of 3GPP2, and IEEE 802.16e.

An LTE system, which is a representative example of the broadband wireless communication system, employs an orthogonal frequency division multiplexing (OFDM) scheme in downlink (DL) and employs a single carrier frequency division multiple access (SC-FDMA) scheme in uplink. The uplink means a radio link in which a user equipment (UE) or a mobile station (MS) transmits data or control signals to an eNode B (eNB) or a base station (BS), and the downlink means a radio link in which a base station transmits data or control signals to a UE. The above-mentioned multiple access method may enable data or control information of each user to distinguish by allocating and operating data or control information so that time-frequency resources to carry data or control information for each user in general do not overlap each other, that is, so that orthogonality is established.

A 5G communication system as a future communication system after LTE should support services that simultaneously satisfy various requirements because various requirements of users and service providers may be freely reflected. Services considered for the 5G communication system include enhanced mobile broadband (eMBB), massive machine type communication (mMTC), ultra reliability low latency communication (URLLC), and the like.

The eMBB aims to provide a more improved data rate than a data rate supported by existing LTE, LTE-A, or LTE-Pro. For example, in the 5G communication system, the eMBB should be able to provide a peak data rate of 20 Gbps in downlink and a peak data rate of 10 Gbps in uplink from the viewpoint of one base station. Further, the 5G communication system should provide an increased user perceived data rate of a UE while providing a peak data rate. In order to satisfy such requirements, it is required to improve various transmission and reception technologies, including more advanced multi input and multi output (MIMO) transmission technology. Further, the LTE system transmits a signal using a transmission bandwidth of maximum 20 MHz in the 2 GHz band, whereas the 5G communication system can satisfy a data rate required by the same by using a frequency bandwidth wider than 20 MHz in a frequency band of 3 to 6 GHz or 6 GHz or more.

At the same time, in the 5G communication system, mMTC is being considered to support application services such as Internet of Things (IoT). In order to efficiently provide IoT, mMTC requires access support for large-scale UEs within a cell, improved coverage of UEs, improved battery time, and reduced UE cost. Because IoT is attached to various sensors and various devices to provide communication functions, it should be able to support a large number of UEs (e.g., 1,000,000 UEs/km²) in a cell. Further, because a UE supporting mMTC is likely to be positioned in a shadow area that is not covered by a cell, such as the basement of a building due to the nature of the service, the UE may require wider coverage than other services provided by the 5G communication system. The UE supporting mMTC should be composed of a low-cost UE, and because it is difficult to frequently replace a battery of the UE, a very long battery life time such as 10 to 15 years may be required.

Finally, URLLC is a cellular-based wireless communication service to be used for specific mission-critical. For example, a service used for a remote control of robots or machinery, industrial automation, unmanned aerial vehicles, remote health care, emergency alert or the like may be considered. Therefore, communication provided by URLLC should provide very low latency and very high reliability. For example, a service supporting URLLC should satisfy an air interface latency of less than 0.5 milliseconds, and simultaneously has the requirement of a packet error rate of $7^5$ or less. Therefore, for a service that supports URLLC, the 5G system should provide a smaller transmit time interval (TTI) than that of other services, and may simultaneously request design items that should allocate wide resources in a frequency band in order to secure reliability of a communication link.

Three services, that is, eMBB, URLLC, and mMTC of 5G may be multiplexed and transmitted in one system. In this case, in order to satisfy different requirements of each service, different transmission and reception techniques and transmission and reception parameters may be used between services. 5G is not limited to the above three services.

Hereinafter, a frame structure of the 5G system will be described in more detail with reference to the drawings.

Figure 5:
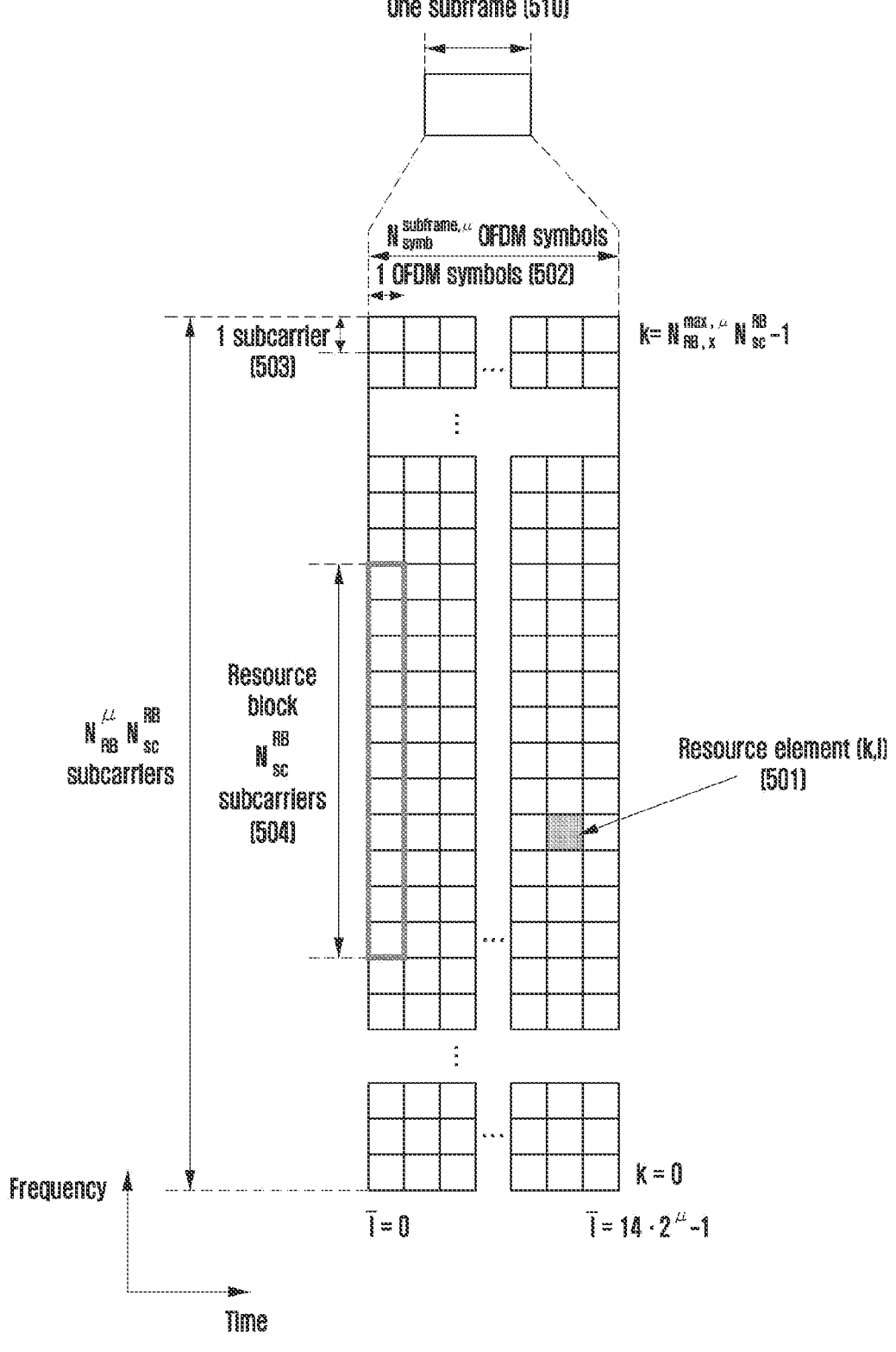
FIG. 5 is a diagram illustrating an example of a basic structure of a time-frequency domain of a wireless communication system according to various embodiments of the disclosure.

FIG. 5 illustrates a resource structure of a wireless communication system according to various embodiments of the disclosure.

Specifically, FIG. 5 illustrates a basic structure of a time-frequency domain, which is a radio resource domain in which data or control channels are transmitted in a 5G system.

In FIG. 5, a horizontal axis represents a time domain and a vertical axis represents a frequency domain. A basic unit of resources in the time and frequency domains is a resource element (RE) 501 and may be defined to 1 orthogonal frequency division multiplexing (OFDM) symbol 502 in the time axis and 1 subcarrier 503 in the frequency axis. In the frequency domain, the $N_{SC}^{RB}$ (e.g., 12) number of consecutive REs may constitute 1 resource block (RB) 504.

Figure 6:
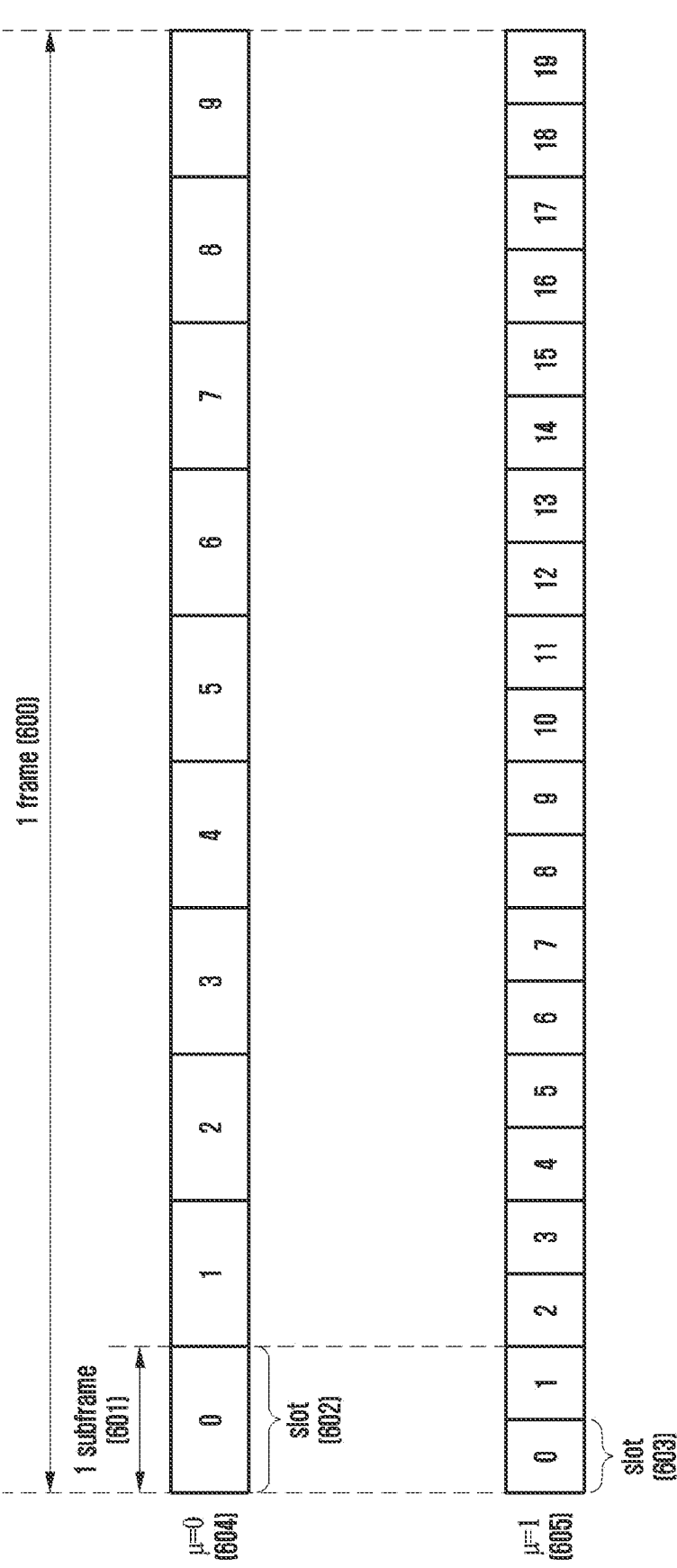
FIG. 6 is a diagram illustrating an example of a slot structure of a wireless communication system according to various embodiments of the disclosure.

FIG. 6 illustrates a resource structure of a wireless communication system according to various embodiments of the disclosure.

Specifically, FIG. 6 illustrates a slot structure considered in a 5G system.

With reference to FIG. 6, an example of a structure of a frame 600, a subframe 601, and slots 602 and 603 is illustrated. 1 frame 600 may be defined as 10 ms. 1 subframe 601 may be defined as 1 ms, and 1 frame 600 may be thus composed of total 10 subframes 601. 1 slot 602 and 603 may be defined to 14 OFDM symbols (i.e., the number ($N_{symb}^{slot}$=14) of symbols per slot). 1 subframe 601 may be composed of one or a plurality of slots 602 and 603, and the number of the slots 602 and 603 per subframe 601 may vary according to setting values μ 604 and 605 for subcarrier spacing.

In an example of FIG. 6, the case of μ=0, 604 and the case of μ=1, 605 are illustrated as subcarrier spacing setting values. In the case that μ=0, 604, 1 subframe 601 may be composed of 1 slot 602, and in the case that μ=1, 605, 1 subframe 601 may be composed of 2 slots 603. That is, the number $N_{slot}^{subframe,\mu}$ of slots per subframe may vary according to the setting value μ, for subcarrier spacing, and accordingly, the number $N_{slot}^{frame,\mu}$ of slots per frame may vary. $N_{slot}^{subframe,\mu}$ and $N_{slot}^{frame,\mu}$ according to each subcarrier spacing setting value may be defined, as illustrated in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Hereinafter, a bandwidth part (BWP) setting in the 5G communication system will be described in detail with reference to the drawings.

Figure 7:
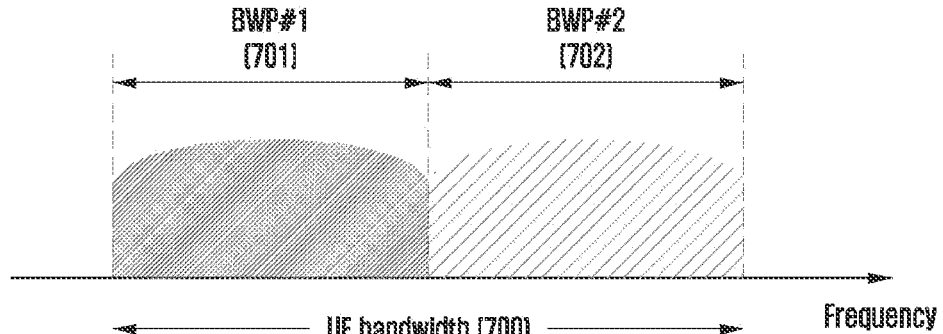
FIG. 7 is a diagram illustrating an example of a structure of a bandwidth part in a wireless communication system according to various embodiments of the disclosure.

FIG. 7 illustrates a structure of a bandwidth part in a wireless communication system according to various embodiments of the disclosure.

Specifically, FIG. 7 is a diagram illustrating an example of a setting for a bandwidth part in a 5G communication system.

With reference to FIG. 7, an example in which a UE bandwidth 700 is set to two bandwidth parts, that is, a BWP #1, 701 and a BWP #2, 702 is illustrated. The base station may set one or a plurality of bandwidth parts to the UE, and set information for each bandwidth part, as illustrated in Table 2.

TABLE 2

```
BWP ::=                          SEQUENCE {
    bwp- Id                          BWP-Id,
    (Bandwidth part identifier)
    locationAndBandwidth             INTEGER (1..65536),
    (Bandwidth part location)
    subcarrierSpacing                ENUMERATED (n0, nl, n2, n3, n4,
n5),
    (Subcarrier spacing)
    cyclicPrefix                     ENUMERATED ( extended )
    (Cyclic prefix)
}
```

Various embodiments of the disclosure are not limited to the above example, and various parameters related to the bandwidth part may be set to the UE in addition to the setting information. The above-described information may be transmitted from the base station to the UE through higher layer signaling, for example, RRC signaling. At least one bandwidth part of one or a plurality of set bandwidth parts may be activated. Whether the set bandwidth part is activated may be semi-statically transmitted from the base station to the UE through RRC signaling or may be dynamically transmitted through downlink control information (DCI).

According to an embodiment, the UE before RRC connection may receive a setting of an initial BWP for initial access from the base station through a master information block (MIB). More specifically, the UE may receive setting information on a search space and a CORESET in which a PDCCH for receiving system information (which may correspond to remaining system information (RMSI) or system information block 1 (SIB1)) necessary for initial access may be transmitted through the MIB in an initial access step. The CORESET and search space set by the MIB may each be regarded as an identity (ID) 0. The base station may notify the UE of setting information such as frequency allocation information, time allocation information, and numerology for the CORESET #0 through the MIB. Further, the base station may notify the UE of setting information on a monitoring period and paging occasion for the CORESET #0, that is, setting information on the search space #0 through the MIB. The UE may regard a frequency domain set to the CORESET #0 acquired from the MIB as an initial bandwidth part for initial access. In this case, an identifier (ID) of the initial bandwidth part may be regarded as 0.

A setting for the bandwidth part supported by 5G may be used for various purposes.

According to an embodiment, in the case that a bandwidth supported by the UE is smaller than a system bandwidth, it may be supported through the bandwidth part setting. For example, the base station may set a frequency position (setting information 2) of the bandwidth part to the UE to transmit and receive data to and from the UE at a specific frequency position within the system bandwidth.

According to an embodiment, for the purpose of supporting different numerologies, the base station may set a plurality of bandwidth parts to the UE. For example, in order to support both data transmission and reception using subcarrier spacing of 15 kHz and subcarrier spacing of 30 kHz to and from any UE, the base station may set two bandwidth parts to subcarrier spacing of 15 kHz and 30 kHz, respectively. Different bandwidth parts may be frequency division multiplexed (FDM), and in the case of transmitting and receiving data at specific subcarrier spacing, a bandwidth part set to corresponding subcarrier spacing may be activated.

According to an embodiment, for the purpose of reducing power consumption of the UE, the base station may set bandwidth parts having different sizes of bandwidths to the UE. For example, in the case that the UE supports a very large bandwidth, for example, a bandwidth of 100 MHz and always transmits and receives data with the corresponding bandwidth, very large power consumption may occur. In particular, it may be very inefficient in terms of power consumption for the UE to monitor an unnecessary downlink control channel with a large bandwidth of 100 MHz in a situation of absence of traffic. For the purpose of reducing power consumption of the UE, the base station may set a relatively small bandwidth part, for example, a bandwidth part of 20 MHz to the UE. In a situation where there is no traffic, the UE may perform a monitoring operation in a bandwidth part of 20 MHz, and in the case that data is generated, the UE may transmit and receive data using a bandwidth part of 100 MHz according to the indication of the base station.

In a method of setting the bandwidth part, UEs before RRC connection may receive setting information on an initial bandwidth part through a master information block (MIB) in an initial access step. More specifically, the UE may receive a setting of a CORESET for a downlink control channel through which downlink control information (DCI) scheduling a system information block (SIB) may be transmitted from an MIB of a physical broadcast channel (PBCH). A bandwidth of the CORESET set with the MIB may be regarded as an initial bandwidth part, and the UE may receive a physical downlink shared channel (PDSCH) through which the SIB is transmitted through the set initial bandwidth part. The initial bandwidth part may be used for other system information (OSI), paging, and random access in addition to the purpose of receiving the SIB.

In the case that one or more bandwidth parts are set to the UE, the base station may indicate a change of the bandwidth part to the UE using a bandwidth part indicator field in the DCI. For example, in FIG. 7, in the case that the currently activated bandwidth part of the UE is a bandwidth part #1, 701, the base station may indicate a bandwidth part #2, 702 with a bandwidth part indicator in the DCI to the UE, and the UE may change the bandwidth part to the bandwidth part #2, 702 indicated by the bandwidth part indicator in the received DCI.

As described above, because the DCI-based bandwidth part change may be indicated by the DCI scheduling the PDSCH or PUSCH, in the case that the UE receives the bandwidth part change request, the UE should be able to receive or transmit the PDSCH or PUSCH scheduled by the corresponding DCI in the changed bandwidth part without difficulty. To this end, the standard stipulates requirements for a delay time TBWP required when changing the bandwidth part, and may be defined, for example, as illustrated in Table 3.

TABLE 3

| | NR Slot | | BWP switch delay $T_{BWP}$ (slots) | |
|---|---|---|---|---|
| μ | length (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change delay time supports Type 1 or Type 2 according to the capability of the UE. The UE may report a supportable bandwidth part delay time type to the base station.

According to the above-mentioned requirement for the bandwidth part change delay time, in the case that the UE receives DCI including a bandwidth part change indicator in a slot n, the UE may complete a change to a new bandwidth part indicated by the bandwidth part change indicator at a time point no later than a slot n+TBWP, and perform transmission and reception for a data channel scheduled by the corresponding DCI in the changed new bandwidth part. In the case that the base station wants to schedule a data channel with a new bandwidth part, the base station may determine time domain resource allocation for the data channel in consideration of a bandwidth part change delay time TBWP of the UE. That is, when scheduling a data channel with a new bandwidth part, in a method of determining time domain resource allocation for the data channel, the base station may schedule the corresponding data channel after the bandwidth part change delay time. Accordingly, the UE may not expect that DCI indicating the bandwidth part change indicates a slot offset (K0 or K2) value smaller than a bandwidth part change delay time TBWP.

When the UE receives DCI (e.g., DCI format 1_1 or 0_1) indicating a bandwidth part change, the UE may not perform any transmission or reception during a corresponding time period from a third symbol of a slot that receives a PDCCH including the corresponding DCI to a starting point of a slot indicated by a slot offset (K0 or K2) value indicated by a time domain resource allocation indicator field in the corresponding DCI. For example, when the UE receives DCI indicating a bandwidth part change in a slot n and a slot offset value indicated by the corresponding DCI is K, the UE may not perform any transmission or reception from a third symbol of the slot n to a previous symbol of a slot n+K (i.e., a last symbol of a slot n+K−1).

Hereinafter, a synchronization signal (SS)/PBCH block in 5G will be described.

The SS/PBCH block may mean a physical layer channel block composed of a primary SS (PSS), a secondary SS (SSS), and a PBCH. Specifically, a constitution of the SS/PBCH block is as follows.

PSS: The PSS is a reference signal for downlink time/frequency synchronization, and provides some information of a cell ID.

SSS: The SSS serves as a criterion for downlink time/frequency synchronization, and provides remaining cell ID information in which the PSS is not provided. Additionally, the SSS may serve as a reference signal for demodulation of a PBCH.

PBCH: The PBCH provides essential system information necessary for transmitting and receiving a data channel and control channel of the UE. Essential system information may include search space related control information representing radio resource mapping information of the control channel and scheduling control information on a separate data channel that transmits system information.

SS/PBCH block: The SS/PBCH block is composed of a combination of a PSS, an SSS, and a PBCH. One or a plurality of SS/PBCH blocks may be transmitted within a time of 5 ms, and each SS/PBCH block to be transmitted may be distinguished by an index.

The UE may detect the PSS and the SSS in an initial access step and decode the PBCH. The UE may acquire MIB from the PBCH and receive a setting of a control resource set (CORESET) #0 (which may correspond to a CORESET index or a CORESET having an identity (ID) of 0) and a search space #0 (which may correspond to a search space index or a search space having an ID of 0) from the MIB. The UE may assume that the selected SS/PBCH block and demodulation reference signal (DMRS) transmitted in the CORESET #0 are quasi co-located (QCL) and perform monitoring for the CORESET #0. The UE may receive system information with downlink control information transmitted in the CORESET #0. The UE may acquire random access channel (RACH) related setting information required for initial access from the received system information. The UE may transmit a physical RACH (PRACH) to the base station in consideration of the selected SS/PBCH index, and the base station that has received the PRACH may acquire information on the SS/PBCH block index selected by the UE. The base station may know that the UE has selected a certain block among the respective SS/PBCH blocks and monitors a CORESET #0 related thereto.

Hereinafter, downlink control information (DCI) in the 5G system will be described in detail.

Scheduling information on uplink data (or physical uplink shared channel (PUSCH)) or downlink data (or physical downlink shared channel (PDSCH)) in the 5G system is transmitted from the base station to the UE through DCI. The UE may monitor a DCI format for fallback and a DCI format for non-fallback for the PUSCH or the PDSCH. The DCI format for fallback may be composed of a fixed field predefined between the base station and the UE, and the DCI format for non-fallback may include a settable field.

The DCI may be transmitted through a physical downlink control channel (PDCCH) via channel coding and modulation processes. A cyclic redundancy check (CRC) may be attached to a DCI message payload, and the CRC may be scrambled with a radio network temporary identifier (RNTI) corresponding to the identity of the UE. According to an embodiment, different RNTIs may be used according to the purpose of the DCI message, for example, UE-specific data transmission, power control command, or random access response. That is, the RNTI is not explicitly transmitted but is included in a CRC calculation process and transmitted. Upon receiving a DCI message transmitted on the PDCCH, the UE may identify a CRC using the allocated RNTI, and if the CRC identification result is correct, the UE may know that the corresponding message has been transmitted to the UE.

For example, DCI scheduling a PDSCH for system information (SI) may be scrambled with an SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying transmit power control (TPC) may be scrambled with a TPC-RNTI. DCI scheduling a UE-specific PDSCH or PUSCH may be scrambled with a cell RNTI (C-RNTI), modulation coding scheme C-RNTI (MCS-C-RNTI), and configured scheduling RNTI (CS-RNTI).

A DCI format 0_0 may be used as fallback DCI scheduling a PUSCH, and in this case, a CRC may be scrambled with a C-RNTI. The DCI format 0_0 in which a CRC is scrambled with a C-RNTI may include, for example, information of Table 4.

TABLE 4

- Identifier for DCI formats - 1 bit
  - The value of this bit field is always set to 0, indicating an UL DCI format
- Frequency domain resource assignment- $\lceil \log_2(N_{RB}^{ULBWP}(N_{RB}^{ULBWP}+1)/2) \rceil$ bits where $N_{RB}^{ULBWP}$ is defined in subclause 7.3.1.0
  - For PUSCH hopping with resource allocation type 1:
    - $N_{UL\_hop}$ MSB bits are used to indicate the frequency offset according to Subclause 6.3 of [6. TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values
    - $\lceil \log_2(N_{RB}^{ULBWP}(N_{RB}^{ULBWP}+1)/2) \rceil - N_{UL\_hop}$ bits provides the frequency domain resource allocation according to Subclause 6.1.2.2.2 of [6. TS 38.214]

TABLE 4-continued

- For non-PUSCH hopping with resource allocation type 1:
  - $\lceil \log_2(N_{RB}{}^{ULBWP}(N_{RB}{}^{ULBWP}+1)/2) \rceil$ bits provides the frequency domain resource allocation according to Subclause 6.1.2.2.2 of [6. TS 38.214]
- Time domain resource assignment- 4 bits as defined in Subclause 6.1.2.1 of [6. TS 38.214]
- Frequency hopping flag- 1 bit according to Table 7.3.1.1.1-3. as defined in Subclause 6.3 of [6. TS 38.214]
- Modulation and coding scheme - 5 bits as defined in Subclause 6.1.4.1 of [6. TS 38.214]
- New data indicator- 1 bit
- Redundancy version- 2 bits as defined in Table 7.3.1.1.1-2
- HARQ process number- 4 bits
- TPC command for scheduled PUSCH- 2 bits as defined in Subclause 7.1.1 of [5. TS 38.213]
- Padding bits, if required.
- UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding: 0 bit otherwise. The UL/SUL indicator, if present, locates in the last bit position of DCI format 0_0, after the padding bit(s).
  - If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured:
  - If the UL/SUL indicator is not present in DCI format 0_0 and pucch-Config is configured, the corresponding PUSCH scheduled by the DCI format 0_0 is for the UL or SUL for which high layer parameter pucch-Config is configured.
  - If the UL/SUL indicator is not present in DCI format 0_0 and pucch-Config is not configured, the corresponding PUSCH scheduled by the DCI format 0_0 is for the uplink on which the latest PRACH is transmitted.

A DCI format 0_1 may be used as non-fallback DCI scheduling a PUSCH, and in this case, a CRC may be scrambled with a C-RNTI. The DCI format 0_1 in which a CRC is scrambled with a C-RNTI may include, for example, information of Table 5.

TABLE 5

- Identifier for DCI formats - 1 bit
  - The value of this bit field is always set to 0, indicating an UL DCI format
- Carrier indicator- 0 or 3 bits, as defined in Subclause 10.1 of [5, TS38.213].
- UL SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission, otherwise, 1 bit as defined in Table 7.3.1.1.1-1.
- Bandwidth part indicator- 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
  - $n_{BWP} = n_{BWP,RRC} + 1$ if $n_{BWP,RRC}$, in which case the bandwidth part indicator is equivalent to the ascending order of the higher layer parameter BWP-Id;
  - otherwise $n_{BWP} = n_{BWP,RRC}$ in which case the bandwidth part indicator is defined in Table 7.3.1.1.2-1;
  If a UE does not support active BWP change via DCI, the UE ignores this bit field.
- Frequency domain resource assignment- number of bits determined by the following, where $N_{RB}{}^{UL,BWP}$ is the size of the active UL bandwidth part:
  - $N_{RBG}$ bits if only resource allocation type 0 is configured, where $N_{RBG}$ is defined in Subclause 6.1.2.2.1 of [6, TS 38.214],
  - $\lceil \log_2(N_{RB}{}^{UL,BWP}(N_{RB}{}^{UL,BWP} + 1)/2) \rceil$ bits if only resource allocation type 1 is configured,
    or $\max(\lceil \log_2(N_{RB}{}^{UL,BWP}(N_{RB}{}^{UL,BWP} + 1)/2) \rceil, N_{RBG} - 1$ bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    -For resource allocation type 0, the $N_{RBG}$ LSBs provide the resource allocation as defined in Subclause 6.1:2.2.1 of [6, TS 38.214].

TABLE 5-continued

-For resource allocation type 1, the $\lceil \log_2(N_{RB}^{UL,BWP}(N_{RB}^{UL,BWP} + 1)/2)\rceil$ LSBs pro-
vide the
    resource allocation as follows:
     - For PUSCH hopping with resource allocation type 1:
       - $N_{UL\_hop}$ MSB bits are used to indicate the frequency offset according to
        Subclause 6.3 of [6, TS 38.214], where $N_{UL\_hop} = 1$ if the higher layer
        parameter frequencyHoppingOffsetLists contains two offset values and
        $N_{UL\_hop} = 2$ if the higher layer parameter frequencyHoppingOffsetLists
        contains four offset values
      -$\lceil \log_2(N_{RB}^{UL,BWP}(N_{RB}^{UL,BWP} + 1)/2)\rceil - N_{UL\_hop}$ bits provides the frequency
domain
        resource allocation according to Subclause 6.1.2.2.2 of [6, TS 38.214]
     - For non-PUSCH hopping with resource allocation type 1:
      -$\lceil \log_2(N_{RB}^{UL,BWP}(N_{RB}^{UL,BWP} + 1)/2)\rceil$ bits provides the frequency domain
resource
        allocation according to Subclause 6.1.2.2.2 of [6, TS 38.214]
     If "Bandwidth part indicator" field indicates a bandwidth part other than the
     active bandwidth part and if both resource allocation type 0 and 1 are configured
     for the indicated bandwidth part, the UE assumes resource allocation type 0 for
     the indicated bandwidth part if the bandwidth of the "Frequency domain resource
     assignment" field of the active bandwidth part is smaller than the bitwidth of the
     "Frequency domain resource assignment" field of the indicated bandwidth part.
- Time domain resource assignment- 0, 1, 2, 3, or 4 bits as defined in Subclause
    6.1.2.1 of [6, TS38.214]. The bitwidth for this field is determined as $\lceil \log_2(I)\rceil$ bits,
    where I is the number of entries in the higher layer parameter pusch-
    TimeDomainAllocationList if the higher layer parameter is configured; otherwise I
    is the number of entries in the default table.
- Frequency hopping flag- 0 or 1 bit:
    - 0 bit if only resource allocation type 0 is configured or if the higher layer
     parameter frequencyHopping is not configured;
    - 1 bit according to Table 7.3.1.1.1-3 otherwise, only applicable to resource
     allocation type 1, as defined in Subclause 6.3 of [6, TS 38.214].
- Modulation and coding scheme- 5 bits as defined in Subclause 6.1.4.1 of [6, TS
    38.214]
- New data indicator- 1 bit
- Redundancy version- 2 bits as defined in Table 7.3.1.1.1-2
- HARQ process number- 4 bits
- $1^{st}$ downlink assignment index - 1 or 2 bits:
    - 1 bit for semi-static HARQ-ACK codebook:
    - 2 bits for dynamic HARQ-ACK codebook
- $2^{nd}$ downlink assignment index- 0 or 2 bits:
    - 2 bits for dynamic HARQ-ACK codebook with two HARQ-ACK sub-codebooks;
    - 0 bit otherwise.
- TPC command for scheduled PUSCH- 2 bits as defined in Subclause 7.1.1 of [5,
    TS38.213]

- $SRS$ resource indicator -

$$\left\lceil \log_2\left( \sum_{k=1}^{min(L_{max},N_{SRS})} \binom{N_{SRS}}{k} \right) \right\rceil \text{ or } \lceil \log_2(N_{SRS})\rceil \text{ bits,}$$

where $N_{SRS}$ is the number of configured SRS resources in the SRS resource set
    associated with the higher layer parameter usage of value 'codeBook' or
    'nonCodeBook', $$\left\lceil \log_2\left( \sum_{k=1}^{min(L_{max},N_{SRS})} \binom{N_{SRS}}{k} \right) \right\rceil \text{ bits according to Tables 7.3.1.1.2-28/29/30/31}$$

if the higher layer parameter txConfig = nonCodebook, where $N_{SRS}$ is the number
    of configured SRs resources in the SRS resource set associated with the higher
    layer parameter usage of value 'nonCodeBook' and
    - if UE supports operation with maxMIMO-Layers and the higher layer
     parameter maxMIMO-Layers of PUSCH-ServingCellConfig of the serving cell
     is configured, $L_{max}$ is given by that parameter
    - otherwise, $L_{max}$ is given by the maximum number of layers for PUSCH
     supported by the UE for the serving cell for non-codebook based operation.
    - $\lceil \log_2(N_{SRS})\rceil$ bits according to Tables 7.3.1.1.2-32 if the higher layer parameter
     txConfig = codebook, where $N_{SRS}$ is the number of configured SRS resources in
     the SRS resource set associated with the higher layer parameter usage of value
     'codeBook'.
- Precoding information and number of layers- number of bits determined by the
    following:
    - 0 bits if the higher layer parameter txConfig = noncodeBook;
    - 0 bits for 1 antenna port and if the higher layer parameter txConfig = codebook,
    - 4, 5, or 6 bits according to Table 7.3.1.1.2-2 for 4 antenna ports, if txConfig =
    codebook, and according to whether transform precoder is enabled or disabled,
    and the values of higher layer parameters maxRank, and codebookSubset;

TABLE 5-continued

- 2, 4, or 5 bits according to Table 7.3.1.1.2-3 for 4 antenna ports, if txConfig =
codebook, and according to whether transform precoder is enabled or disabled,
and the values of higher layer parameters maxRank, and codebookSubset.
- 2 or 4 bits according to Table 7.3.1.1.2-4 for 2 antenna ports, if txConfig =
codebook, and according to whether transform precoder is enabled or disabled,
and the values of higher layer parameters maxRank, and codebookSubset;
- 1 or 3 bits according to Table 7.3.1.1.2-5 for 2 antenna ports, if txConfig =
codebook, and according to whether transform precoder is enabled or disabled,
and the values of higher layer parameters maxRank, and codebookSubset.
- Antenna ports- number of bits determined by the following
  - 2 bits as defined by Tables 7.3.1.1.2-6, if transform precoder is enabled, dmrs-
    Type=1, and maxLength=1;
  - 4 bits as defined by Tables 7.3.1.1.2-7, if transform precoder is enabled, dmrs-
    Type=1, and maxLength=2;
  - 3 bits as defined by Tables 7.3.1.1.2-8/9/10/11, if transform precoder is disabled,
    dmrs-Type=1, and maxLength=1, and the value of rank is determined according to
    the SRS resource indicator field if the higher layer parameter txConfig =
    nonCodebook and according to the Precoding information and number of layers
    field if the higher layer parameter txConfig = codebook;
  - 4 bits as defined by Tables 7.3.1.1.2-12/13/14/15, if transform precoder is
    disabled, dmrs-Type=1, and maxLength=2, and the value of rank is determined
    according to the SRS resource indicator field if the higher layer parameter
    txConfig = nonCodebook and according to the Precoding information and number
    of layers field if the higher layer parameter txConfig = codebook;
  - 4 bits as defined by Tables 7.3.1.1.2-16/17/18/19, if transform precoder is
    disabled, dmrs-Type=2, and maxLength=1, and the value of rank is determined
    according to the SRS resource indicator field if the higher layer parameter
    txConfig = nonCodebook and according to the Precoding information and number
    of layers field if the higher layer parameter txConfig = codebook;
  - 5 bits as defined by Tables 7.3.1.1.2-20/21/22/23, if transform precoder is
    disabled, dmrs-Type=2, and maxLength=2, and the value of rank is determined
    according to the SRS resource indicator field if the higher layer parameter
    txConfig = nonCodebook and according to the Precoding information and number
    of layers field if the higher layer parameter txConfig = codebook.
  where the number of CDM groups without data of values 1, 2, and 3 in Tables
  7.3.1.1.2-6 to 7.3.1.1.2-23 refers to CDM groups {0}, {0,1}, and {0, 1,2}
  respectively.
  If a UE is configured with both dmrs-UplinkForPUSCH-MappingTypeA and dmrs-
  UplinkForPUSCH-MappingTypeB, the bitwidth of this field equals $\max\{x_A, x_B\}$,
  where $x_A$ is the "Antenna ports" bitwidth derived according to dmrs-
  UplinkForPUSCH-MappingTypeA and $x_B$ is the "Antenna ports" bitwidth derived
  according to dmrs-UplinkForPUSCH-MappingTypeB. A number of $|x_A-x_B|$ zeros
  are padded in the MSB of this field, if the mapping type of the PUSCH corresponds
  to smaller value of $x_A$ and $x_B$.
- SRS request- 2 bits as defined by Table 7.3.1.1.2-24 for UEs not configured with
  supplementaryUplink in ServingCellConfig in the cell, 3 bits for UEs configured
  with supplementaryUplink in ServingCellConfig in the cell where the first bit is the
  non-SUL/SUL indicator as defined in Table 7.3.1.1.1-1 and the second and third bits
  are defined by Table 7.3.1.1.2.24. This bit field may also indicate the associated
  CSI-RS according to Subclause 6.1.1.2 of [6, TS 38.214].
- CSI request- 0, 1, 2, 3, 4, 5, or 6 bits determined by higher layer parameter
  reportTriggerSize.
- CBG transmission information (CBGTI)- 0 bit if higher layer parameter
  codeBlockGroupTransmission for PDSCH is not configured, otherwise, 2, 4, 6, or 8
  bits determined by higher layer parameter maxCodeBlockGroupsPerTransportBlock
  for PUSCH.
- PTRS-DMRS association- number of bits determined as follows
  - 0 bit if PTRS-UplinkConfig is not configured and transform precoder is disabled,
    or if transform precoder is enabled, or if maxRank=1;
  - 2 bits otherwise, where Table 7.3.1.1.2-25 and 7.3.1.1.2-26 are used to indicate
    the association between PTRS port(s) and DMRS port(s) for transmission of one
    PT-RS port and two PT-RS ports respectively, and the DMRS ports are indicated
    by the Antenna ports field.
  If "Bandwidth part indicator" field indicates a bandwidth part other than the active
  bandwidth part and the "PTRS-DMRS association" field is present for the indicated
  bandwidth part but not present for the active bandwidth part, the UE assumes the
  "PTRS-DMRS association" field is not present for the indicated bandwidth part.
- beta_offset indicator- 0 if the higher layer parameter betaOffsets = semiStatic;
  otherwise 2 bits as defined by Table 9.3-3 in [5, TS 38.213].
- DMRS sequence initialization- 0 bit if transform precoder is enabled; 1 bit if
  transform precoder is disabled.

TABLE 5-continued

- UL-SCH indicator- 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI RINTI, a UE is not expected to receive a DCI format 0 1 with UL-SCH indicator of "0" and CSI request of all zero(s).

A DCI format 10 may be used as fallback DCI scheduling a PDSCH, and in this case, a CRC may be scrambled with a C-RNTI. The DCI format 1_0 in which a CRC is scrambled with a C-RNTI may include, for example, information of Table 6.

TABLE 6

- Identifier for DCI formats- 1 bits
  - The value of this bit field is always set to 1, indicating a DL DCI format
- Frequency domain resource assignment- $\lceil \log_2(N_{RB}^{DL,BWP}(N_{RB}^{DL,BWP} +1)/2) \rceil$ bits where $N_{RB}^{DL,BWP}$ is given by subclause 7.3.1.0

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

- Random Access Preamble index- 6 bits according to ra-PreambleIndex in Subclause 5.1.2 of [8, TS38.321]
- UL/SUL indicator- 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved
- SS/PBCH index- 6 bits. If the value of the "Random Access Preamble index" is not all zeros, this field indicates the SS/PBCH that shall be used to determine the RACH occasion for the PRACH transmission; otherwise, this field is reserved.
- PRACH Mask index- 4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved
- Reserved bits- 10 bits Otherwise, all remaining fields are set as follows:

- Time domain resource assignment- 4 bits as defined in Subclause 5.1.2.1 of [6, TS 38.214]
- VRB-to-PRB mapping- 1 bit according to Table 7.3.1.2.2-5
- Modulation and coding scheme- 5 bits as defined in Subclause 5.1.3 of [6, TS 38.214]
- New data indicator- 1 bit
- Redundancy version- 2 bits as defined in Table 7.3.1.1.1-2
- HARQ process number- 4 bits
- Downlink assignment index- 2 bits as defined in Subclause 9.1.3 of [5, TS 38.213], as counter DAI
- TPC command for scheduled PUCCH- 2 bits as defined in Subclause 7.2.1 of [5, TS 38.213]
- PUCCH resource indicator- 3 bits as defined in Subclause 9.2.3 of [5, TS 38.213]
- PDSCH-to-HARQ_feedback timing indicator- 3 bits as defined in Subclause 9.2.3 of [5, TS38.213]

A DCI format 1_1 may be used as non-fallback DCI scheduling a PDSCH, and in this case, a CRC may be scrambled with a C-RNTI. The DCI format 1_1 in which a CRC is scrambled with a C-RNTI may include, for example, information of Table 7.

TABLE 7

- Identifier for DCI formats- 1 bits
  - The value of this bit field is always set to 1, indicating a DL DCI format
- Carrier indicator- 0 or 3 bits as defined in Subclause 10.1 of [5, TS 38.213].
- Bandwidth part indicator- 0, 1 or 2 bits as determined by the number of DL BWPs $n_{BWP,RRC}$ configured by higher layers, excluding the initial DL bandwidth part. The bitwidth for this field is determined as $\lceil \log_2( n_{BWP}) \rceil$ bits, where TABLE 7-continued

- - $n_{BWP} = n_{BWP,RRC} + 1$ if $n_{BWP,RRC} \leq 3$, in which case the bandwidth part indicator is equivalent to the ascending order of the higher layer parameter BWP-Id,
  - - otherwise $n_{BWP} = n_{BWP,RRC}$, in which case the bandwidth part indicator is defined in Table 7.3.1.1.2-1;
  - If a UE does not support active BWP change via DCI, the UE ignores this bit field.
- Frequency domain resource assignment- number of bits determined by the following, where $N_{RB}^{DL,BWP}$ is the size of the active DL bandwidth part:
  - $N_{RBG}$ bits if only resource allocation type 0 is configured, where $N_{RBG}$ is defined in Subclause 5.1.2.2.1 of [6, TS38.214],
  - $\lceil \log_2(N_{RB}^{DL,BWP}(N_{RB}^{DL,BWP}+1)/2) \rceil$ bits if only resource allocation type 1 is configured, or
  - max ( $\lceil \log_2(N_{RB}^{DL,BWP}(N_{RB}^{DL,BWP}+1)/2) \rceil$, $N_{RBG}$)+1 bits if both resource allocation type 0 and 1 are configured.
  - If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  - For resource allocation type 0, the $N_{RBG}$ LSBs provide the resource allocation as defined in Subclause 5.1.2.2.1 of [6, TS 38.214],
  - For resource allocation type 1,the $\lceil \log_2( N_{RB}^{DL,BWP}(N_{RB}^{DL,BWP}+1)/2) \rceil$ LSBs provide the resource allocation as defined in Subclause 5.1.2.2.2 of [6, TS 38.214]
  - If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
- Time domain resource assignment- 0, 1, 2, 3, or 4 bits as defined in Subclause 5.1.2.1 of [6, TS 38.214], The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.
- VRB-to-PRB mapping- 0 or 1 bit:
  - 0 bit if only resource allocation type 0 is configured or if interleaved VRB-to-PRB mapping is not configured by high layers;
  - 1 bit according to Table 7.3.1.2.2-5 otherwise, only applicable to resource allocation type 1, as defined in Subclause 7.3.1.6 of [4, TS 38.211],
- PRB bundling size indicator- 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214],
- Rate matching indicator- 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
- ZP CSI-RS trigger- 0, 1, or 2 bits as defined in Subclause 5.1.4.2 of [6, TS 38.214], The bitwidth for this field is determined as $\lceil \log_2( n_{ZP} + 1) \rceil$ bits, where $n_{ZP}$ is the number of aperiodic ZP CSI-RS resource sets configured by higher layer.
For transport block 1:
  - Modulation and coding scheme- 5 bits as defined in Subclause 5.1.3.1 of [6, TS 38.214]
  - New data indicator- 1 bit
  - Redundancy version- 2 bits as defined in Table 7.3.1.1.1-2
For transport block 2 (only present if maxNrofCodeWordsScheduledByDCI equals 2):
  - Modulation and coding scheme- 5 bits as defined in Subclause 5.1.3.1 of [6, TS 38.214]
  - New data indicator- 1 bit
  - Redundancy version- 2 bits as defined in Table 7.3.1.1.1-2
  If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.

TABLE 7-continued

- HARQ process number- 4 bits
- Downlink assignment index- number of bits as defined in the following
    - 4 bits if more than one serving cell are configured in the DL and the higher layer parameter pdsch-HARQ-ACK-Codebook=dynamic, where the 2 MSB bits are the counter DAI and the 2 LSB bits are the total DAI;
    - 2 bits if only one serving cell is configured in the DL and the higher layer parameter pdsch-HARQ-ACK-Codebook=dynamic, where the 2 bits are the counter DAI;
    - 0 bits otherwise.
- TPC command for scheduled PUCCH- 2 bits as defined in Subclause 7.2.1 of [5, TS 38.213]
- PUCCH resource indicator- 3 bits as defined in Subclause 9.2.3 of [5, TS 38.213]
- PDSCH-to-HARQ_feedback timing indicator- 0, 1, 2, or 3 bits as defined in Subclause 9.2.3 of [5, TS 38.213], The bitwidth for this field is determined as $\lceil \log_2(I) \rceil$ bits, where I is the number of entries in the higher layer parameter dl-DataToUL-ACK.
- Antenna port(s)- 4, 5, or 6 bits as defined by Tables 7.3.1.2.2-1/2/3/4, where the number of CDM groups without data of values 1, 2, and 3 refers to CDM groups {0}, {0,1}, and {0, 1,2} respectively. The antenna ports $\{p_0,...,p_{v-1}\}$ shall be determined according to the ordering of DMRS port(s) given by Tables 7.3.1.2.2-1/2/3/4.
  If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
- Transmission configuration indication- 0 bit if higher layer parameter tci-PresentInDCI is not enabled; otherwise 3 bits as defined in Subclause 5.1.5 of [6, TS38.214],
  If "Bandwidth part indicator" field indicates a bandwidth part other than the active bandwidth part,
    - if the higher layer parameter tci-PresentInDCI is not enabled for the CORESET used for the PDCCH carrying the DCI format 1_1,
        - the UE assumes tci-PresentInDCI is not enabled for all CORESETs in the indicated bandwidth part;
    - otherwise,
        - the UE assumes tci-PresentInDCI is enabled for all CORESETs in the indicated bandwidth part.
- SRS request- 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214],
- CBG transmission information (CBGTI)- 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
- CBG flushing out information (CBGFI)- 1 bit if higher layer parameter codeBlockGroupFlushIndicator is configured as "TRUE", 0 bit otherwise.
- DMRS sequence initialization- 1 bit.

Hereinafter, a method of allocating time domain resources for data channels in a 5G communication system will be described.

The base station may set a table for time domain resource allocation information on a physical downlink shared channel (PDSCH) and a physical uplink shared channel (PUSCH) to the UE through higher layer signaling (e.g., RRC signaling). For the PDSCH, the base station may set a table consisting of the maxNrofDL-Allocations=16 number of entries, and for the PUSCH, the base station may set a table consisting of the maxNrofUL-Allocations=16 number of entries. The time domain resource allocation information may include, for example, PDCCH-to-PDSCH slot timing (corresponding to a time interval in units of slots between a time point at which a PDCCH is received and a time point at which a PDSCH scheduled by the received PDCCH is transmitted, denoted as K0) or PDCCH-to-PUSCH slot timing (corresponding to a time interval in units of slots between a time point at which a PDCCH is received and a time point at which a PUSCH scheduled by the received PDCCH is transmitted, denoted as K2), information on a position and length of a start symbol in which the PDSCH or PUSCH is scheduled within the slot, and a PDSCH or PUSCH mapping type. For example, information such as Table 8 and Table 9 may be notified from the base station to the UE.

TABLE 9

| PUSCH-TimeDomainResourceAllocation information element |
|---|

PUSCH-TimeDomainResourceAllocationList ::=    SEQUENCE    (SIZE(1..maxNrofUL-Allocations)) OF PUSCH-TimeDomainResourceAllocation
PUSCH-TimeDomainResourceAllocation ::=    SEQUENCE {
   k2                            INTEGER (0..32)        OPTIONAL,
-- Need S
   (PDCCH-to-PUSCH timing, slot unit)
   mappingType                    ENUMERATED {typeA, typeB},
   (PUSCH mapping type)
   startSymbolAndLength            INTEGER (0..127)
   (start symbol and length of PUSCH)
}

TABLE 8

| PDSCH-TimeDomainResourceAllocationList information element |
|---|

PDSCH-TimeDomainResourceAllocationList      ::=    SEQUENCE    (SIZE(1..maxNrofDL-Allocations)) OF PDSCH-TimeDomainResourceAllocation
PDSCH-TimeDomainResourceAllocation ::=    SEQUENCE {
   k0                                          INTEGER (0..32)
OPTIONAL, -- Need S
   (PDCCH-to-PDSCH timing, slot unit)
mappingType                    ENUMERATED {typeA, typeB},
   (PDSCH mapping type)
startSymbolAndLength                    INTEGER (0..127)
(start symbol and length of PDSCH)
}

The base station may notify the UE of one of table entries for the time domain resource allocation information through L1 signaling (e.g., DCI) (e.g., may be indicated by a 'time domain resource allocation' field in the DCI). The UE may acquire time domain resource allocation information on the PDSCH or PUSCH based on the DCI received from the base station.

Hereinafter, a method of allocating frequency domain resources for a data channel in a 5G communication system will be described.

5G supports two types, a resource allocation type 0 and a resource allocation type 1 with a method of indicating frequency domain resource allocation information on a physical downlink shared channel (PDSCH) and a physical uplink shared channel (PUSCH).

Resource Allocation Type 0

RB allocation information may be notified from the base station to the UE in the form of a bitmap for a resource block group (RBG). In this case, the RBG may be composed of a set of consecutive VRBs (Virtual RBs), and a size P of the RBG may be determined based on a value set by an upper layer parameter (rbg-Size) and a size value of a bandwidth part defined in Table 10.

TABLE 10

| Nominal RBG size P | | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The number $N_{RBG}$ of total RBGs of a bandwidth part i of a size $N_{BWP,i}^{size}$ may be defined as follows.

$N_{RBG}=[(N_{BWP,i}^{size}+(N_{BWP,i}^{start} \bmod P))/P]$, where the size of the first RBG is $RBG_0^{size}=P-N_{BWP,i}^{size} \bmod P$, the size of last RBG is $RBG_{last}^{size}=(N_{BWP,i}^{start}+N_{BWP,i}^{size}) \bmod P$ if $(N_{BWP,i}^{start}+N_{BWP,i}^{size}) \bmod P>0$ and P otherwise, the size of all other RBGs is P.

Each bit of an $N_{RBG}$ bit-sized bitmap may correspond to each RBG. RBGs may be indexed in order of frequency increasing starting from a lowest frequency position of the bandwidth part. For the $N_{RBG}$ number of RBGs in the bandwidth part, an RBG #0 to an RBG #$N_{RBG}-1$ may be mapped from MSB to LSB of the RBG bitmap. In the case that a specific bit value in the bitmap is 1, the UE may determine that an RBG corresponding to the corresponding bit value has been allocated, and in the case that a specific bit value in the bitmap is 0, the UE may determine that an RBG corresponding to the corresponding bit value has not been allocated.

Resource Allocation Type 1

Information on start positions and lengths of VRBs in which RB allocation information is contiguously allocated may be notified from the base station to the UE. In this case, interleaving or non-interleaving may be additionally applied to the contiguously allocated VRBs. A resource allocation field of the resource allocation type 1 may be composed of a resource indication value (RIV), and the RIV may be composed of a start point $RB_{start}$ of the VRB and a length $L_{RBs}$ of consecutively allocated RBs. More specifically, the RIV within the bandwidth part of the size $N_{BWP}^{size}$ may be defined as follows.

if $(L_{RBs}-1) \le \lfloor N_{BWP}^{size}/2 \rfloor$ then $RIV=N_{BWP}^{size}(L_{RBs}-1)+RB_{start}$ else $RIV=N_{BWP}^{size}(N_{BWP}^{size}-L_{RBs}-1)+(N_{BWP}^{size}-1-RB_{start})$ where $L_{RBs} \ge 1$ and shall not exceed $N_{BWP}^{size}-RB_{start}$.

The base station may set the resource allocation type to the UE through higher layer signaling (e.g., a higher layer parameter resourceAllocation may be set to one of resourceAllocationType0, resourceAllocationType1, and dynamicSwitch). When the UE receives a setting of both resource allocation types 0 and 1 (or when the upper layer parameter resourceAllocation is equally set to dynamicSwitch), the UE may indicate whether a bit corresponding to a most significant bit (MSB) of a field indicating resource allocation in the DCI format indicating scheduling is a resource allocation type 0 or a resource allocation type 1, and resource allocation information may be indicated through the remaining bits, except for the bit corresponding to the MSB based on the indicated resource allocation type, and the UE may interpret the resource allocation field information of the DCI field based on this. When the UE is set to either the resource allocation type 0 or the resource allocation type 1 (or when the upper layer parameter resourceAllocation is equally set to one of resourceAllocationType0 or resourceAllocationType1), resource allocation information may be indicated based on the resource allocation type in which a field indicating resource allocation in the DCI format indicating scheduling is set, and the UE may interpret the resource allocation field information of the DCI field based on this.

Hereinafter, a downlink control channel in a 5G communication system will be described in more detail with reference to the drawings.

Figure 8:
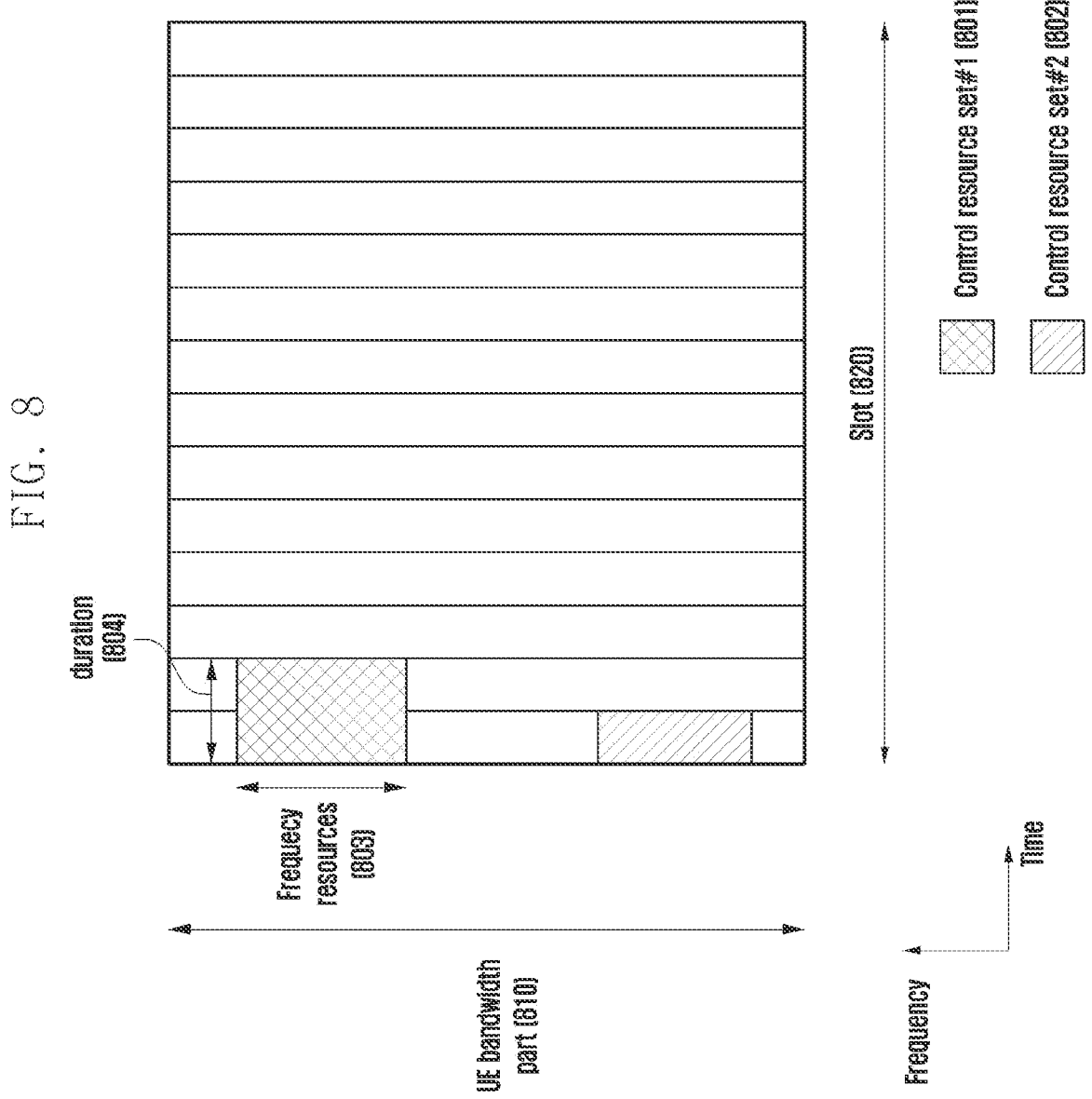
FIG. 8 is a diagram illustrating an example of a structure of a control resource set in a wireless communication system according to various embodiments of the disclosure.

FIG. 8 illustrates a structure of a control resource set in a wireless communication system according to various embodiments of the disclosure.

Specifically, FIG. 8 illustrates an example of a control resource set (CORESET) in which a downlink control channel is transmitted in a 5G wireless communication system. FIG. 8 illustrates an example in which a UE bandwidth part 810 on the frequency axis and in which two CORESETs (CORESET #1, 801 and CORESET #2, 802 within 1 slot 820 on the time axis are set. The CORESETs 801 and 802 may be set to a specific frequency resource 803 within the entire UE bandwidth part 810 on the frequency axis. The time axis may be set to one or a plurality of OFDM symbols, and this may be defined to CORESET duration 804.

With reference to FIG. 8, the CORESET #1, 801 is set to CORESET duration of 2 symbols, and the CORESET #2, 802 is set to CORESET duration of 1 symbol.

The above-described CORESET in 5G may be set by the base station to the UE through higher layer signaling (e.g., system information, master information block (MIB), radio resource control (RRC) signaling). Setting the CORESET to the UE means providing information such as a CORESET identifier, a frequency position of the CORESET, and a symbol length of the CORESET. For example, setting information of the CORESET may include information of Table 11.

TABLE 11

```
ControlResourceSet ::=              SEQUENCE {
    -- Corresponds to L1 parameter 'CORESET-ID'
    controlResourceSetId
    ControlResourceSetId,
    (Control Resource Set Identity))
    frequencyDomainResources          BIT STRING (SIZE (45)),
    (Frequency domain resources allocation information)
    duration                          INTEGER
    (1..maxCoReSetDuration),
    (Time domain resources allocation information)
```

TABLE 11-continued

```
    cce-REG-MappingType                CHOICE {
    (CCE-to-REG mapping type)
        interleaved
        SEQUENCE {
            reg-BundleSize
        ENUMERATED {n2, n3, n6},
        (REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
                OPTIONAL
            (interleaver shift)
    },
    nonInterleaved                     NULL
    },
    tci-StatesPDCCH
    SEQUENCE(SIZE (1..maxNrofTCI-StatesPDCCH)) OF TCI-StateId
            OPTIONAL,
    (QCL configuration information)
    tci-PresentInDCI                   ENUMERATED
{enabled}
            OPTIONAL,  -- Need S
}
```

In Table 11, the tci-StatesPDCCH (simply referred to as a transmission configuration indication (TCI) state) setting information may include one or a plurality of synchronization signal (SS)/physical broadcast channel (PBCH) block index information or channel state information reference signal (CSI-RS) index information in a quasi co located (QCL) relationship with a DMRS transmitted in the corresponding CORESET.

Figure 9:
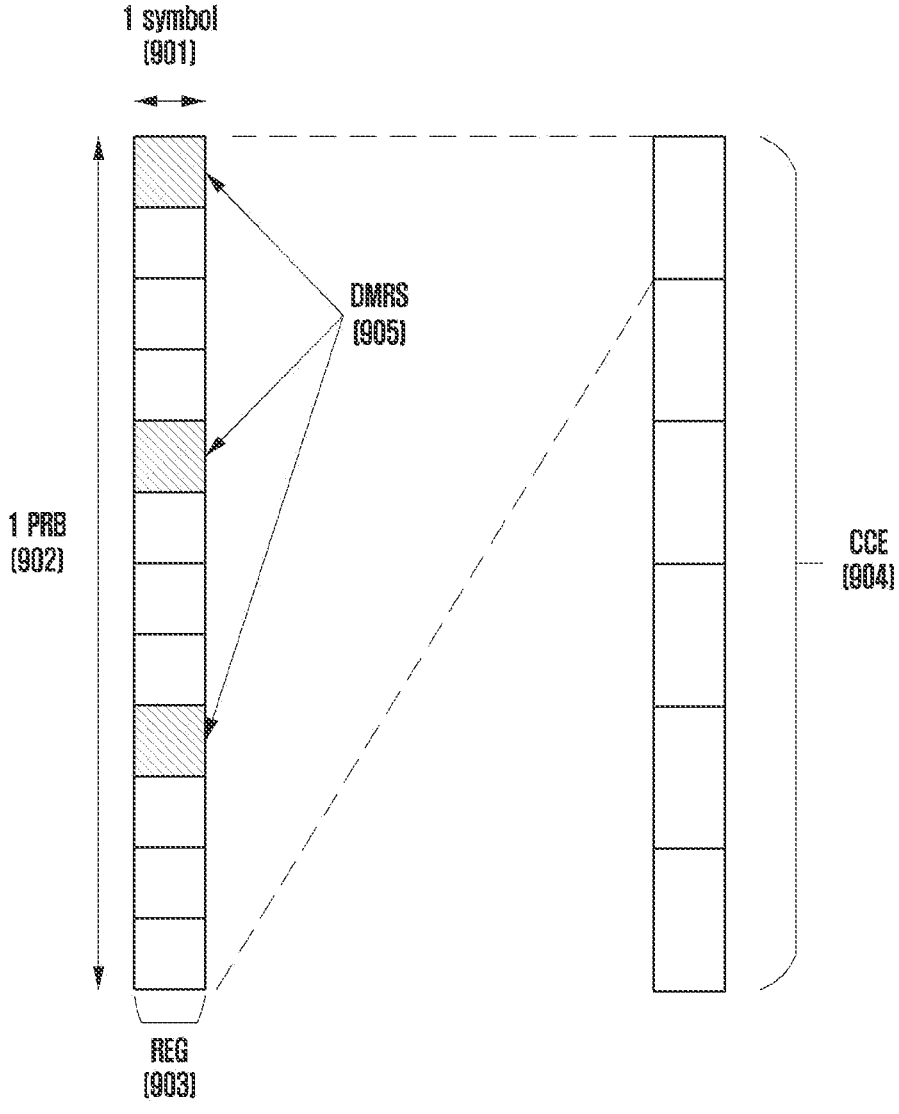
FIG. 9 is a diagram illustrating an example of units of time and frequency resources constituting a downlink control channel of a wireless communication system according to various embodiments of the disclosure.

FIG. 9 illustrates a resource structure in a wireless communication system according to various embodiments of the disclosure.

Specifically, FIG. 9 illustrates an example of a basic unit of time and frequency resources constituting a downlink control channel that may be used in 5G.

With reference to FIG. 9, a basic unit of time and frequency resources constituting the control channel may be referred to as a resource element group (REG) 903, and the REG 903 may be defined to 1 OFDM symbol 901 on the time axis and be defined to 1 physical resource block (PRB) 902, that is, 12 subcarriers on the frequency axis. The base station may constitute a downlink control channel allocation unit by concatenating the REGs 903.

With reference to FIG. 9, in 5G, in the case that a basic unit to which a downlink control channel is allocated is a control channel element (CCE) 904, 1 CCE 904 may be composed of a plurality of REGs 903. When the REG 903 illustrated in FIG. 9 is exemplified, the REG 903 may be composed of 12 REs, and when 1 CCE 904 is composed of 6 REGs 903, 1 CCE 904 may be composed of 72 REs. When a downlink CORESET is set, the corresponding area may be composed of a plurality of CCEs 904, and a specific downlink control channel may be mapped and transmitted to one or a plurality of CCEs 904 according to an aggregation level (AL) in the CORESET. CCEs 904 in the CORESET are classified by the number, and in this case, the number of the CCEs 904 may be assigned according to a logical mapping method.

With reference to FIG. 9, a basic unit, that is, the REG 903 of the downlink control channel may include both REs to which DCI is mapped and an area to which a DMRS 905, which is a reference signal for decoding the REs, is mapped. As illustrated in FIG. 9, three DMRSs 905 may be transmitted within 1 REG 903. The number of CCEs required to transmit the PDCCH may be 1, 2, 4, 8, or 16 according to an aggregation level (AL), and the numbers of different CCEs may be used for implementing link adaptation of the downlink control channel. For example, in the case that AL=L, one downlink control channel may be transmitted through the L number of CCEs. The UE should detect a signal without knowing information on a downlink control channel, and a search space representing a set of CCEs is defined for blind decoding. The search space is a set of downlink control channel candidates consisting of CCEs in which the UE should attempt to decode on a given aggregation level, and because there are various aggregations levels that make one group with 1, 2, 4, 8, and 16 CCEs, the UE may have a plurality of search spaces. A search space set may be defined as a set of search spaces in all set aggregation levels.

The search space may be classified into a common search space and a UE-specific search space. A certain group of UEs or all UEs may search for a common search space of the PDCCH in order to receive cell-common control information such as dynamic scheduling for system information or paging messages. For example, PDSCH scheduling allocation information for transmission of SIB including cell operator information may be received by searching for the common search space of the PDCCH. In the case of the common search space, because a certain group of UEs or all UEs should receive the PDCCH, the common search space may be defined as a set of pre-promised CCEs. Scheduling assignment information on the UE-specific PDSCH or PUSCH may be received by searching for the UE-specific search space of the PDCCH. The UE-specific search space may be defined UE-specifically as a function of various system parameters and the identity of the UE.

In 5G, a parameter for a search space for a PDCCH may be set from the base station to the UE through higher layer signaling (e.g., SIB, MIB, RRC signaling). For example, the base station may set the number of PDCCH candidates at each aggregation level L, a monitoring period for the search space, a monitoring occasion in symbol units within a slot for the search space, a search space type (common search space or UE-specific search space), a combination of a DCI format and an RNTI to be monitored in a corresponding search space, and a CORESET index to monitor a search space to the UE. For example, the parameter for the search space for the PDCCH may include information of Table 12.

TABLE 12

| SearchSpace ::= | SEQUENCE { |
|---|---|
| -- Identity of the search space. SearchSpaceId = 0 identifies the SearchSpace configured via PBCH (MIB) or ServingCellConfigCommon. | |
| searchSpaceId | SearchSpaceId, |
| (search space ID) | |
| controlResourceSetId | |
| ControlResourceSetId, | |
| (control resource set ID) | |
| monitoringSlotPeriodicityAndOffset | CHOICE { |
| (monitoring slot periodicity and offset) | |
| sl1 | |
| NULL, | |
| sl2 | |
| INTEGER (0..1), | |
| sl4 | |
| INTEGER (0..3), | |
| sl5 | |
| INTEGER (0..4), | |
| sl8 | |
| INTEGER (0..7), | |
| sl10 | |

TABLE 12-continued

| | |
|---|---|
| INTEGER (0..9), | |
| sl16 | |
| INTEGER (0..15), | |
| sl20 | |
| INTEGER (0..19) | |
| } | |
| | OPTIONAL, |
| duration(monitoring length) | INTEGER {2..2559} |
| monitoringSymbolsWithinSlot | BIT STRING |
| (SIZE (14)) | |
| OPTIONAL, | |
| (monitoring symbols within slot) | |
| nrofCandidates | SEQUENCE { |
| (number of PDCCH candidates per aggregation level) | |
| aggregationLevel1 | ENUMERATED |
| {n0, n1, n2, n3, n4, n5, n6, n8}, | |
| aggregationLevel2 | ENUMERATED |
| {n0, n1, n2, n3, n4, n5, n6, n8}, | |
| aggregationlevel4 | ENUMERATED |
| {n0, n1, n2, n3, n4, n5, n6, n8}, | |
| aggregationlevel8 | ENUMERATED |
| {n0, n1, n2, n3, n4, n5, n6, n8}, | |
| aggregationlevel16 | ENUMERATED |
| {n0, n1, n2, n3, n4, n5, n6, n8} | |
| }, | |
| searchSpaceType | CHOICE { |
| (search space type) | |
| -- Configures this search space as common search space (CSS) and | |
| DCI formats to monitor. | |
| common | |
| SEQUENCE { | |
| (common search space) | |
| } | |
| ue-Specific | |
| SEQUENCE { | |
| (UE-specific search space) | |
| -- Indicates whether the UE monitors in this USS for DCI | |
| formats 0-0 and 1-0 or for formats 0-1 and 1-1. | |
| formats | |
| ENUMERATED {formats0-0-And-1-0, formats0-1-And-1-1}, | |
| ... | |
| } | |

According to setting information, the base station may set one or a plurality of search space sets to the UE. For example, the base station may set a search space set 1 and a search space set 2 to the UE, set to monitor a DCI format A scrambled with an X-RNTI in the search space set 1 by the UE in the common search space, and set to monitor a DCI format B scrambled with a Y-RNTI in the search space set 2 by the UE in the UE-specific search space.

According to setting information, one or a plurality of search space sets may exist in a common search space or a UE-specific search space. For example, a search space set #1 and a search space set #2 may be set to common search spaces, and a search space set #3 and a search space set #4 may be set to UE-specific search spaces.

In the common search space, a combination of the following DCI format and RNTI may be monitored. Various embodiments of the disclosure are not limited to the following examples.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the following DCI format and RNTI may be monitored. Various embodiments of the disclosure are not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

C-RNTI (Cell RNTI): Used for scheduling a UE-specific PDSCH

MCS-C-RNTI (modulation coding scheme C-RNTI): Used for scheduling a UE-specific PDSCH TC-RNTI (Temporary Cell RNTI): Used for scheduling a UE-specific PDSCH CS-RNTI (Configured Scheduling RNTI): Used for scheduling a semi-statically set UE-specific PDSCH RA-RNTI (Random Access RNTI): Used for scheduling a PDSCH in a random access step P-RNTI (Paging RNTI): Used for scheduling a PDSCH through which paging is transmitted SI-RNTI (System Information RNTI): Used for scheduling a PDSCH through which system information is transmitted INT-RNTI (Interruption RNTI): Used for notifying whether puncturing for a PDSCH is performed TPC-PUSCH-RNTI (Transmit Power Control for PUSCH RNTI): Used for indicating a power control command for a PUSCH TPC-PUCCH-RNTI (Transmit Power Control for PUCCH RNTI): Used for indicating a power control command for a PUCCH TPC-SRS-RNTI (Transmit Power Control for SRS RNTI): Used for indicating a power control command for an SRS The above-described specified DCI formats may follow the definition of Table 13.

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the CORESET p and the search space set s may be expressed as Equation 1.

$$L \cdot \left\{ \left( \left[ Y_{p,n_{s,f}^\mu} + \left\lfloor \frac{m_{s,n_{CI}} \cdot N_{CCE,p}}{L \cdot M_{p,s,max}^{(i)}} \right\rfloor + n_{CI} \right) \bmod \lfloor N_{CCE,p}/L \rfloor \right\} + i \qquad \text{Equation 1}$$

L: aggregation level $n_{CI}$: Carrier index $N_{CCE,p}$: the number of total CCEs present in the CORE-SET p $n_{s,f}^\mu$: slot index $M_{s,max}^{(L)}$: the number of PDCCH candidates at an aggregation level L $m_{s,n_{CI}} = 0, \ldots, M_{s,max}^{(L)}-1$: PDCCH candidate index of the aggregation level L $i = 0, \ldots, L-1$ $Y_{p,n_{s,f}^\mu} = (A_p \cdot Y_{p,n_{s,f}^\mu} - 1) \bmod D$, $Y_{p,-1} = n_{RNTI} \neq 0$, $A_0 = 39827$ $A_1 = 39829$, $A_2 = 39839$, $D = 65537$ nRNTI: UE identifier The $Y_(p,n\mu s,f)$ value may correspond to 0 in the case of a common search space.

The Y (p,n$\mu$s,f) value may correspond to a value that changes according to the identity (C-RNTI or ID set to the UE by the base station) of the UE and time index in the case of a UE-specific search space.

FIG. 10 illustrates a process of discontinuous reception (DRX) in a wireless communication system according to various embodiments of the disclosure.

Specifically, FIG. 10 is a diagram illustrating DRX.

DRX is an operation in which the UE using a service discontinuously receives data in an RRC connected state that a radio link is established between the base station and the UE. When DRX is applied, the UE may turn on a receiver at a specific time point to monitor a control channel, and turn off the receiver when there is no data received for a predetermined time period to reduce power consumption of the UE. A DRX operation may be controlled by an MAC layer device based on various parameters and timers.

With reference to FIG. 10, an active time 1005 is a time in which the UE wakes up every DRX cycle and monitors a PDCCH. The active time 1005 may be defined as follows.

drx-onDurationTimer or drx-InactivityTimer or drx-RetransmissionTimerDL or drx-RetransmissionTimerUL or ra-ContentionResolutionTimer is running; or a scheduling request is sent on PUCCH and is pending; or a PDCCH indicating a new transmission addressed to the C-RNTI of the MAC entity has not been received after successful reception of a random access response for the random access preamble not selected by the medium access control (MAC) entity among the contention-based random access preamble The drx-onDurationTimer, drx-InactivityTimer, drx-RetransmissionTimerDL, drx-RetransmissionTimerUL, and ra-ContentionResolutionTimer are timers whose values are set by the base station, and have a function of setting to monitor a PDCCH by the UE in a situation in which a predetermined condition is satisfied.

A drx-onDurationTimer 1015 is a parameter for setting the minimum time in which the UE is awake in a DRX cycle. A drx-InactivityTimer 1020 is a parameter for setting an additional awake time of the UE in the case that the UE receives a PDCCH indicating new uplink transmission or downlink transmission (1030). The drx-RetransmissionTimerDL is a parameter for setting the maximum awake time of the UE in order to receive downlink retransmission in a downlink HARQ procedure. The drx-RetransmissionTimerUL is a parameter for setting the maximum awake time of the UE in order for the UE to receive an uplink retransmission grant in an uplink HARQ procedure. The drx-onDurationTimer, drx-InactivityTimer, drx-RetransmissionTimerDL, and drx-RetransmissionTimerUL may be set as, for example, a time, the number of subframes, and the number of slots. The ra-ContentionResolutionTimer is a parameter for the UE to monitor the PDCCH in a random access procedure.

An inactive time 1010 is a time during which the UE is set not to monitor the PDCCH or/and not to receive the PDCCH during a DRX operation, and may be the remaining time excluding the active time 1005 from the total time for performing the DRX operation. When the UE does not monitor the PDCCH during the active time 1005, the UE may enter a sleep or inactive state to reduce power consumption.

The DRX cycle refers to a cycle in which the UE wakes up and monitors the PDCCH. That is, the DRX cycle means a time interval or an on-duration occurrence cycle until the UE monitors the next PDCCH after monitoring the PDCCH. There are two types of DRX cycles of a short DRX cycle and a long DRX cycle. The short DRX cycle may be optionally applied.

A long DRX cycle 1025 is a long DRX cycle among two DRX cycles set to the UE. While the UE operates in a long DRX cycle, the drx-onDurationTimer 1015 is again started at a time point elapsed by the long DRX cycle 1025 from a start point (e.g., start symbol) of the drx-onDurationTimer 1015. In the case of operating in the long DRX cycle 1025, the UE may start the drx-onDurationTimer 1015 in a slot after drx-SlotOffset in a subframe satisfying Equation 2. Here, the drx-SlotOffset means a delay before starting the drx-onDurationTimer 1015. The drx-SlotOffset may be set to, for example, a time, the number of slots, and the like.

$$[(SFN \times 10) + \text{subframe number}] \bmod (drx\text{-Long-} \\ \text{Cycle}) = drx\text{-StartOffset} \qquad \text{Equation 2}$$

In this case, the drx-LongCycleStartOffset may include a long DRX cycle 1025 and drx-StartOffset and be used for defining a subframe to start the long DRX cycle 1025. The drx-LongCycleStartOffset may be set as, for example, a time, the number of subframes, and the number of slots.

The short DRX cycle is a short DRX cycle among two DRX cycles defined to the UE. While the UE operates in a long DRX cycle 1025, when a predetermined event, for example, the case of receiving (1030) a PDCCH indicating new uplink transmission or downlink transmission occurs in the active time 1005, the UE starts or restarts the drx-InactivityTimer 1020, and in the case that the drx-InactivityTimer 1020 expires or a DRX command MAC control element (CE) is received, the UE may operate in a short DRX cycle. As an example, in FIG. 10, the UE may start drx-ShortCycleTimer at an expiration time point of the previous drx-onDurationTimer 1015 or the drx-Inactivity-Timer 1020, and operate in a short DRX cycle until the drx-ShortCycleTimer expires. In the case that the UE receives (1030) a PDCCH indicating new uplink transmission or downlink transmission, the UE may expect additional uplink transmission or downlink transmission in the future to extend an active time 1005 or delay the arrival of the inactive time 1010. While operating in a short DRX cycle, the UE again starts the drx-onDurationTimer 1015 at a time point at which a short DRX cycle has elapsed from a starting point of the previous on duration. Thereafter, when the drx-ShortCycleTimer expires, the UE operates again in the long DRX cycle 1025.

In the case of operating in a short DRX cycle, the UE may start the drx-onDurationTimer 1015 after drx-SlotOffset in a subframe that satisfies Equation 3. Here, the drx-SlotOffset means a delay before starting the drx-onDurationTimer 1015. The drx-SlotOffset may be set to, for example, a time and the number of slots.

$$\lfloor (SFN \times 10) + \text{subframe number} \rfloor \bmod (drx\text{-Short-} \\ \text{Cycle}) = (drx\text{-StartOffset}) \bmod (drx\text{-ShortCycle}) \qquad \text{Equation 3}$$

Here, drx-ShortCycle and drx-StartOffset may be used for defining a subframe to start a short DRX cycle. drx-Short-Cycle and drx-StartOffset may be set as, for example, a time, the number of subframes, and the number of slots.

The DRX operation has been, described with reference to FIG. 10. According to an embodiment, by performing a DRX operation, the UE may reduce power consumption thereof. However, even if the UE performs the DRX operation, the UE does not always receive a PDCCH related to the UE in the active time 1005. Accordingly, in an embodiment of the disclosure, in order to more efficiently save power of the UE, a signal for controlling an operation of a UE may be provided.

Hereinafter, a carrier aggregation and scheduling method in a 5G communication system will be described in detail.

The UE may access a primary cell (PCell) through initial access, and the base station may additionally set one or a plurality of secondary cells (SCell) to the UE. The UE may perform communication through serving cells including primary cells and secondary cells set by the base station.

The base station may additionally set whether to perform cross-carrier scheduling for cells set to the UE. For convenience of description, in the case that cross-carrier scheduling is set to the UE, a cell performing scheduling (i.e., a cell receiving downlink control information corresponding to downlink allocation or uplink grant) is referred to as a "first cell", and a cell in which scheduling is performed (i.e., a cell in which downlink or uplink data is actually scheduled and transmitted and received based on downlink control information) is referred to as a "second cell". When the UE receives a setting of cross-carrier scheduling for a specific cell A (scheduled cell) from the base station (in this case, the cell A corresponds to the "second cell"), the UE may not perform PDCCH monitoring for the cell A in the cell A, but may perform PDCCH monitoring for the cell A in another cell B indicated by cross-carrier scheduling, that is, a scheduling cell (in this case, the cell B corresponds to the "first cell"). For the purpose of setting cross-carrier scheduling to the UE, the base station may set information on the "first cell" performing scheduling on the "second cell" (e.g., a cell index of a cell corresponding to the "first cell"), and a carrier indicator field (CIF) value for the "second cell". For example, setting information of Table 14 may be notified from the base station to the UE through higher layer signaling (e.g., RRC signaling).

TABLE 14

| | |
|---|---|
| CrossCarrierSchedulingConfig ::= | SEQUENCE { |
| schedulingCellInfo | CHOICE { |
| own (self carrier scheduling) | SEQUENCE {    - |
| No cross carrier scheduling | |
| cif-Presence | BOOLEAN |
| }, | |
| other (cross carrier scheduling) | SEQUENCE {    - |
| Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The UE may monitor a PDCCH for a cell set by cross-carrier scheduling in a cell corresponding to a "first cell". The UE may determine an index of a cell scheduled by DCI received from a carrier indicator field value in a DCI format scheduling data and transmit and receive data in a cell indicated by a carrier indicator based on this.

A cell to be scheduled (cell A) and a scheduling cell (cell B) may be set with different numerologies. Here, the numerology may include subcarrier spacing, a cyclic prefix, and the like. In the case, that the cell A and the cell B have different numerologies, when a PDCCH of the cell B schedules a PDSCH of the cell A, the following minimum scheduling offset may be additionally considered between the PDCCH and the PDSCH.

[Cross-Carrier Scheduling Method]

(1) In the case that subcarrier spacing μB of the cell B is smaller than subcarrier spacing μA of the cell A, the PDSCH may be scheduled from the corresponding next PDSCH slot after X symbol from a last symbol of a PDCCH received in the cell B. Here, X may vary according to μB, and be defined as X=4 symbols when μB=15 kHz, X=4 symbols when μB=30 kHz, and X=8 symbols when μB=60 kHz.

(2) In the case that subcarrier spacing μB of the cell B is greater than subcarrier spacing μA of the cell A, the PDSCH may be scheduled from the corresponding time point after X symbol from a last symbol of a PDCCH received in the cell B. Here, X may vary according to μB, and be defined as X=4 symbols when μB=30 kHz, X=8 symbols when μB=60 kHz, and X=12 symbols when μB=120 kHz.

Hereinafter, a method of setting a transmission configuration indication (TCI) state, which is a means for indicating or exchanging quasi co-location (QCL) information between the UE and the base station in a 5G communication system, will be described in detail.

The base station may set and indicate a TCI state between two different RSs or channels through appropriate signaling, thereby notifying the QCL relationship between the different RSs or channels. The fact that different RSs or channels are QCLed means that when a channel is estimated through a certain reference RS antenna port A (reference RS #A) and another target RS antenna port B (target RS #B) in the QCL relationship, it is allowed that the UE applies some or all of large-scale channel parameters estimated at the antenna port A to the channel measurement from the antenna port B. QCL may need to associate different parameters according to situations such as 1) time tracking affected by average delay and delay spread, 2) frequency tracking affected by Doppler shift and Doppler spread, 3) radio resource management (RRM) affected by average gain, and 4) beam management (BM) affected by spatial parameters. Accordingly, NR supports four types of QCL relationships as illustrated in Table 15.

TABLE 15

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as an angle of arrival (AoA), power angular spectrum (PAS) of AoA (PAS of AoA), an angle of departure (AoD), PAS of AoD, transmit and receive channel correlation, transmit and receive beamforming, and spatial channel correlation.

The QCL relationship may be set to the UE through an RRC parameter TCI-State and QCL information (QCL-Info), as illustrated in Table 16. With reference to Table 16, the base station sets one or more TCI states to the UE to notify up to two QCL relationships (qcl-Type1, qcl-Type2) for an RS, that is, a target RS referring to an ID of the TCI state. In this case, each QCL information (QCL-Info) included in each TCI state includes a serving cell index and BWP index of the reference RS indicated by the corresponding QCL information, and a type and ID of a reference RS, and a QCL type as illustrated in Table 15.

TABLE 16

```
TCI-State ::=                    SEQUENCE {
    tci-StateId                      TCI-StateId,
    (ID of the corresponding TCI state)
    qcl-Type1                        QCL-Info,
    (QCL information of the first reference RS of RS (target RS) referring
to the corresponding TCI state ID)
    qcl-Type2                        QCL-Info
        OPTIONAL,       -- Need R
    (QCL information of the second reference RS of the RS (target RS)
referring to the corresponding TCI state ID)
    ...
}
QCL-Info ::=                     SEQUENCE {
    cell                             ServCellIndex
        OPTIONAL,       -- Need R
    (the serving cell index of the reference RS indicated by corresponding
QCL information)
    bwp-Id                           Bwp-Id
        OPTIONAL, -- Cond CSI-RS-Indicated
    (BWP index of reference RS indicated by the corresponding QCL information)
    referenceSignal                  CHOICE {
        csi-rs                           NZP-CSI-RS-
ResourceId,
        ssb                              SSB-
Index
        (one of the CSI-RS ID or SSB ID indicated by the corresponding QCL
information)
    },
    qcl-Type                         ENUMERATED {typeA,
typeB, typeC, typeD},
    ...
}
```

Hereinafter, a paging method in a 5G communication system will be described in detail.

Figure 11:
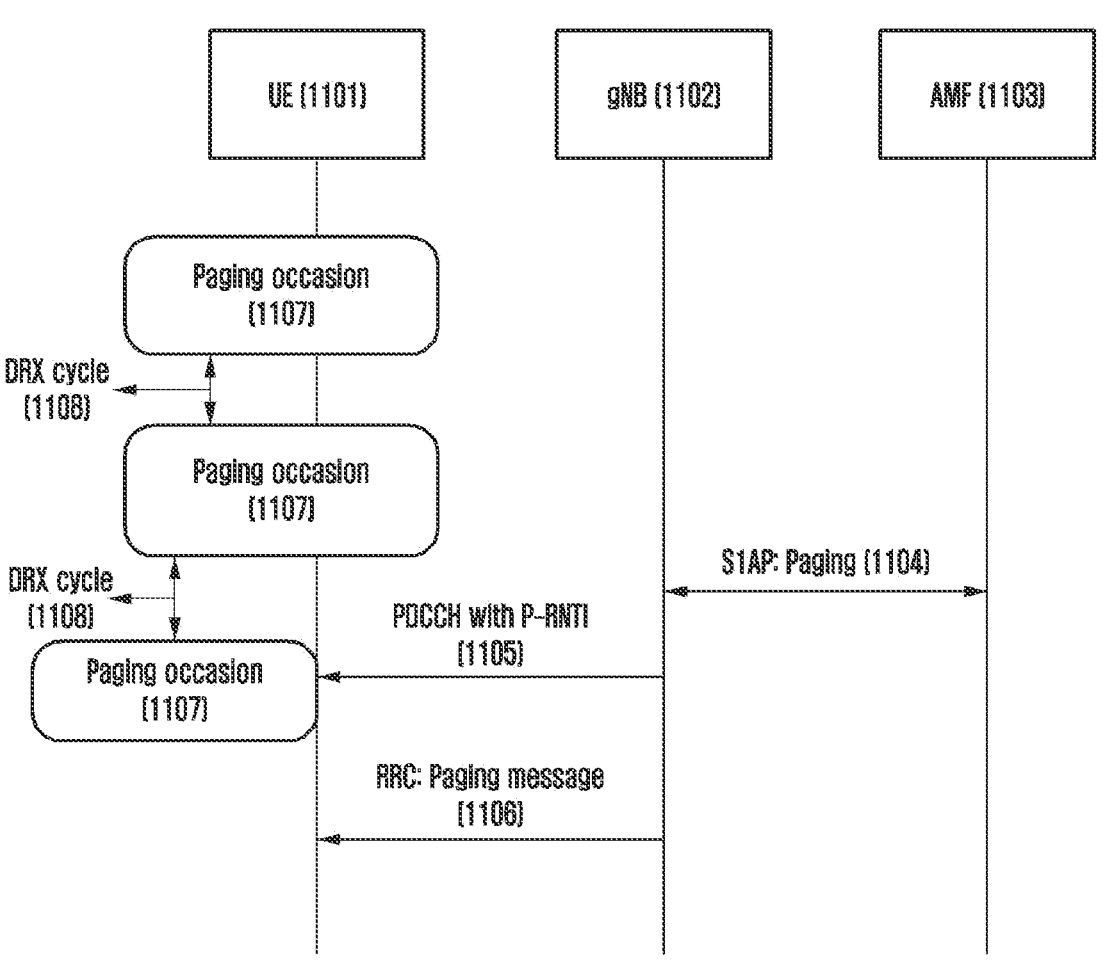
FIG. 11 is a message flow diagram illustrating an example of a paging process in a wireless communication system according to various embodiments of the disclosure.

FIG. 11 illustrates a paging process in a wireless communication system according to various embodiments of the disclosure. Specifically, FIG. 11 is a message flow diagram illustrating a paging procedure of a 5G communication system. When an incoming call to a UE 1101 in an IDLE or INACTIVE state occurs, a paging procedure may be used for notifying the UE 1101 of this, starting network access to the UE 1101, or notifying the UEs 1101 in a CONNECTED state that system information has changed. Paging may be controlled by an access and mobility management entity (AMF) 1103, and a paging message may be transmitted over a plurality of cells in a tracking area (TA). With reference to FIG. 11, paging starts from the AMF 1103 and is delivered to the UE 1101 via a gNB 1102. More specifically, paging is started from the AMF 1103 and is delivered (1104) to the gNB 1102 through S1AP signaling, and then delivered to the UE 1101 through RRC signaling 1106. In this case, the terminal 1101 may monitor a PDCCH 1105 set with a P-RNTI at a paging occasion 1107 to know whether a paging message exists. The paging occasion 1107 may be determined based on a DRX cycle 1108 set by the base station to the terminal. Upon receiving the PDCCH 1105 set with the P-RNTI, the UE may receive the PDSCH including the paging message 1106. The paging message 1106 may include UE ID information of the UE to be woken up by the base station.

An efficient paging procedure should enable the UE 1101 to briefly wake up only at a determined time interval in order to observe paging information from the network while enabling the UE 1101 to rest most of the time without performing a receiving operation. To this end, in NR, a paging occasion (PO) and a paging frame (PF) were defined. The PO may be defined as a subframe or a time point at which a PDCCH set with a P-RNTI for receiving a paging message exists. The PF may be defined as one radio frame including one or a plurality of POs. For example, with reference to FIG. 11, the UE 1101 may observe one PO per DRX cycle 1108.

Figure 12:
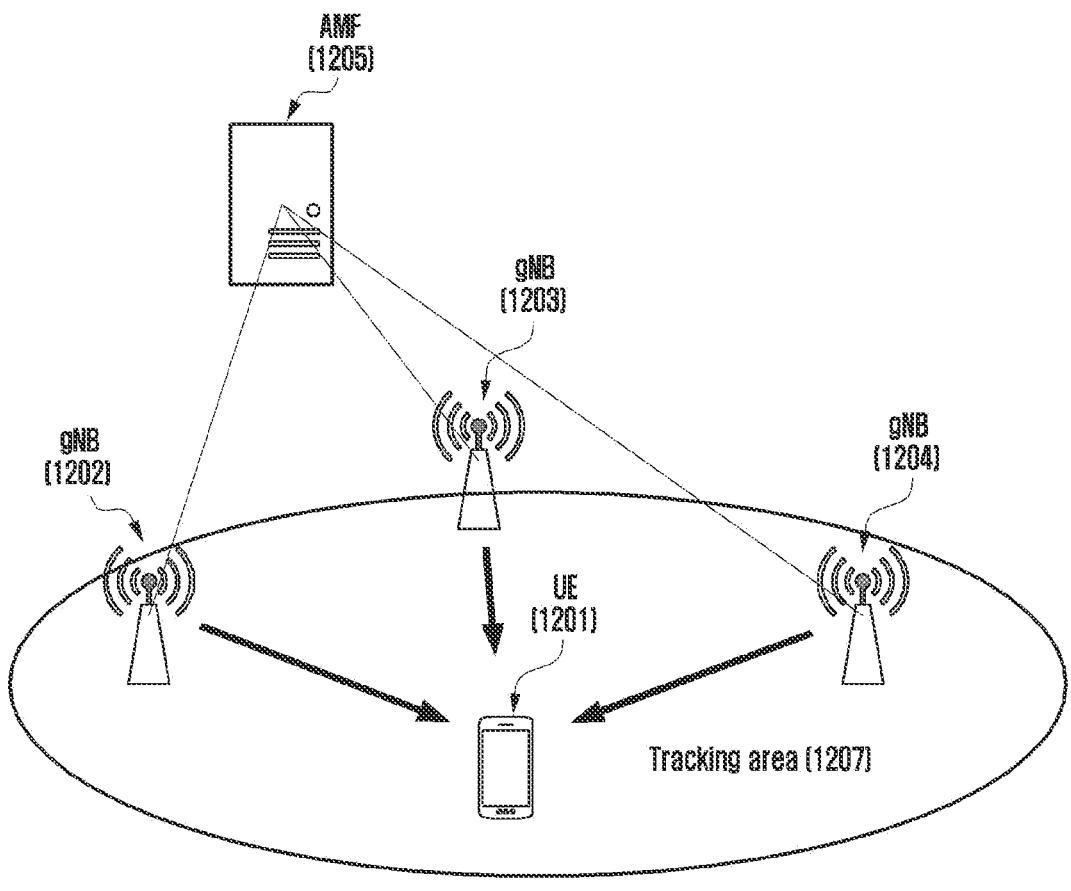
FIG. 12 is a diagram illustrating an example of a paging process in a wireless communication system according to various embodiments of the disclosure.

FIG. 12 illustrates a paging process in a wireless communication system according to various embodiments of the disclosure.

Specifically, FIG. 12 illustrates an example of paging in a 5G communication system. In the case that a UE 1201 is in an RRC_IDLE state, an NR network learns a position of the UE 1201 in units of tracking area (TA) 1207 rather than in units of cells. Upon accessing the NR network, the UE receives allocation of a tracking area identity (TAI) list from an access and mobility management function (AMF) 1205. The UE 1201 may freely move within a cell in the TAI list without updating the AMF 1205. In the case that an incoming call to the UE 1201 occurs, the AMF 1205 delivers the same paging message to all cells 1202, 1203, and 1204 within the TA 1207 currently set to the corresponding UE 1201, and each of the cells 1202, 1203, and 1204 delivers the paging message to the UE 1201. When a cell is (re)selected, the UE 1201 may acquire a tracking area code (TAC) of the corresponding cell through system information (e.g., SIB1) and identify whether the corresponding cell is a cell in a TAI list thereof therefrom. When the TAC of the selected cell is an ID not included in the TAI list, the UE sends a TAU message to the AMF 1205. The AMF 1205 may also give a TAI list when giving a TAU message response (TAU accept) to the UE, and update the corresponding TAI list to the UE according to the movement of a position of the UE.

Hereinafter, an operation of monitoring paging of the UE will be described in detail.

The UE may monitor one paging occasion (PO) per DRX cycle. One PO may be composed of a set of a plurality of PDCCH monitoring occasions, and a slot in which paging DCI may be transmitted may be composed of a plurality of time slots (e.g., subframes or OFDM symbols). One paging frame (PF) may correspond to one radio frame and include a starting point of one or a plurality of POs, or an arbitrary PO.

During multi-beam operation, the UE may assume that the same paging message or the same short message is repeated in all transmission beams. In this case, which beam to select and receive the paging message or the short message may be determined by the implementation of the UE. All paging messages may be the same for radio access network (RAN)-initiated paging and core network (CN)-initiated paging.

In the case that the UE receives RAN-initiated paging, the UE may initiate an RRC connection resume procedure. When the UE receives CN-initiated paging in an RRC_INACTIVE state, the UE may change from the RRC_INACTIVE state to an RRC_IDLE mode and notify it to network attached storage (NAS).

A paging frame (PF) and a paging opportunity (PO) for paging may be determined by the following equation.

A system frame number (SFN) corresponding to a paging frame may be determined by Equation 4. In Equation 4, A mod B may mean a modulo operation that outputs the remainder after dividing A by B.

$$(SFN+PF\_\text{offset}) \bmod T = T \text{ div } N * (UE\_ID \bmod N) \qquad \text{Equation 4}$$

An index (i_s) indicating an index of the paging opportunity may be determined by Equation 5.

$$i\_s = \text{floor}(UE\_ID/N) \bmod Ns \qquad \text{Equation 5}$$

Each parameter of Equation 4 and Equation 5 for determining the above-described paging frame and paging opportunity may be defined as follows.

T: A DRX cycle set to the UE may be set by higher layer signaling (e.g., RRC signaling, system information block (SIB), and the like).)

N: the number of total paging frames within T

Ns: the number of paging occasions for one paging frame

PF_offset: Offset value for determining a time point of the paging frame

UE_ID: A UE ID for determining a paging frame and a paging opportunity may be determined, as illustrated in Equation 6.

$$UE\_ID = 5G\text{-}S\text{-}TMSI \bmod 1024 \qquad \text{Equation 6}$$

A 5G S-temporary mobile subscription identifier (5G-S-TMSI) may, for example, receive by the UE through higher layer signaling. In the case before the UE is not yet registered in a network, the UE may assume a UE_ID to 0. Alternatively, the UE ID for paging may correspond to a parameter determined by an international mobile subscriber identity (IMSI). In the disclosure, a UE ID for paging is generalized and used as a UE_ID. This may include both a value that may be set based on 5G-S-TMSI and a value that may be derived from an IMSI value.

PDCCH (or a PDCCH scrambled with a P-RNTI) monitoring occasions for paging may be determined by a search space setting for paging (e.g., a search space indicated by an upper layer signaling parameter pagingSearchSpace) and setting (e.g., higher layer signaling parameter firstPDCCH-MonitoringOccasionOfPO) information for a first PDCCH monitoring occasion of a paging opportunity and the number of PDCCH monitoring opportunities per SS/PBCH block in the paging opportunity (e.g., higher layer signaling parameter nrofPDCCH-MonitoringOccasionPerSSB-InPO). Definitions of pagingSearchSpace, firstPDCCH-MonitoringOccasionOfPO, and nrofPDCCH-MonitoringOccasionPerSSB-InPO may be specifically the same as that illustrated in Table 17.

TABLE 17

| pagingSearchSpace |
| --- |
| ID of the Search space for paging (see TS 38.213 [13], clause 10.1). If the field is absent, the UE does not receive paging in this BWP (see TS 38.213 [13], clause 10).
| firstPDCCH-MonitoringOccasionOfPO |
| Points out the first PDCCH monitoring occasion for paging of each PO of the PF, see TS 38.304 [20].
| nrofPDCCHMonitoringOccasionPerSSB-InPO |
| The number of PDCCH monitoring occasions corresponding to an SSB for paging, see TS 38.304 [20], clause 7.1. |

In the case that the paging search space is set to a search space with a search space ID of 0, and in the case that Ns=1, one paging opportunity may exist within a paging frame, and in the case that Ns=2, two paging opportunities may exist within a paging frame, a first paging opportunity (i_s=0) may exist in a first half frame within the paging frame, and a second paging opportunity (i_s=1) may exist in a second half frame within the paging frame (half frame). Here, a search space having a search space ID of 0 may correspond to a search space set from a master information block (MIB).

In the case that the paging search space is set to a search space in which the search space ID is not 0, the UE may monitor an (i_s+1)-th paging opportunity. One paging opportunity may be composed of a set of the 'S*X' number of consecutive PDCCH monitoring opportunities, where 'S' may correspond to the number of actually transmitted SS/PBCH blocks, and the corresponding information may be transmitted from the base station to the UE with a value of a specific parameter (e.g., ssb-PositionsInBurst) of a system information block (SIB). Further, 'X' may correspond to the number of PDCCH monitoring opportunities per SS/PBCH block (e.g., higher layer signaling parameter nrofPDCCH-MonitoringOccasionPerSSB-InPO) within paging opportunities set to the UE from the base station, and when there is no corresponding setting information, the UE may assume that X=1. [x*S+K]-th (where it may be defined that x=0, 1, 2, . . . , X−1 and K=1, 2, 3, . . . , S) PDCCH monitoring opportunity within paging opportunity may correspond to the K-th transmission SS/PBCH block. Starting with a first PDCCH monitoring opportunity in the paging frame, PDCCH monitoring opportunities that do not overlap with uplink (UL) symbols may be sequentially numbered from 0. In this case, when firstPDCCH-MonitoringOccasionOfPO is set through higher layer signaling, the starting PDCCH monitoring opportunity number of the (i_s+1)th paging opportunity may correspond to an (i_s+1)th value in a firstPDCCH-MonitoringOccasionOfPO parameter. In the case that firstPDCCH-MonitoringOccasionOfPO is not set through higher layer signaling, the starting PDCCH monitoring opportunity number of the (i_s+1)th paging opportunity may be equal to i_s*S*X. If X>1, in the case that the UE detects a PDCCH corresponding to the P-RNTI in any paging opportunity, the UE does not need to perform monitoring for the remaining or subsequent PDCCH monitoring opportunities in the corresponding paging opportunity.

A paging opportunity associated with a paging frame may start within or after the paging frame.

PDCCH monitoring opportunities for any paging opportunity may exist over a plurality of radio frames. In the case that a search space for paging is set to a search space having a search space ID other than 0, PDCCH monitoring opportunities for one paging opportunity may exist over a plurality of periods of the paging search space.

Table 18 is a part related to discontinuous reception for paging in the TS 38.304 standard.

TABLE 18

| 7 | Paging |
| --- | --- |
| 7.1 | Discontinuous Reception for paging |

The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where pagine DCI can be sent (TS 38.213 [4]). One Paging Frame (PF) is one Radio Frame and may contain one or multiple PO(s) or starting point of a PO.
In multi-beam operations the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.
The UE initiates RRC Connection Resume procedure upon receiving RAN initiated paging. If the UE receives a CN initiated paging in RRC_INACTIVE state, the UE moves to RRC_IDLE and informs NAS.
The PF and PO for paging are determined by the following formulae:
  SFN for the PF is determined by:
    (SFN + PF_offset) mod T = (T div N)*(UE_ID mod N)
  Index (i_s) indicating the index of the PO is determined by:
    i_s = floor (UE_ID/N) mod Ns
The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceID = 0 is configured for pagingSearchSpace, the PDCCH monitoring occasions for paging are same as for RMSI as defined in clause 13 in TS 38.213 [4].
When SearchSpaceId = 0 is configured for pagingSearchSpace, Ns is either 1 or 2. For Ns = 1, there is only one PO which starts from the first PDCCH monitoring occasion for paging in the PF. For Ns = 2, PO is either in the first half frame (i_s = 0) or the second half frame (i_s = 1) of the PF.
When SearchSpaceId other than 0 is configured for pagingSearchSpace, the UE monitors the (i_s − 1)= PO. A PO is a set of 'S*X' consecutive PDCCH monitoring occasions where 'S' is the number of actual transmitted SSBs determined according to ssb-PositionsInBurst in S1B1 and X is the nrofPDCCH-MonitoringOccasionPerSSB-InPO if configured or is equal to 1 otherwise. The [x*S+K]$^{th}$ PDCCH monitoring occasion for paging in the PO corresponds to the K$^{th}$ transmitted SSB, where x=0,1,...,X−1, K=1,2,...,S.
The PDCCH monitoring occasions for paging which do not overlap with UL symbols (determined according to tdd-UL-DL-ConfigurationCommon) are sequentially numbered from zero starting from the first PDCCH monitoring occasion for paging in the PF.

TABLE 18-continued

When firstPDCCH-MonitoringOccasionOfPO is present, the starting PDCCH monitoring occasion number of (i_s +
1)$^{th}$ PO is the (i_s + 1)$^{th}$ value of the firstPDCCH-MonitoringOcassionOfPO parameter; otherwise, it is equal to i_s *
S*X. If X > 1, when the UE detects a PDCCH transmission addressed to P-RNTI within its PO, the UE is not required
to monitor the subsequent PDCCH monitoring occasions for this PO.
  NOTE 1:     A PO associated with a PF may start in the PF or after the PF.
  NOTE 2:     The PDCCH monitoring occasions for a PO can span multiple radio frames. When SearchSpaceId other
              than 0 is configured for pagingSearchSpace the PDCCH monitoring occasions for a PO can span
              multiple periods of the paging search space.
The following parameters are used for the calculation of PF and i_s above:
      T: DRX cycle of the UE (T is determined by the shortest of the UE specific DRX value(s), if configured by RRC
        and/or upper layers, and a default DRX value broadcast in system information. In RRC_IDLE state, if UE
        specific DRX is not configured by upper layers, the default value is applied).
      N: number of total paging frames in T
      Ns: number of paging occasions for a PF
      PF_offset: offset used for PF determination
      UE_ID: 5G-S-TMSI mod 1024
Parameters Ns, nAndPagingFrameOffset, nofPDCCH-MonitoringOccasionPerSSB-InPO, and the length of default
DRX Cycle are signaled in SIB1. The values of N and PF_offset are derived form the parameter
nAndPagingFrameOffset as defined in TS 38.331 [3]. The parameter first-PDCCH-MonitoringOccasionOfPO is
signalled in SIB1 for paging in initial DL BWP. For paging in a DL BWP other than the initial DL BWP, the parameter
first-PDCCH-MonitoringOccasionOfPO is signaled in the corresponding BWP configuration.
If the UE has no 5G-S-TMSI, for instance when the UE has not yet registered onto the network, the UE shall use as
default identity UE_ID = 0 in the PF and i_s formulas above.
5G-S-TMSI is a 48 bit long bit string as defined in TS 23.501 [10]. 5G-S-TMSI shall in the formulae above be
interpreted as a binary number where the left most bit represents the most significant bit.

The base station may transmit a PDCCH for paging to the
UE, and the corresponding PDCCH may include scheduling
information on a PDSCH including a paging message. ID
information of one or a plurality of UEs in which the base
station wants- to wake up may be included in the paging
message. More specifically, information of Table 19 may be
included in the paging message.

TABLE 19

| Paging message |
|---|
| -- ASN1START |
| -- TAG-PAGING-START |
| Paging ::=                    SEQUENCE { |
|   pagingRecordList                 PagingRecordList              OPTIONAL, |
| -- Need N |
|   (paging record list) |
|   lateNonCriticalExtension          OCTET STRING                 OPTIONAL, |
|   nonCriticalExtension              SEQUENCE{ }                  OPTIONAL |
| } |
| PagingRecordList ::=          SEQUENCE (SIZE(1..maxNrofPageRec)) OF PagingRecord |
| PagingRecord ::=              SEQUENCE { |
|   ue-Identity                       PagingUE-Identity, |
|   (ue identity(ID)) |
|   accessType                        ENUMERATED (non3GPP) OPTIONAL, -- Need N |
|   (access type) |
|   ... |
| } |
| PagingUE-Identity ::=         CHOICE { |
|   ng-5G-S-TMSI                      NG-5G-S-TMSI, |
|   fullI-RNTI                        I-RNTI-Value, |
|   ... |
| } |

After receiving a PDCCH for paging from the base
station, the UE may receive a PDSCH scheduled by the
corresponding PDCCH. UEs identical to an UE_ID indi-
cated by a paging message transmitted through the received
PDSCH may wake up and perform subsequent operation
procedures (e.g., random access, RRC connection, and the
like).

Hereinafter, contents of a DCI format scrambled with a
P-RNTI in the 5G communication system will be described in detail. The DCI format scrambled with the P-RNTI may
be composed of, for example, the following fields.

Short messages indicator—2 bits

Short message—8 bits, according to Clause 6.5 of [9,
    TS38.331]. When only scheduling information for pag-
    ing is delivered, this field is reserved.

Frequency domain resource allocation information—
    $\lceil \log_2(N_{RB}^{DL,BWP}(N_{RB}^{DL,BWP}+1)/2) \rceil$ bit, when only
    short messages are delivered, this field is reserved.
    NDL,BWPRB is defined as the number of RBs in the
    downlink bandwidth part.

Time domain resource allocation information—4 bits,
    when only a short message is delivered, this field is reserved.

VRB-to-PRB mapping—1 bit according to Table
    7.3.1.2.2-5. When only short messages are delivered,
    this field is reserved.

Modulation and coding scheme—5 bits, when only short messages are delivered, this field is reserved.

TB scaling—2 bits as defined in Clause 5.1.3.2 of [6, TS38.214]. When only short messages are delivered, this field is reserved.

Reserved bit—8 bits for operation in a cell with shared spectrum channel access; 6 bits in other cases

TABLE 20

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 20 represents a short message indicator in a DCI format scrambled with a P-RNTI.

With reference to Table 20, the short message indicator is reserved in the case that a bit field is 00, and indicates that only scheduling information for paging is present in the DCI in the case that a bit field is 01, and indicates that only a short message is present in the DCI in the case that a bit field is 10, and indicates that both scheduling information for paging and short message are present in the DCI in the case that a bit field is 11.

Hereinafter, a method of setting a TCI state for a PDCCH (or PDCCH DMRS) in a 5G communication system will be described in detail.

The base station may set and indicate a TCI state for a PDCCH (or PDCCH DMRS) through appropriate signaling. The TCI state is for notifying a quasi co-location (QCL) relationship between a PDCCH (or PDCCH DMRS) and another RS or channel, and the fact that any reference antenna port A (reference RS #A) and another target antenna Port B (target RS #B) are QCLed with each other means that it is allowed that the UE applies some or all of large-scale channel parameters estimated at the antenna port A to channel measurement from the antenna port B. QCL may need to associate different parameters according to a situation such as 1) time tracking affected by average delay and delay spread, 2) frequency tracking affected by Doppler shift and Doppler spread, 3) radio resource management (RRM) affected by an average gain, and 4) beam management (BM) affected by spatial parameters. Accordingly, NR supports four types of QCL relationships as illustrated in Table 21.

TABLE 21

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as an angle of arrival (AoA), power angular spectrum (PAS) of AoA (PAS of AoA), an angle of departure (AoD), PAS (PAS of AoD) of AoD, transmit and receive channel correlation, transmit and receive beamforming, and spatial channel correlation.

The QCL relationship may be set to the UE through RRC parameter TCI-State and QCL information (QCL-Info), as illustrated in Table 22. With reference to Table 22, the base station may set one or more TCI states to the UE to notify up to two QCL relationships (qcl-Type1, qcl-Type2) for an RS, that is, a target RS that refer to the ID of the TCI state. In this case, each QCL information (QCL-Info) included in each TCI state includes a serving cell index and BWP index of a reference RS indicated by the corresponding QCL information, a type and ID of the reference RS, and a QCL type, as illustrated in Table 21.

TABLE 22

```
TCI-State ::=                      SEQUENCE {
    tci-StateId                        TCI-StateId,
    (corresponding TCI state ID)
    qcl-Type1                          QCL-Info,
    (QCL information of the first reference RS of RS (target RS) referring to the corresponding
TCI state ID)
    qcl-Type2                          QCL-Info
        OPTIONAL,    -- Need R
    (QCL information of the second reference RS of the RS (target RS) referring to the
corresponding TCI state ID)
    ...
}
QCL-Info ::=                       SEQUENCE {
    cell                               ServeCellIndex
        OPTIONAL,    -- Need R
    (The serving cell index of the reference RS indicated by the corresponding QCL information)
    bwp-Id                             BWP-Id
        OPTIONAL, -- Cond CSI-RS-Indication
    (BWP index of reference RS indicated by the corresponding QCL information)
    referenceSignal                    CHOICE {
        csi-rs                             NZP-CSI-RS-
ResourceId,
        ssb                                SSB-
Index
    (One of the CSI-RS ID or SSB ID indicated by the corresponding QCL information)
    },
    qcl-Type                           ENUMERATED {typeA, typeB, typeC,
typeD},
    ...
}
```

Figure 13:
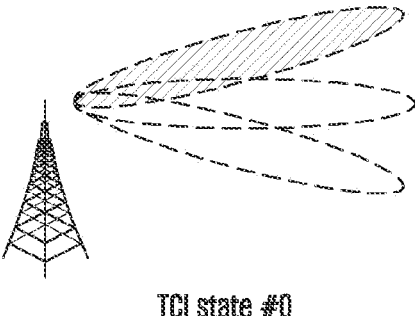
FIG. 13 is a diagram illustrating an example of base station beam allocation according to a TCI state setting in a wireless communication system according to various embodiments of the disclosure.
Figure 13:
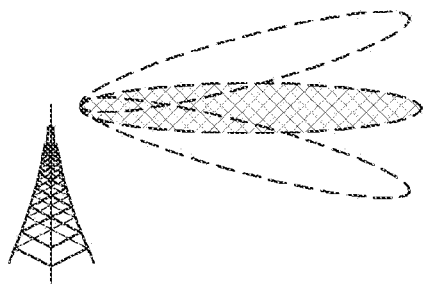
Figure 13:
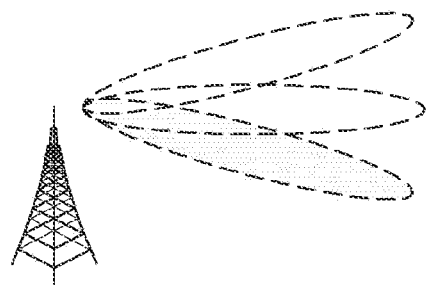

FIG. 13 illustrates base station beam allocation according to a TCI state setting in a wireless communication system according to various embodiments of the disclosure.

Specifically, FIG. 13 illustrates an example of base station beam allocation according to a TCI state setting. With reference to FIG. 13, the base station may transmit information on the different N number of beams to the UE through the different N number of TCI states. For example, as illustrated in FIG. 13, in the case that N=3, the base station may enable qcl-Type2 parameters included in three TCI states 1300, 1305, and 1310 to be associated with a CSI-RS or SSB corresponding to different beams and to be set to QCL type D and notify that antenna ports referring to the different TCI states 1300, 1305, or 1310 are associated with different spatial Rx parameters, that is, different beams. Specifically, the combination of TCI states applicable to the PDCCH DMRS antenna port is illustrated in Table 23. In Table 23, a fourth row is a combination assumed by the UE before an RRC setting, and a setting after RRC is not possible.

TABLE 23

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
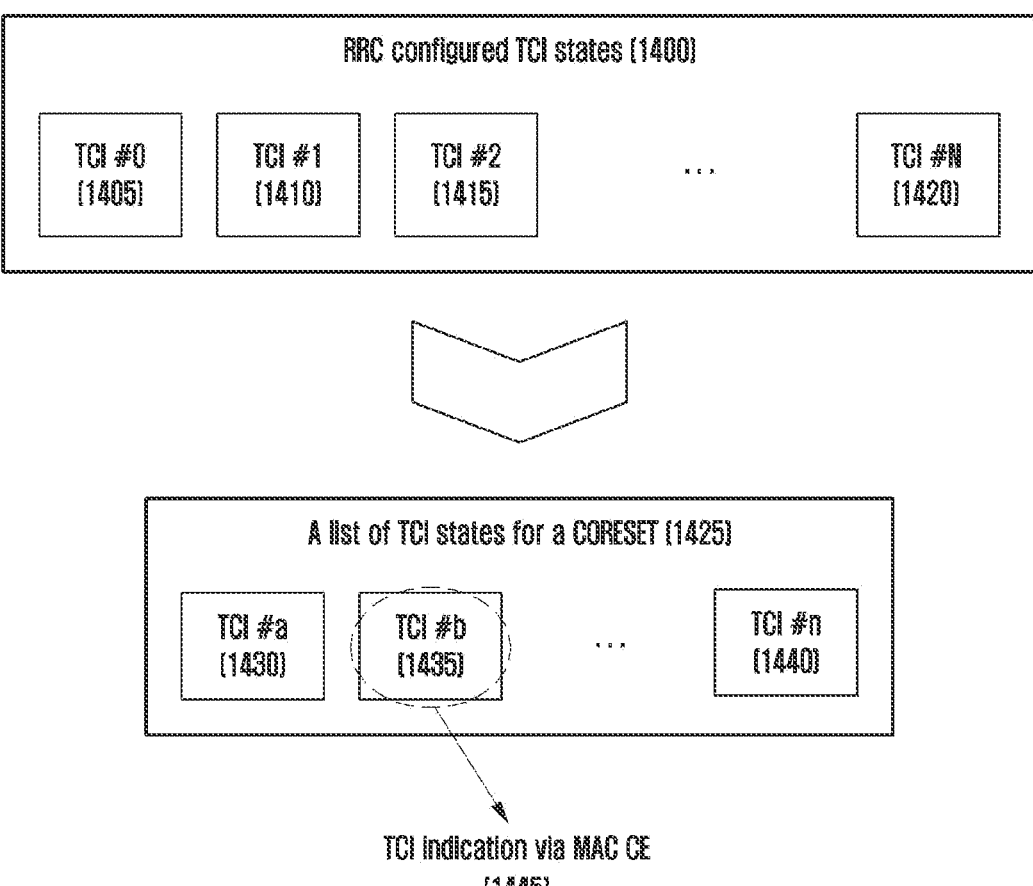
FIG. 14 is a block diagram illustrating an example of a hierarchical signaling process in a wireless communication system according to various embodiments of the disclosure.

FIG. 14 illustrates a process of hierarchical signaling in a wireless communication system according to various embodiments of the disclosure.

In NR, for dynamic allocation of PDCCH beams, a hierarchical signaling method as illustrated in FIG. 14 is supported. With reference to FIG. 14, the base station may set the N number of TCI states 1405, 1410, . . . , 1420 to the UE through RRC signaling 1400 and set some of the N number of TCI states 1405, 1410, . . . , 1420 to a TCI states for a CORESET (1425). Thereafter, the base station may indicate one of TCI states 1430, 1435, and 1440 for a CORESET to the UE through MAC CE signaling (1445). Thereafter, the UE receives a PDCCH based on beam information included in the TCI state indicated by the MAC CE signaling.

Figure 15:
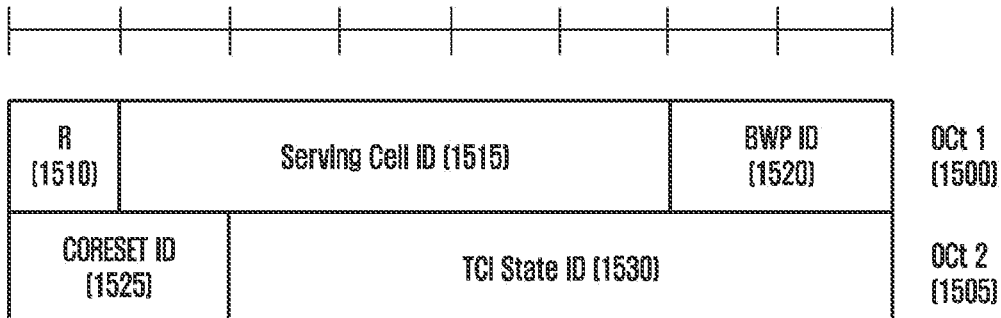
FIG. 15 is a diagram illustrating an example of a signaling structure in a wireless communication system according to various embodiments of the disclosure.

FIG. 15 illustrates an example of a signaling structure in a wireless communication system according to various embodiments of the disclosure.

Specifically, FIG. 15 is a diagram illustrating a TCI indication MAC CE signaling structure for a PDCCH DMRS. With reference to FIG. 15, TCI indication MAC CE signaling for the PDCCH DMRS is composed of 2 bytes (16 bits), and includes a 1-bit reserved bit 1510, a 5-bit serving cell ID 1515, a 2-bit BWP ID 1520, a 2-bit CORESET ID 1525, and a 6-bit TCI state ID 1530.

The base station may set one or a plurality of TCI states for a specific CORESET to the UE, and activate one of the set TCI states through a MAC CE activation command. For example, {TCI state #0, TCI state #1, TCI state #2} as a TCI state are set to a CORESET #1, and the base station may transmit, to the UE, a command that activates to assume the TCI state #0 as a TCI state for the CORESET #1 through an MAC CE. The UE may correctly receive the DMRS of the corresponding CORESET based on the QCL information in the activated TCI state based on the activation command for the TCI state received through the MAC CE.

When the UE does not receive a setting of a TCI state indicating the QCL information on a DMRS antenna port for receiving a PDCCH of a CORESET (or CORESET with a CORESET ID (or index) of 0 or a CORESET #0) set with MIB, the UE may assume that the following physical layer channel is QCL in terms of average gain, QCL-TypeA, and QCL-TypeD characteristics.

DMRS (or DMRS antenna port) associated with a PDCCH received with a CORESET (or a CORESET with a CORESET ID of 0 or a CORESET #0) set with MIB DMRS antenna port associated with reception of the corresponding PDSCH (or PDSCH scheduled by a PDCCH transmitted with the CORESET #0)

Corresponding SS/PBCH block (or SS/PBCH block associated with a CORESET #0, or SS/PBCH block transmitting MIB setting a corresponding CORESET #0)

The following is a part of the TS 38.213 standard related to the above contents.

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

When the UE receives a setting of a search space having a search space ID of 0 for a common search space set for monitoring an SI-RNTI/P-RNTI (or in the case that a common search space set for monitoring an SI-RNTI/P-RNTI is a search space set with MIB or in the case of a search space #0), the UE may monitor a PDCCH at a monitoring opportunity associated with an SS/PBCH block A, and in this case, the SS/PBCH block A may be determined as follows.

The UE may receive a command that activates a specific TCI state for a control region #0 through an MAC CE, and in this case, the corresponding TCI state may include a CSI-RS associated with any SS/PBCH. An SS/PBCH associated with a CSI-RS of a TCI state activated through an MAC CE most recently received by the UE may correspond to an SS/PBCH block A.

When performing random access, the UE may transmit a preamble (or physical random access channel (PRACH)) associated with a specific SS/PBCH to the base station. An SS/PBCH identified through a random access procedure most recently performed by the UE may correspond to an SS/PBCH block A.

The following is a part of the TS 38.213 standard related to the above contents.

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of a MAC CE activation command indicating a TCI state of the active BWP that includes a CORESET with index 0, as described in [6, TS 38.214], where the TCI-state includes a CSI-RS which is quasi-co-located with the SS/PBCH block, or a random access procedure that is not initiated by a PDCCH order that triggers a contention-free random access procedure For a CORESET (CORESET #X) whose index is set to a value other than 0, when the UE does not receive a setting of a TCI state for the CORESET #X or receives a setting of one or more TCI states, but does not receive a MAC CE activation command that activates one of them, the UE may assume that a DMRS transmitted in the CORESET #X is QCL with an SS/PBCH block identified in an initial access process.

When the UE receives a setting of one or more TCI states as part of a handover procedure (or part of a reconfiguration with synch procedure), but does not receive a MAC CE activation command that activates one of them, the UE may assume that a DMRS transmitted in a CORESET #X has been QCL with the identified SS/PBCH or CSI-RS resource during a random access procedure initiated by a handover procedure (or reconfiguration with synch procedure).

The following is a part of the TS 38.213 standard related to the above contents.

For a CORESET other than a CORESET with index 0, if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci-StatesPDCCH-ToReleaseList but has not received a MAC CE activation command for one of the TCI states as described in [11, TS 38.321], the UE assumes that the DM-RS antenna port associated with PDCCH receptions is quasi co-located with the SS/PBCH block the UE identified during the initial access procedure;

if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

For a CORESET (CORESET #0) having an index of 0, the UE may assume that a DMRS antenna port of a PDCCH received with the CORESET #0 has been QCL with the following physical resources.

A downlink reference signal included in the TCI state activated by the MAC CE activation command, or when the UE does not receive an MAC CE activation command for a TCI state, an SS/PBCH block identified by the UE through the most recent random access procedure (random access other than non-contention-based random access triggered by PDCCH order)

The following is a part of the above-described related TS 38.213 standard.

For a CORESET with index 0, the UE assumes that a DM-RS antenna port for PDCCH receptions in the CORESET is quasi co-located with the one or more DL RS configured by a TCI state, where the TCI state is indicated by a MAC CE activation command for the CORESET, if any, or a SS/PBCH block the UE identified during a most recent random access procedure not initiated by a PDCCH order that triggers a contention-free random access procedure, if no MAC CE activation command indicating a TCI state for the CORESET is received after the most recent random access procedure.

Hereinafter, terms such as a paging PDCCH, a PDCCH for paging, a PDCCH corresponding to paging, a PDCCH scrambled with a P-RNTI, and a PDCCH set with a P-RNTI may all be used in the same meaning.

Hereinafter, terms such as a paging PDSCH, a PDSCH for paging, a PDSCH through which a paging message is transmitted, a PDSCH scrambled with a P-RNTI, and a PDSCH set with a P-RNTI may all be used in the same meaning.

In NR, the base station has a CSI framework for indicating measurement and reporting of channel state information (CSI) of the UE. A CSI framework of NR may be composed of at least two elements of a resource setting and a report setting, and the report setting may have a connection relationship with each other with reference to at least one resource setting ID.

According to an embodiment of the disclosure, the resource setting may include information related to a reference signal (RS) for measuring channel state information by the UE. The base station may set at least one resource settings to the UE. For example, the base station and the UE may send and receive signaling information such as Table 24 in order to deliver information on the resource setting.

TABLE 24

```
-- ASN1START
-- TAG-CSI-RESOURCECONFIG-START
CSI-ResourceConfig ::=          SEQUENCE {
    csi-ResourceConfigId            CSI-ResourceConfigId,
    csi-RS-ResourceSetList          CHOICE {
        nzp-CSI-RS-SSB                  SEQUENCE {
            nzp-CSI-RS-ResourceSetList      SEQUENCE (SIZE (1..maxNrofNZP-CSI-RS-ResourceSetsPerConfig))
OF NZP-CSI-RS-ResourceSetId
OPTIONAL, -- Need R
            csi-SSB-ResourceSetList         SEQUENCE (SIZE (1..maxNrofCSI-SSB-ResourceSetsPerConfig)) OF
CSI-SSB-ResourceSetId
OPTIONAL -- Need R
```

TABLE 24-continued

```
    },
        csi-IM-ResourceSetList          SEQUENCE (SIZE (1..maxNrofCSI-IM-ResourceSetsPerConfig)) OF CSI-
IM-ResourceSetId
    },
    bwp-Id                              BWP-Id,
    resourceType                        ENUMERATED { aperiodic, semiPersistent, periodic },
    ...
}
-- TAG-CSI-RESOURCECONFIG-STOP.
-- ASN1STOP
```

In Table 24, the signaling information CSI-ResourceConfig includes information on each resource setting. According to the signaling information, each resource setting may include a resource setting index (csi-ResourceConfigId), a BWP index (bwp-ID), a time axis transmission setting (resourceType) of a resource, or a resource set-list (csi-RS-ResourceSetList) including at least one resource set. The time axis transmission setting of a resource may be set to aperiodic transmission, semi-persistent transmission, or periodic transmission. The resource set list may be a set including a resource set for channel measurement or a set including a resource set for interference measurement. In the case that the resource set list is a set including a resource set for channel measurement, each resource set may include at least one resource, which may be an index of a CSI reference signal (CSI-RS) resource or a synchronization/broadcast channel block (SS/PBCH block, SSB). In the case that the resource set list is a set including a resource set for interference measurement, each resource set may include at least one CSI interference measurement (CSI-IM).

For example, in the case that the resource set includes a CSI-RS, the base station and the UE may give and receive signaling information such as Table 25 in order to deliver information on the resource set.

TABLE 25

```
-- ASN1START
-- TAG-NZP-CSI-RS-RESOURCESET-START
NZP-CSI-RS-ResourceSet ::=  SEQUENCE {
    nzp-CSI-ResourceSetId       NZP-CSI-RS-ResourceSetId,
    nzp-CSI-RS-Resources        SEQUENCE (SIZE (1..maxNrofNZP-CSI-RS-ResourcesPerSet)) OF
NZP-CSI-RS-ResourceId,
    repetition                  ENUMERATED { on, off }
OPTIONAL, -- Need S
    aperiodicTriggeringOffset   INTEGER(0..6)
OPTIONAL, -- Need S
    trs-Info                    ENUMERATED {true}
OPTIONAL, -- Need R.

...
}
-- TAG-NZP-CSI-RS-RESOURCESET-STOP
-- ASN1STOP
```

In Table 25, the signaling information NZP-CSI-RS-ResourceSet includes information on each resource set. According to the signaling information, each resource set includes information on at least a resource set index (nzp-CSI-ResourceSetId) or an index set (nzp-CSI-RS-Resources) of the included CSI-RS, and may include part of information (repetition) on a spatial domain transmission filter of the included CSI-RS resource or information on whether the included CSI-RS resource is used for tracking (trs-Info).

The CSI-RS may be the most representative reference signal included in a resource set. The base station and the UE may send and receive signaling information such as Table 26 in order to deliver information on the CSI-RS resource.

TABLE 26

```
-- ASN1START
-- TAG-NZP-CSI-RS-RESOURCE-START
NZP-CSI-RS-RESOURCE ::=  SEQUENCE {
    nzp-CSI-RS-RrsourceId       NZP-CSI-RS-ResourceId,
    resourceMapping             CSI-RS-ResourceMapping,
    powerControlOffset          INTEGER (-8..15),
    powerControlOffsetSS        ENUMERATED(db-3, db0, db3, db6)   OPTIONAL,
-- Need A
    scramblingID                ScramblingId,
    periodicityAndOffset        CSI-ResourcePeriodicityAndOffset          OPTIONAL,
```

TABLE 26-continued

```
-- Cond PeriodicOrSemiPersistent
   qcl-InfoPeriodicCSI-RS          TCI-StateId              OPTIONAL,
-- Cond Periodic
   ...
}
-- TAG-NZP-CSI-RS-RESOURCE-STOP
-- ASN1STOP
```

In Table 26, the signaling information NZP-CSI-RS-Resource includes information on each CSI-RS. Information included in the signaling information NZP-CSI-RS-Resource may have the following meaning.

nzp-CSI-RS-ResourceId: CSI-RS resource index resourceMapping: resource mapping information of a CSI-RS resource powerControlOffset: ratio between PDSCH EPRE (Energy Per RE) and CSI-RS EPRE powerControlOffsetSS: ratio between SS/PBCH block EPRE and CSI-RS EPRE scramblingID: scrambling index of CSI-RS sequence periodicityAndOffset: transmission period and slot offset of CSI-RS resource qcl-InfoPeriodicCSI-RS: TC-state information in the case that the corresponding CSI-RS is a periodic CSI-RS resourceMapping included in the signaling information NZP-CSI-RS-Resource represents resource mapping information of a CSI-RS resource and may include frequency resource RE mapping, number of ports, symbol mapping, CDM type, frequency resource density, and frequency band mapping information. The number of ports, a frequency resource density, a CDM type, and time-frequency axis RE mapping that may be set through this may have a value determined in one of rows of Table 27.

Table 27 represents a frequency resource density, CDM type, frequency axis and time axis start position $(\bar{k}, \bar{l})$ of a CSI-RS component RE pattern, and the number k' of REs on the frequency axis and the number l' of REs on the time axis of a CSI-RS component RE pattern that may be set according to the number of CSI-RS ports (X). The above-described CSI-RS component RE pattern may be a basic unit constituting a CSI-RS resource. Through the Y=1+max(k') number of REs on the frequency axis and the Z=1+max(l') number of REs on the time axis, the CSI-RS component RE pattern may be composed of the YZ number of REs. In the case that the number of CSI-RS ports is 1 port, the CSI-RS RE position may be designated without a subcarrier limitation within the physical resource block (PRB), and the CSI-RS RE position may be designated by a 12-bit bitmap. In the case that the number of CSI-RS ports is {2, 4, 8, 12, 16, 24, 32} ports and Y=2, the CSI-RS RE position may be designated for every two subcarriers in the PRB, and a CSI-RS RE position may be designated by a bitmap of 6 bits. In the case that the number of CSI-RS ports is 4 ports and Y=4, the CSI-RS RE position may be designated for every four subcarriers in the PRB, and the CSI-RS RE position may be designated by a 3-bit bitmap. Similarly, the time axis RE position may be designated by a bitmap of total 14 bits. In this case, it is possible to change a length of the bitmap

TABLE 27

| Row | Ports X | Density P | cdm-Type | $(\bar{k}, \bar{l})$ | CDM group index j | k' | l' |
|---|---|---|---|---|---|---|---|
| 1 | 1 | 3 | No CDM | $(k_0, l_0)$, $(k_0 + 4, l_0)$, $(k_0 +8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0)$, $(k_0 + 2, l_0)$ | 0, 1 | 0, 1 | 0 |
| 5 | 4 | 1 | FD-CDM2 | $(k_0, l_0)$, $(k_0, l_0 + 1)$ | 0, 1 | 0, 1 | 0 |
| 6 | 8 | 1 | FD-CDM2 | $(k_0, l_0)$, $(k_1, l_0)$, $(k_2, l_0)$, $(k_3, l_0)$ | 0, 1, 2, 3 | 0, 1 | 0 |
| 7 | 8 | 1 | FD-CDM2 | $(k_0, l_0)$, $(k_1, l_0)$, $(k_0, l_0 + 1)$, $(k_1, l_0 + 1)$ | 0, 1, 2, 3 | 0, 1 | 0 |
| 8 | 8 | 1 | CDM4 (FD2, TD2) | $(k_0, l_0)$, $(k_1, l_0)$ | 0, 1 | 0, 1 | 0, 1 |
| 9 | 12 | 1 | FD-CDM2 | $(k_0, l_0)$, $(k_1, l_0)$, $(k_2, l_0)$, $(k_3, l_0)$, $(k_4, l_0)$, $(k_5, l_0)$ | 0, 1, 2, 3, 4, 5 | 0, 1 | 0 |
| 10 | 12 | 1 | CDM4 (FD2, TD2) | $(k_0, l_0)$, $(k_1, l_0)$, $(k_2, l_0)$ | 0, 1, 2 | 0, 1 | 0, 1 |
| 11 | 16 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 +1)$, $(k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0)$, $(k_1, l_0)$, $(k_2, l_0)$, $(k_3, l_0)$ | 0, 1, 2, 3 | 0, 1 | 0, 1 |
| 13 | 24 | 1, 0.5 | FD-CDM2 | $(k_0, l_0)$, $(k_1, l_0)$, $(k_2, l_0)$, $(k_0, l_0 +1)$, $(k_1, l_0 + 1)$, $(k_2, l_0 + 1)$, $(k_0, l_1)$, $(k_1, l_1)$, $(k_2, l_1)$, $(k_0, l_1 + 1)$, $(k_1, l_1 + 1)$, $(k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | CDM8 (FD2, TD4) | $(k_0, l_0)$, $(k_1, l_0)$, $(k_2, l_0)$ | 0, 1, 2 | 0, 1 | 0, 1, 2, 3 |
| 16 | 32 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, l_1)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0)$, $(k_1, l_0)$, $(k_2, l_0)$, $(k_3, l_0)$ | 0, 1, 2, 3 | 0, 1 | 0, 1, 2, 3 | according to the Z value of Table 27, such as specifying the frequency position, but the principle thereof is similar to the above description; thus, a redundant description will be omitted below.

According to an embodiment of the disclosure, the report setting may have a connection relationship with each other with reference to at least one ID of the resource setting, and the resource setting(s) having a connection relationship with the report setting provides setting information including information on a reference signal for measuring channel information. In the case that the resource setting(s) having a connection relationship with the report setting is(are) used for measuring channel information, the measured channel information may be used for reporting channel information according to a reporting method set to the report setting having a connection relationship.

According to an embodiment of the disclosure, the report setting may include setting information related to a CSI reporting method. For example, the base station and the UE may send and receive signaling information such as Table 28 in order to deliver information on the report setting.

TABLE 28

```
-- ASN1START
-- TAG-CSI-REPORTCONFIG-START
CSI-ReportConfig ::=                       SEQUENCE {
  reportConfigId                             CSI-ResourceConfigId,
  carrier                                    ServcellIndex                OPTIONAL, -- Need S
  resourcesForChannelMeasurement             CSI-ResourceConfigId,
  CST-IM-ResourcesForInterference            CSI-ResourceContigId         OPTIONAL, -- Need R
  nzp-CSI-RS-ResourcesForInterference        CSI-ResourceContigId         OPTIONAL, -- Need R
  reportConfigType                           CHOICE {
    periodic                                   SEQUENCE {
      reportSlotConfig                           CSI-ReportPeriodicityAndoffset,
      pucch-CSI-ResourceList                     SEQUENCE (SIZE (1..maxNrofBWPs)) of PUCCH-CSI-
Resource
    },
    semiPersistentOnPUCCH                      SEQUENCE {
      reportslotConfig                           CSI-ReportPeriodicityAndOffset,
      pucch-CSI-ResourceList                     SEQUENCE (SIZE (1..maxNrofBWPs)) of PUCCH-CSI-
Resource
    },
    semiPersistentOnPUSCH                      SEQUENCE {
      reportSlotConfig                           ENUMERATED {s15, s110, s120, s140, s180, s1160,
s1320},
      reportSlotOffsetList                       SEQUENCE (SIZE 1..maxNrofUL-Allocations)) OF
INTEGER(0..32),
      p0alpha                                    P0-PUSCH-AlphaSetId
    },
    aperiodic                                  SEQUENCE {
      reportSlotOffsetList                       SEQUENCE (SIZE 1..maxNrofUL-Allocations)) OF
INTEGER(0..32),
    }
  },
  ReportQuantity                             CHOICE {
    none                                       NULL,
    cri-RI-PMI-CQI                             NULL,
    cri-RI-i1                                  NULL,
    cri-RI-i1-CQI                              SEQUENCE {
      pdsch-BundleSizeForCSI                     ENUMERATED {n2, n4}
OPTIONAL, -- Need S
    },
    cri-RI-CQI                                 NULL,
    cri-RSRP                                   NULL,
    ssb-Index-RSRP                             NULL,
    cri-RI-LI-BMI-CQI                          NULL
  },
  reportFreqConfiguration                    SEQUENCE {
    cgi-FormatIndicator                        ENUMERATED { widebandCQI, subbandCQI }
OPTIONAL, -- Need S
    pmi-Format Indicator                       ENUMERATED { widebandPMI, subbandPMI }
OPTIONAL, -- Need R
    csi-ReportingBand                          CHOICE {
      subbands3                                  BIT STRING(SIZE(3)),
      subbands4                                  BIT STRING(SIZE(4)),
      subbands5                                  BIT STRING(SIZE(5)),
      subbands6                                  BIT STRING(SIZE(6)),
      subbands7                                  BIT STRING(SIZE(7)),
      subbands8                                  BIT STRING(SIZE(8)),
      subbands9                                  BIT STRING(SIZE(9)),
      subbands10                                 BIT STRING(SIZE(10)),
      subbands11                                 BIT STRING(SIZE(11)),
      subbands12                                 BIT STRING(SIZE(12)),
      subbands13                                 BIT STRING(SIZE(13)),
      subbands14                                 BIT STRING(SIZE(14)),
      subbands15                                 BIT STRING(SIZE(15)),
      subbands16                                 BIT STRING(SIZE(16)),
      subbands17                                 BIT STRING(SIZE(17)),
      subbands18                                 BIT STRING(SIZE(18)),
```

```
        ...,
            subbands19-v1530                           BIT STRING(SIZE(19))
        } OPTIONAL, -- Need S
    }
OPTIONAL, -- Need R
    timeRestrictionForChannelMeasurements              ENUMERATED {configured, notConfigured},
    timeRestrictionForInterferenceMeasurements         ENUMERATED {configured, notConfigured},
    codebookConfig                                     CodebookConfig
OPTIONAL, -- Need R
    dummy                                              ENUMERATED {n1, n2}
OPTIONAL, -- Need R
    groupBasedBeamReporting                            CHOICE {
        enabled                                        NULL,
        disabled                                       SEQUENCE {
            nrofReportedRs                             ENUMERATED {n1, n2, n3, n4}
OPTIONAL, -- Need S
        }
    },
    cgi-Table                                          ENUMERATED {table1, table2, table3, spare1}
OPTIONAL, -- Need R
    subbandSize                                        ENUMERATED {value1, value2},
    non-PMI-PortIndication                             SEQUENCE (SIZE (1..maxNrofNZP-CSI-RS-ResourcesPerConfig)) OF
PortIndexFor8Ranks OPTIONAL, -- Need R
    ...,
    [[
    semiPersistentOnPUSCH-v1530                        SEQUENCE {
        reportSlotConfig-v1530                         ENUMERATED {s14, s16, s116}
    }
OPTIONAL -- Need R
    ]]
}
```

In Table 28, the signaling information CSI-ReportConfig includes information on each report setting. Information included in the signaling information CSI-ReportConfig may have the following meaning.

reportConfigId: report setting index carrier: serving cell index resourcesForChannelMeasurement: resource setting index for channel measurement having a connection relationship with a report setting csi-IM-ResourcesForInterference: resource setting index with CSI-IM resources for interference measurement having a connection relationship with a report setting nzp-CSI-RS-ResourcesForInterference: resource setting index with CSI-RS resources for interference measurement having a connection relationship with a report setting reportConfigType: The reportConfigType indicates a time axis transmission setting and transmission channel of the channel report, and may have an aperiodic transmission or semi-persistent physical uplink control channel (PUCCH) transmission, semi-periodic PUSCH transmission or periodic transmission setting reportQuantity: The reportQuantity indicates a type of channel information to be reported, and may have a type ('cri-RI-PMI-CQI', 'cri-RI-i1', 'cri-RI-i1-CQI', 'cri-RI-CQI', 'cri-RSRP', 'ssb-Index-RSRP', 'cri-RI-LI-PMI-CQI') of channel information in the case of not transmitting the channel report ('none') and the case of transmitting the channel report. Here, elements included in the type of channel information mean a channel quality indicator (CQI), a precoding matric indicator (PMI), a CSI-RS resource indicator (CRI), an SS/PBCH block resource indicator (SSBRI), a layer indicator (LI), a rank means indicator (RI), and/or L1-reference signal received power (RSRP).

reportFreqConfiguration: The reportFreqConfiguration indicates whether channel information to be reported includes only information on the entire band (wide-band) or information on each subband. In the case that channel information to be reported includes information on each subband, the reportFreqConfiguration may have setting information on a subband including channel information timeRestrictionForChannelMeasurements: whether the time axis is restricted for a reference signal for channel measurement among reference signals referenced by channel information to be reported timeRestrictionForInterferenceMeasurements: whether the time axis is restricted for a reference signal for interference measurement among reference signals referenced by channel information to be reported codebookConfig: codebook information referenced by channel information to be reported groupBasedBeamReporting: whether beam grouping for channel reporting cqi-Table: CQI table index referenced by channel information to be reported subbandSize: Index indicating a subband size of channel information non-PMI-PortIndication: port mapping information to be referenced when reporting non-PMI channel information In the case that the base station indicates channel information reporting through higher layer signaling or L1 signaling, the UE may perform channel information reporting with reference to the setting information included in the indicated report setting.

The base station may indicate channel state information (CSI) reporting to the UE through higher layer signaling including RRC signaling or medium access control (MAC) control element (CE) signaling, or L1 signaling (e.g., common DCI, group-common DCI, and UE-specific DCI).

For example, the base station may indicate aperiodic channel information (CSI) report to the UE through higher layer signaling or DCI using a DCI format 0_1. The base station sets a parameter for an aperiodic CSI report of the UE or a plurality of CSI report trigger states including parameters for the CSI report through higher layer signaling. The parameter for the CSI report or the CSI report trigger state may include a set including a slot interval between a PDCCH including DCI and a PUCCH or PUSCH including a CSI report or a possible slot interval, a reference signal ID for measuring a channel state, and a type of including channel information. When the base station indicates some of a plurality of CSI report trigger states to the UE through DCI, the UE reports channel information according to a CSI report setting of the report setting set to the indicated CSI report trigger state. Time axis resource allocation of a PUCCH or a PUSCH including the CSI report of the UE may be indicted through a slot interval with a PDCCH indicated through DCI, a start symbol and symbol length indication within a slot for time axis resource allocation of the PUSCH, and a part or all of PUCCH resource indication. For example, a position of a slot to which the PUSCH including the CSI report of the UE is transmitted may be indicated through a slot interval with the PDCCH indicated through the DCI, and a start symbol and symbol length within the slot may be indicated through a time domain resource assignment field of the above-described DCI.

For example, the base station may indicate a semi-persistent CSI report to the UE through higher layer signaling or DCI using a DCI format 0_1. The base station may activate or deactivate a semi-persistent CSI report through upper layer signaling including MAC CE signaling or DCI scrambled with an SP-CSI-RNTI. When the semi-persistent CSI report is activated, the UE may periodically report channel information according to the set slot interval. When the semi-persistent CSI report is deactivated, the UE may stop reporting the activated periodic channel information. The base station sets a plurality of CSI report trigger states including parameters for the semi-persistent CSI report or a parameter for the semi-persistent CSI report of the UE through higher layer signaling. The parameter for a CSI report or the CSI report trigger state may include a set including a slot interval between a PDCCH including DCI indicating a CSI report and a PUCCH or a PUSCH including a CSI report, or a possible slot interval, a slot in which higher layer signaling indicating a CSI report is activated, a slot interval between a PUCCH or PUSCH including the CSI report, a slot interval period of the CSI report, and a type of included channel information. When the base station activates some of a plurality of CSI report trigger states or some of a plurality of report settings to the UE through higher layer signaling or DCI, the UE may report channel information according to a report setting included in the indicated CSI report trigger state or a CSI report setting set to the activated report setting. Time axis resource allocation of the PUCCH or PUSCH including the CSI report of the UE may be indicated through a part or all of a slot interval period of the CSI report, a slot interval from a slot in which higher layer signaling is activated or a slot interval with the PDCCH indicated through DCI, a start symbol and symbol length indication in a slot for time axis resource assignment of the PUSCH, and a PUCCH resource indication. For example, a position of a slot through which a PUSCH including the CSI report of the UE is transmitted may be indicated through a slot interval with a PDCCH indicated through the DCI, and a start symbol and a symbol length within the slot may be indicated through a time domain resource assignment field of the above-described DCI format 0_1. For example, a position of a slot through which the PUCCH including the CSI report of the UE is transmitted may be indicated through a slot interval period of the CSI report set through higher layer signaling, and a slot interval between a slot in which higher layer signaling is activated and a PUCCH including the CSI report, and a start symbol and a symbol length within a slot may be indicated through a start symbol and a symbol length to which a PUCCH resource set through higher layer signaling is allocated.

For example, the base station may indicate a periodic CSI report to the UE through higher layer signaling. The base station may activate or deactivate a periodic CSI report through higher layer signaling including RRC signaling. When the periodic CSI report is activated, the UE may periodically report channel information according to the set slot interval. When the periodic CSI report is deactivated, the UE may stop periodic channel information reporting that has been activated. The base station sets a report setting including parameters for the periodic CSI report of the UE through higher layer signaling. Parameters for the CSI report may include a slot interval between a slot in which higher layer signaling indicating the CSI report is activated and a PUCCH or PUSCH including the CSI report, a slot interval period of the CSI report, a reference signal ID for channel state measurement, and a type of included channel information. Time axis resource allocation of the PUCCH or PUSCH including the CSI report of the UE may be indicated through a part or all of a slot interval period of the CSI report, a slot interval with a slot in which higher layer signaling is activated or a slot interval with the PDCCH indicated through DCI, a start symbol and symbol length indication in a slot for time axis resource allocation of the PUSCH, and a PUCCH resource indication. For example, a position of a slot through which a PUCCH including the CSI report of the UE is transmitted may be indicated through a slot interval period of the CSI report set through higher layer signaling, and a slot interval between a slot in which higher layer signaling is activated and a PUCCH including the CSI report, and a start symbol and a symbol length within a slot may be indicated through a start symbol and a symbol length to which a PUCCH resource set through higher layer signaling is allocated.

In the case that the base station indicates an aperiodic CSI report or a semi-persistent CSI report to the UE through DCI, the UE may determine whether valid channel reporting through the indicated CSI report may be performed in consideration of a CSI computation time required for the CSI report. For an aperiodic CSI report or semi-persistent CSI report indicated through DCI, the UE may perform a valid CSI report from an uplink symbol after a Z symbol after a last symbol included in a PDCCH including DCI indicating the CSI report is ended, and the above-described Z symbol may vary according to numerology of a downlink bandwidth part corresponding to the PDCCH including DCI indicating the CSI report, numerology of an uplink bandwidth part corresponding to the PUSCH transmitting the CSI report, and a type or characteristics (report quantity, frequency band granularity, number of reference signal ports, codebook type, and the like) of channel information to be reported in the CSI report. In other words, in order to determine a certain CSI report to a valid CSI report (if the corresponding CSI report is a valid CSI report), uplink transmission of the corresponding CSI report should not be performed before a Zref symbol, including timing advance. In this case, the Zref symbol is an uplink symbol that starts a cyclic prefix (CP) after a time $T_{proc,CSI} = (Z)(2048+0.144) \cdot \kappa 2^{-\mu} \cdot T_C$ from the moment when the last symbol of the triggering PDCCH is ended. Here, a detailed value of Z follows the following description, and $T_c = 1/(\Delta f_{max} \cdot N_f)$, $\Delta f_{max} = 480 \cdot 10^3$ Hz, $N_f = 4096$, $\kappa = 64$, and $\mu$ is numerology. In this case, $\mu$ may be promised to use the one that causes a largest $T_{proc,CSI}$ value among ($\mu_{PDCCH}$, $\mu_{CSI\text{-}RS}$, $\mu_{UL}$), where $\mu_{PDCCH}$ may mean subcarrier spacing used for PDCCH transmission, $\mu_{CSI\text{-}RS}$ may mean subcarrier spacing used for CSI-RS transmission, and $\mu_{UL}$ may mean subcarrier spacing of an uplink channel used for uplink control information (UCI) transmission for CSI reporting. As another example, $\mu$ may be promised to use the one that causes a largest $T_{proc,CSI}$ value among ($\mu_{PDCCH}$, $\mu_{UL}$). Definitions of $\mu_{PDCCH}$ and $\mu_{UL}$ refer to the above description. For convenience of future description, satisfying the above conditions is referred to as satisfying a CSI reporting validity condition 1.

Further, in the case that a reference signal for channel measurement for an aperiodic CSI report indicated to the UE through DCI is an aperiodic reference signal, the UE may perform a valid CSI report from an uplink symbol after a Z' symbol after a last symbol including the reference signal is ended, and the above-described Z' symbol may vary according to numerology of a downlink bandwidth part corresponding to a PDCCH including DCI indicating the CSI report, numerology of a bandwidth corresponding to a reference signal for channel measurement for the CSI report, numerology of an uplink bandwidth part corresponding to a PUSCH transmitting the CSI report, and a type or characteristics (report quantity, frequency band granularity, number of ports of reference signal, codebook type, and the like) of channel information to be reported in the CSI report. In other words, in order to determine a certain CSI report to a valid CSI report (if the corresponding CSI report is a valid CSI report), uplink transmission of the corresponding CSI report should not be performed before a Zref symbol, including timing advance. In this case, the Zref symbol is an uplink symbol that starts a cyclic prefix (CP) after a time $T'_{proc,CSI}=(Z')(2048+144)\cdot\kappa2^{-\mu}$. $T_C$ from the moment when a last symbol of an aperiodic CSI-RS or aperiodic CSI-IM triggered by the triggering PDCCH is ended. Here, a detailed value of Z' follows the description below, and $T_c=1/(\Delta f_{max}\cdot N_f)$, $\Delta f_{max}=480\cdot10^3$ Hz, $N_f=4096$, $\kappa=64$, and $\mu$ is numerology. In this case, $\mu$ may be promised to use the one that causes the largest $T_{proc,CSI}$ value among ($\mu_{PDCCH}$, $\mu_{CSI\text{-}RS}$, $\mu_{UL}$), and PDCCH may mean subcarrier spacing used for triggering PDCCH transmission, CSI-RS may mean subcarrier spacing used for CSI-RS transmission, and $\mu_{UL}$ may mean subcarrier spacing of an uplink channel used for uplink control information (UCI) transmission for CSI reporting. As another example, $\mu$ may be promised to use the one that causes a largest $T_{proc,CSI}$ value among ($\mu_{PDCCH}$, $\mu_{UL}$). In this case, definitions of $\mu_{PDCCH}$ and $\mu_{UL}$ refer to the above description. For convenience of future description, satisfying the above conditions is referred to as satisfying a CSI reporting validity condition 2.

In the case that the base station indicates aperiodic CSI report for an aperiodic reference signal to the UE through DCI, the UE may perform a valid CSI report from a first uplink symbol satisfying both a time point after a symbol Z after a last symbol included in a PDCCH including DCI indicating the CSI report is ended, and a time point after a symbol Z' after a last symbol including the reference signal is ended. That is, in the case of aperiodic CSI reporting based on an aperiodic reference signal, when both CSI reporting validity conditions 1 and 2 are satisfied, the aperiodic CSI reporting is determined as a valid CSI report.

In the case that a CSI report time point indicated by the base station does not satisfy the CSI computation time requirement, the UE may determine that the corresponding CSI report is invalid and may not consider updating the channel information state for the CSI report.

The Z and Z' symbols for the above-described CSI computation time calculation follow Table 29 and Table 30. For example, in the case that channel information to be reported in the CSI report includes only wideband information and that the number of ports of the reference signal is 4 or less and that the reference signal resource is one and that the codebook type is a 'typeI-SinglePanel', or that a type (report quantity) of channel information to be reported is 'cri-RI-CQI', the Z and Z' symbols follow $Z_1$, $Z'_1$ values of Table 30. In the future, this is referred to as delay requirement 2. In addition to this, in the case that a PUSCH including the CSI report does not include TB or HARQ-ACK and that a CPU occupation of the UE is 0, the Z and Z' symbols follow $Z_1$, $Z'_1$ values of Table 29, and this is referred to as delay requirement 1. A description of the above-described CPU occupation is described in detail below. Further, in the case that the report quantity is 'cri-RSRP' or 'ssb-Index-RSRP', the Z and Z' symbols follow $Z_3$; $Z'_3$ values of Table 30. X1, X2, X3, and X4 of Table 30 mean the UE capability for a beam reporting time, and KB1 and KB2 of Table 30 mean the UE capability for a beam change time. In the case that a type or characteristic of channel information to be reported in the above-described CSI report is not applicable, the Z and Z' symbols follow $Z_2$, $Z'_2$ values of Table 30.

TABLE 29

| | $Z_1$ [symbols] | |
|---|---|---|
| $\mu$ | $Z_1$ | $Z_1{}'$ |
| 0 | 10 | 8 |
| 1 | 13 | 11 |
| 2 | 25 | 21 |
| 3 | 43 | 36 |

TABLE 30

| | $Z_1$ [symbols] | | $Z_2$ [symbols] | | $Z_3$ [symbols] | |
|---|---|---|---|---|---|---|
| $\mu$ | $Z_1$ | $Z_1{}'$ | $Z_2$ | $Z_2{}'$ | $Z_3$ | $Z_3{}'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | $\min(44, X_2 + KB_1)$ | $X_3$ |
| 3 | 97 | 85 | 152 | 140 | $\min(97, X_4 + KB_2)$ | $X_4$ |

When the base station indicates an aperiodic/semi-persistent/periodic CSI report to the UE, in order to determine a reference time of a reference signal for measuring channel information to be reported in the CSI report, the base station may set a CSI reference resource in units of slots. For example, in the case of indicating to transmit a CSI report #X in an uplink slot n', a CSI reference resource of the CSI report #X transmitted in the uplink slot n' may be defined to a downlink slot n-nCSI-ref. The downlink slot n is calculated as $n=\rfloor n'\cdot2^{\mu_{DL}}/2^{\mu_{DL}}\rfloor$ in consideration of downlink and uplink numerologies $\mu_{DL}$ and $\mu_{DL}$. nCSI-ref, which is a slot interval between the downlink slot n and the CSI reference resource follows $n_{CSI\text{-}ref}=4\cdot2^{\mu_{DL}}$ in the case that a single CSI-RS resource is connected to the corresponding CSI report according to the number of CSI-RS resources for channel measurement in the case that a CSI report #0 to be transmitted in the uplink slot n' is a semi-persistent or periodic CSI report, and follows $n_{CSI\text{-}ref}=5\cdot2^{\mu_{DL}}$ in the case that multiple CSI-RS resources are connected to the corresponding CSI report. In the case that the CSI report #0 transmitted in the uplink slot n' is an aperiodic CSI report, n is calculated as $n_{CSI-ref} = \lfloor Z'/N_{symb}^{slot} \rfloor$ in consideration of a CSI computation time Z' for channel measurement. The above-mentioned $N_{symb}^{slot}$ is the number of symbols included in one slot, and it is assumed that $N_{symb}^{slot}=14$ in NR.

In the case that the base station indicates to transmit a certain CSI report in the uplink slot n' to the UE through higher layer signaling or DCI, the UE may report CSI by performing channel measurement or interference measurement on a CSI-RS resource, CSI-IM resource, or SSB resource transmitted no later than a CSI reference resource slot of the CSI report transmitted in the uplink slot n' among the CSI-RS resource or CSI-IM or SSB resource associated with the corresponding CSI report. The CSI-RS resource, CSI-IM resource, or SSB resource associated with the corresponding CSI report may mean a CSI-RS resource, a CSI-IM resource, and an SSB resource included in the resource set set to a resource setting referenced by the report setting for the CSI report of the UE set through higher layer signaling, a CSI-RS resource, a CSI-IM resource, or an SSB resource referenced by the CSI report trigger state including parameters for the corresponding CSI report, or a CSI-RS resource, a CSI-IM resource, or an SSB resource indicated by an ID of a reference signal (RS) set.

In the embodiments of the disclosure, the CSI-RS/CSI-IM/SSB occasion means a transmission time point of the CSI-RS/CSI-IM/SSB resource(s) determined by a higher layer setting or a combination of higher layer setting and DCI triggering. For example, in semi-persistent or periodic CSI-RS resources, a slot transmitted according to a slot period and slot offset set by higher layer signaling is determined, and a transmission symbol(s) in a slot is(are) determined with reference to one of resource mapping methods within a slot of Table 27 according to resource mapping information (resourceMapping). As another example, in the aperiodic CSI-RS resource, a slot to be transmitted is determined according to the slot offset with a PDCCH including DCI indicating a channel report set by higher layer signaling, and a transmission symbol(s) in the slot is(are) determined with reference to one of resource mapping methods in the slot of Table 27 according to resource mapping information (resourceMapping).

The above-described CSI-RS occasion may be determined by independently considering a transmission time point of each CSI-RS resource or by comprehensively considering a transmission time point of one or more CSI-RS resource(s) included in a resource set, and accordingly, the following two interpretations are possible for the CSI-RS occasion according to each resource set setting.

Interpretation 1-1: from a start time point of an earliest symbol to an end time point of a latest symbol in which one specific resource among one or more CSI-RS resources included in the resource set(s) set to the resource setting referenced by the report setting set for the CSI report is transmitted Interpretation 1-2: from a start time point of an earliest symbol at which the CSI-RS resource transmitted at an earliest time point is transmitted to an end time point of a latest symbol in which a CSI-RS resource transmitted at a latest time point is transmitted among all the CSI-RS resources included in the resource set(s) set to the resource setting referenced by the report setting set for the CSI report Hereinafter, in the embodiments of the disclosure, it is possible to apply individually considering all two interpretations of the CSI-RS occasion. Further, it is possible to consider both interpretations of the CSI-IM occasion and the SSB occasion, such as the CSI-RS occasion, but the principle thereof is similar to the above description; thus, a redundant description will be omitted below.

In the embodiments of the disclosure, a CSI-RS/CSI-IM/SSB occasion for a CSI report #X transmitted in the 'uplink slot n' means a set of a CSI-RS occasion, a CSI-IM occasion, and an SSB occasion not later than the CSI reference resource of the CSI report #X transmitted in the uplink slot n' among a CSI-RS occasion, a CSI-IM occasion, and a SSB occasion of a CSI-RS resource, a CSI-IM resource, and an SSB resource included in a resource set set to the resource setting referenced by the report setting set for the CSI report #X.

In the embodiments of the disclosure, the latest CSI-RS/CSI-IM/SSB occasion among CSI-RS/CSI-IM/SSB occasions for the CSI report #X transmitted in the 'uplink slot n' may be interpreted to the following two.

Interpretation 2-1: A set of a latest CSI-RS occasion among CSI-RS occasions for the CSI report #X to be transmitted in the uplink slot n', a latest SSB occasion among CSI-RS occasions for the CSI report #X transmitted in the uplink slot n', and an occasion including a latest CSI-IM occasion among SSB occasions for a CSI report #0 to be transmitted in the uplink slot n'

Interpretation 2-2: a latest occasion among all CSI-RS occasion, CSI-IM occasion, and SSB occasion for the CSI report #X to be transmitted in the uplink slot n'

Hereinafter, in the embodiments of the disclosure, it is possible to apply individually in consideration of all two interpretations of 'a latest CSI-RS/CSI-IM/SSB occasion among CSI-RS/CSI-IM/SSB occasions for the CSI report #X to be transmitted in an 'uplink slot n'. Further, in consideration of the above two interpretations (interpretation 1-1, interpretation 1-2), for the CSI-RS occasion, CSI-IM occasion, and SSB occasion, in the embodiments of the disclosure, it is possible to apply individually "the latest CSI-RS/CSI-IM/SSB occasion among CSI-RS/CSI-IM/SSB occasions for the CSI report #X to be transmitted in the uplink slot n'" in consideration of all different four interpretations (apply interpretation 1-1 and interpretation 2-1, apply interpretation 1-1 and interpretation 2-2, apply interpretation 1-2 and interpretation 2-1, apply interpretation 1-2 and interpretation 2-2).

The base station may indicate a CSI report in consideration of a quantity of channel information in which the UE may simultaneously calculate for the CSI report, that is, the number of CSI processers (CPUs) of the UE. When the number of CPUs that may be simultaneously calculated by the UE is $N_{CPU}$, the UE may not expect a CSI report indication of the base station that requires more CSI than $N_{CPU}$ or may not consider the update of channel information that requires more CSI than $N_{CPU}$. $N_{CPU}$ may be reported by the UE to the base station through higher layer signaling or may be set by the base station through higher layer signaling.

It is assumed that the CSI report indicated by the base station to the UE occupies some or all of the CPU for channel information calculation among the total number $N_{CPU}$ of channel information in which the UE may simultaneously calculate. For each CSI report, for example, if the number of CPUs required for the CSI report n (n=0, 1, . . . , N−1) is $O_{CPU}^{(n)}$ the number of CPUs required for the total N number of CSI reports may be expressed as $$\sum_{n=0}^{N-1} O_{CPU}^{(n)}.$$

The CPU required for each reportQuantity set to the CSI report may be set, as illustrated in Table 31.

TABLE 31

$-0_{CPU}^{(n)} = 0$: in the case that reportQuantity set in CSI report is set to 'none' and that trs-Info is set to CSI-RS resource set connected to CSI report
$-0_{CPU}^{(n)} = 1$: in the case that reportQuantity set in the CSI report is set to 'none', 'cri-RSRP', or 'ssb-Index-RSRP' and that trs-Info is not set to the CSI-RS resource set connected to the CSI report.
in the case that reportQuantity set in the CSI report is set to 'cri-RI-PMI-CQI', 'cri-RI-il', 'cri-RI-il-CQI', 'cri-RI-CQI', or 'cri-RI-LI-'PMI-CQI'
$>> 0_{CPU}^{(n)} = N_{CPU}$: in the case that an aperiodic CSI report is triggered and that the corresponding CSI report is not multiplexed with one or both of TB/HARQ-ACK. The corresponding CSI report is wideband CSI and corresponds to up to 4 CSI-RS ports, corresponds to a single resource without CRI report, and that codebookType corresponds to 'typeI-SinglePanel' or that reportQuantity corresponds to 'cri-RI-CQI' (The corresponding case corresponds to the above-described delay requirement 1, and may be regarded as the case that the UE quickly calculates and reports CSI using all available CPU)
$>>0_{CPU}^{(n)} = Ks$: all other cases except for the above case. $K_s$ indicates the number of CSI-RS resources in CSI-RS resource set for channel measurement At a specific time point, in the case that the number of channel information calculations required by the UE for a plurality of CSI reports is greater than the number $N_{CPU}$ of CPUs in which the UE may simultaneously calculate, the UE may not consider updating channel information for some CSI reports. Among a plurality of indicated CSI reports, a CSI report that does not consider updating of channel information is determined in consideration of a time in which channel information calculation required for at least the CSI report occupies the CPU and a priority of channel information to be reported. For example, the update of channel information for a CSI report that starts at a time point at which a time that occupies the CPU is latest in channel information calculation required for a CSI report may not be considered, and for a CSI report having a low priority of channel information, the update of channel information may not preferentially be considered.

The priority of the channel information may be determined with reference to Table 32.

TABLE 32

CSI priority value $Pri_{test}$ (y, k,c,s) = $2 \cdot N_{cells} \cdot M_s y + N_{cells} \cdot M_s \cdot k + M_s \cdot c + s$,
-In the case of aperiodic CSI report transmitted through $_{y=0}$ PUSCH, in the case of semi-persistent CSI report transmitted through $_{y-1}$ PUSCH, in the case of semi-persistent CSI report transmitted through $_{y-2}$ PUCCH, in the case of periodic CSI report transmitted through $_{y-3}$ PUCCH:
In the case that k=0 CSI report includes LI-RSRP, in the case that k=1 CSI report does not include LI-RSRP:
-c: Serving cell index, $N_{cells}$: the number of maximum serving cells set by upper layer signaling (maxNrofServingCells);
- s: CSI report configuration index (reportConfigID), $M_s$: the number of maximum CSI report configurations set by upper layer signaling (maxrofCSI- Report Configurations).

A CSI priority for the CSI report is determined through a priority value PriiCSI (y, k, c, s) of Table 32. With reference to Table 32, a CSI priority value is determined through a type of channel information included in the CSI report, time axis reporting characteristics (aperiodic, semi-persistent, periodic) of the CSI report, a channel (PUSCH, PUCCH) through which the CSI report is transmitted, a serving cell index, and a CSI report setting index. It is determined that a CSI priority for a CSI report having a lower priority value is higher compared with a priority value PriiCSI(y,k,c,s).

When a time that occupies the CPU in channel information calculation required for the CSI report indicated by the base station to the UE is referred to as a CPU occupation time, the CPU occupation time is determined in consideration of some or all of a type (report quantity) of channel information included in the CSI report, time axis characteristics (aperiodic, semi-persistent, periodic) of the CSI report, a slot or symbol occupied by DCI or upper layer signaling indicating the CSI report, and a slot or symbol occupied by the reference signal for channel state measurement.

In a CPU occupation time for an aperiodic CSI report in which a report quantity included in the CSI report according to some embodiments of the disclosure is not set to 'none', in the case that the base station indicates to transmit an aperiodic CSI report #X in an uplink slot n' through DCI using a DCI format 0_1, a CPU occupation time for a CSI report #X transmitting in the uplink slot n' may be defined from a next symbol of a last symbol occupied by a PDCCH including DCI indicating an aperiodic CSI report #X to a last symbol occupied by a PUSCH including a CSI report #X transmitted in the uplink slot n'.

In a CPU occupation time for a periodic or semi-persistent CSI report in which a report quantity included in the CSI report according to some embodiments of the disclosure is not set to 'none', in the case that the base station indicates to transmit a periodic or semi-persistent CSI report #X in an uplink slot n' through DCI using a DCI format 0_1 scrambled with higher layer signaling or SP-CSI-RNTI, a CPU occupation time for the CSI report #X transmitting in the uplink slot n' may be defined from a first symbol of an earliest transmitted CSI-RS/CSI-RS/CSI-IM/SSB resource corresponding to a latest CSI-RS/CSI-IM/SSB occasion among CSI-RS/CSI-IM/SSB occasions for the CSI report #X transmitting in the uplink slot n' to a last symbol occupied by a PUCCH or PUSCH including the CSI report #X transmitted in the uplink slot n', and the latest CSI-RS/CSI-IM/SSB occasion may not be positioned after the CSI reference resource for the CSI report #X. Exceptionally, in the case that the base station indicates a semi-persistent CSI report through DCI and the UE thus performs a first CSI report of a semi-persistent CSI report #X, a CPU occupation time for the first CSI report may be defined from a next symbol of a last symbol occupied by a PDCCH including DCI indicating the semi-persistent CSI report #X to a last symbol occupied by the PUSCH including the first CSI report. Thereby, the causality of operation on the time axis of the UE may be guaranteed by considering a time point at which the CSI report is indicated and a time point at which the CPU occupation time starts.

For example, the rules illustrated in Table 33 may be followed.

TABLE 33

For a CSI report with CSI-ReportConfig with higher layer parameter
reportQuantity not set to 'none', the CPU(s) are occupied for a number of OFDM
symbols as follows:
- A periodic or semi-persistent CSI report (excluding an initial semi-
persistent CSI report on PUSCH after the PDCCH triggering the report)
occupies CPU(s) from the first symbol of the earliest one of each CSI-
RS/CSI-IM/SSB resource for channel or interference measurement, respective
latest CSI-RS/CSI-IM/SSB occasion no later than the corresponding CSI
reference resource, until the last symbol of the PUSCH/PUCCH carrying the
report
- An aperiodic CSI report occupies CPU(s) from the first symbol after the
PDCCH triggering the CSI report until the last symbol of the PUSCH carrying
the report.
- An initial semi-persistent CSI report on PUSCH after the PDCCH trigger
occupies CPU(s) from the first symbol after the PDCCH until the last symbol
of the PUSCH carrying the report.

In a CPU occupation time for an aperiodic CSI report in which a report quantity included in the CSI report according to some embodiments of the disclosure is set to 'none', in the case that the base station indicates to transmit an aperiodic CSI report #X in an uplink slot n' through DCI using a DCI format 0_1, a CPU occupation time for a CSI report #X transmitting in an uplink slot n' may be defined from a next symbol of a last symbol occupied by a PDCCH including DCI indicating the aperiodic CSI report #X to a symbol that finishes CSI computation. A symbol that finishes the above-described CSI computation means a latest symbol among a symbol after a CSI computation time Z of a last symbol occupied by a PDCCH including DCI indicating the CSI report #X and a symbol after a CSI computation time Z' of a last symbol of the most recent CSI-RS/CSI-IM/SSB occasion for a CSI report #X transmitting in the uplink slot n'.

In a CPU occupation time for a periodic or semi-persistent CSI report in which a report quantity included in the CSI report according to some embodiments of the disclosure is set to 'none', in the case that the base station indicates to transmit a periodic or semi-persistent CSI report #X in the uplink slot n' through DCI using a DCI format 0_1 scrambled with higher layer signaling or SP-CSI-RNTI, a CPU occupation time for the CSI report #X transmitting in the uplink slot n' may be defined from a first symbol of an earliest transmitted CSI-RS/CSI-IM/SSB resource corresponding to each CSI-RS/CSI-IM/SSB occasion for the CSI report #X transmitting in the uplink slot n' to a symbol after a CSI computation time Z' of a last symbol of the latest transmitted CSI-RS/CSI-IM/SSB resource.

For example, the rules illustrated in Table 34 may be followed.

TABLE 34

For a CSI report with CSI-ReportConfig with higher layer parameter
reportQuantity set to 'none' and CSI-RS-ResourceSet with higher layer
parameter trs-Info is not configured, the CPU(s) are occupied for a
number of OFDM symbols as follows:
- A semi-persistent CSI report (excluding an initial semi-
persistent CSI report on PUSCH after the PDCCH triggering the
report) occupies CPU(s) from the first symbol of the earliest
one of each transmission occasion of periodic or semi-
persistent CSI-RS/SSB resource for channel measurement for
L1-RSRP computation, until $Z_3$ symbols after the last symbol
of the latest one of the CSI-RS/SSB resource for channel
measurement for L1-RSRP computation in each transmission
occasion.
- An aperiodic CSI report occupies CPU(s) from the first symbol
after the PDCCH triggering the CSI report until the last
symbol between $Z_3$ symbols after the first symbol after the
PDCCH triggering the CSI report and $Z_3$ symbols after the last TABLE 34-continued symbol of the latest one of each CSI-RS/SSB resource for
channel measurement for L1-RSRP computation.

Figure 16:
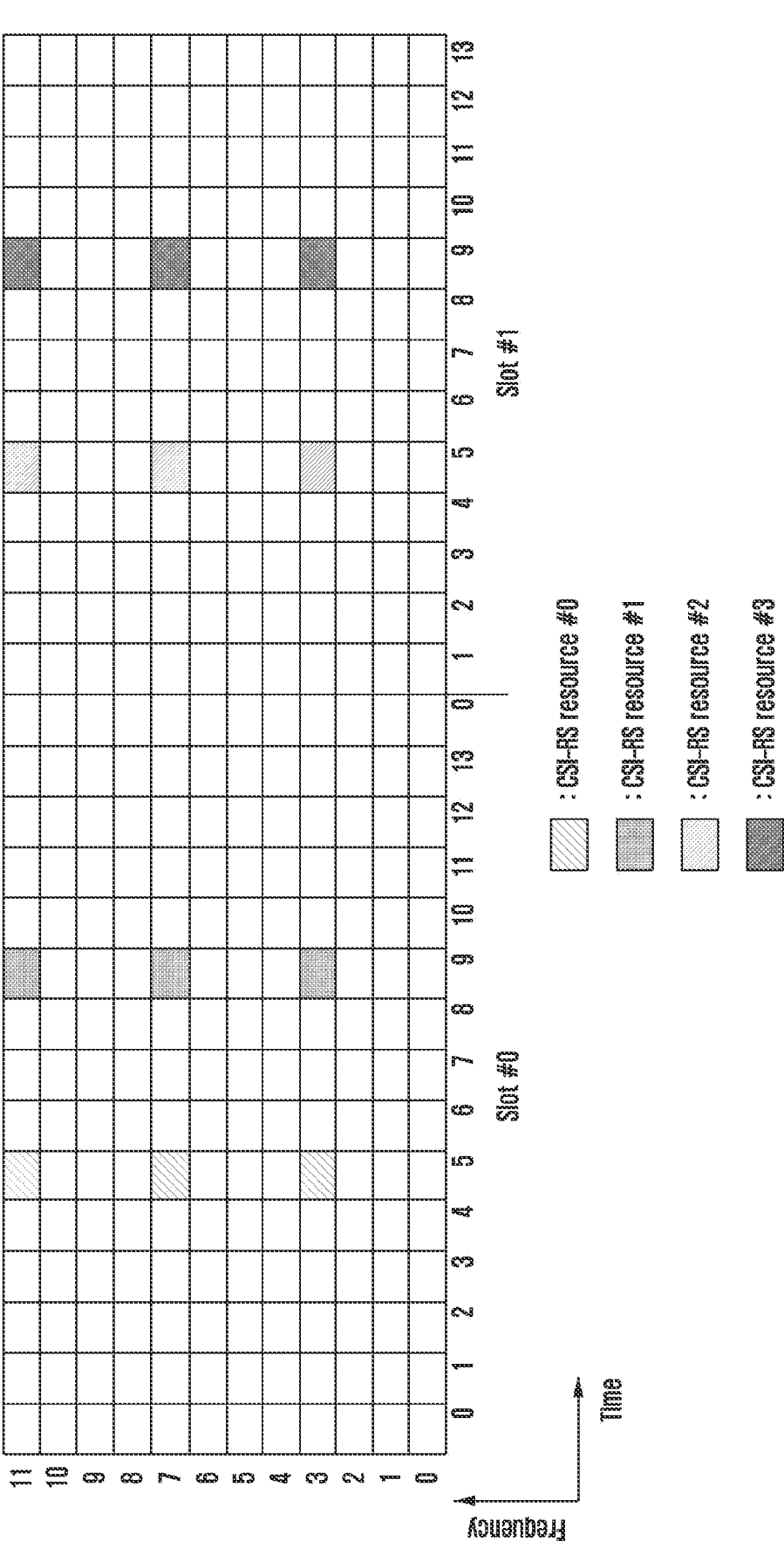
FIG. 16 is a diagram illustrating an example of a method of transmitting a reference signal in a wireless communication system according to various embodiments of the disclosure.

Hereinafter, a CSI-RS resource set for tracking use (i.e., in the case that the CSI-RS resource set is set to trs-Info) is referred to as a tracking RS (TRS). The TRS may have the following characteristics.
For a periodic TRS, the TRS may be QCL in terms of QCL-TypeC or QCL-TypeD with an SS/PBCH block, or
the periodic TRS may be QCL in terms of QCL-TypeC with an SSB, and be QCL in terms of QCL-TypeD with an NZP-CSI-RS set to 'repetition'.
The aperiodic TRS may be QCL with the periodic TRS.
The UE should assume the same port index for all CSI-RS resources set to the TRS in the same CSI-RS resource set.
CSI-RS resources in the CSI-RS resource set set to the TRS may all be set to have the same period, bandwidth, and subcarrier position.
FIG. 16 is a diagram illustrating an example of a method of transmitting a reference signal in a wireless communication system according to various embodiments of the disclosure.

Figure 17:
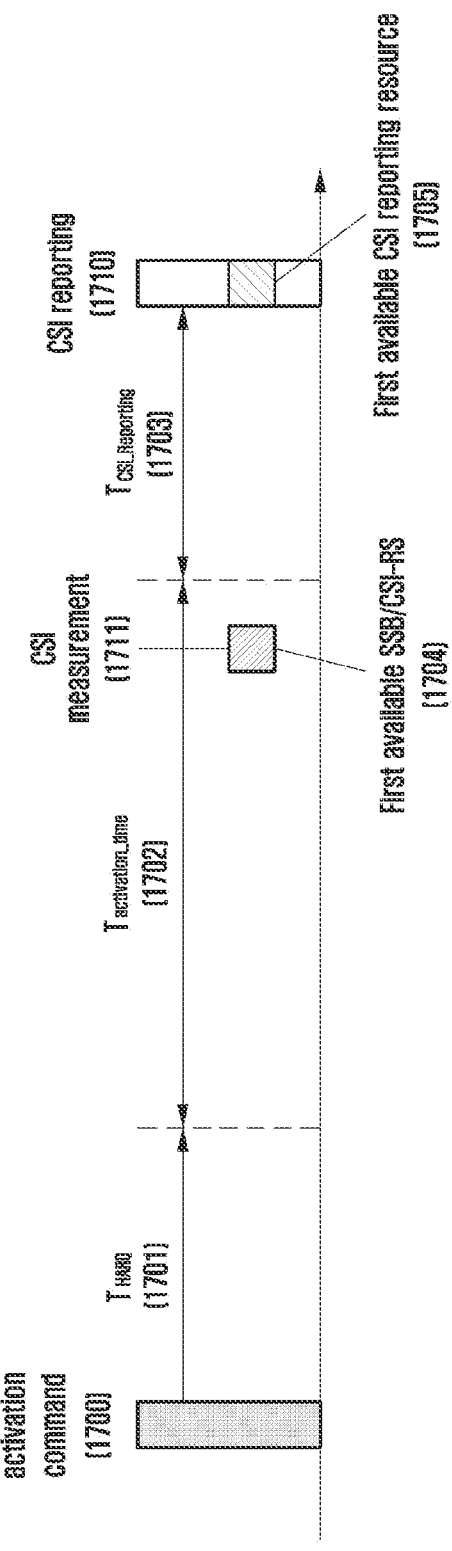
FIG. 17 is a diagram illustrating an example of a method of activating a secondary cell in a wireless communication system according to various embodiments of the disclosure.

Specifically, FIG. 16 is a diagram illustrating an example of CSI-RS resource mapping set to a TRS. When describing in detail with reference to the drawings,
in a low frequency domain (e.g., band of 6 GHz or less or frequency range 1), four CSI-RS resources corresponding to a TRS may be periodically transmitted in two consecutive slots.
In a high frequency domain (e.g., band of 6 GHz or higher or frequency range 2), 2 CSI-RS resources corresponding to a TRS may be periodically transmitted in one slot or 4 CSI-RS resources may be periodically transmitted in 2 consecutive slots.
CSI-RS resources set to a TRS may be transmitted from 3 REs per RB in a frequency domain (this may be referred to as a density of 3).
Hereinafter, a method of activating a secondary cell in 5G and a corresponding delay time will be described in detail.
FIG. 17 illustrates an example of a method of activating a secondary cell in a wireless communication system according to various embodiments of the disclosure.

The base station may set one or more cells to the UE to operate in carrier aggregation (CA). Cells in which the UE transmits and receives may be divided into a primary cell (PCell) and a secondary cell (SCell). The primary cell may correspond to a first cell accessed by the UE through an initial access procedure. The secondary cell may correspond to a cell set by the base station to the UE through higher layer signaling for additional communication in addition to the primary cell.

In the case that one or more secondary cells are set, the base station may activate or deactivate the secondary cells through set medium access control (MAC) control element (CE) signaling.

In the case that the UE receives an MAC CE corresponding to an activation command for the secondary cell in a slot n, the UE may activate the secondary cell at a time point not earlier than a slot n+k (k=k1+3*Nsubframe,μslot+1, k1 is PDSCH-to-PUCCH HARQ-ACK timing, Nsubframe,μslot is defined to the number of slots per subframe for a subcarrier setting μ) and not later than a slot n+k' (k'=THARQ+ Tactivation_time+TCSI_Reporting, THARQ is HARQ-ACK timing for DL data transmission, Tactivation_time is an activation delay for the secondary cell, and TCSI Reporting is a delay for CSI reporting); thus, the UE may perform the following operations in the activated secondary cell.

Transmission of a sounding reference signal (SRS) in the secondary cell

CSI report on the secondary cell

PDCCH monitoring in the secondary cell

PDCCH monitoring for the secondary cell

PUCCH transmission in the secondary cell (in the case that there is a setting)

In the case that the UE receives an MAC CE corresponding to the deactivation command for the secondary cell in a slot n or that a deactivation timer (sCellDeactivationTimer) for the secondary cell expires, the UE may complete deactivation of the secondary cell at a time point not later than n+k"(k"=THARQ+3 ms).

FIG. 17 illustrates a specific operation of a UE that has received an activation command for a secondary cell through a MAC CE and a corresponding delay time. The UE may receive an activation command 1700 for the secondary cell at a specific time point, and complete activation of the secondary cell at a time point not later than a delay time of the sum of THARQ 1701, Tactivation_time 1702, and TCSI_Reporting 1703. The UE may perform channel state measurement (1711) and channel state reporting (1710) with respect to the secondary cell indicated by the activation command. In this case, the UE may measure (1711) a channel state using a synchronization signal block (SS/ PBCH block) or a periodic/semi-persistent CSI-RS 1704, and perform reporting (1705) on the measured channel state. Details of the activation delay time for the secondary cell may follow Table 35.

TABLE 35

8.3.2. SCell Activation Delay Requirement for Deactivated SCell

The requirements in this clause shall apply for the UE configured with one downlink SCell in EN-DC, or in standalone NR carrier aggregation or in NE-DC or in NR-DC and when one SCell is being activated.

The delay within which the UE shall be able to activate the deactivated SCell depends upon the specified conditions.

Upon receiving SCell activation command in slot n, the UE shall be capable to transmit valid CSI report and apply actions related to the activation command for the SCell being activated no later than in slot $$\text{slot } n + \frac{T_{HARQ} + T_{activation\_time} + T_{CSI\_Reporting}}{NB \text{ slot length}} \text{ , where:}$$

$T_{HARQ}$ (in ms) is the timing between DL data transmission and acknowledgement as specified in TS 38.213 [3]

$T_{activation\_time}$ is the SCell activation delay in millisecond,

If the SCell is known and belongs to FR1. $T_{activation\_time}$ is:

- $T_{FirstSSB}$ + 5 ms, if the SCell measurement cycle is equal to or smaller than 160 ms.

- $T_{FirstSSB\_MAX}$ + $T_n$ + 5 ms, if the SCell measurement cycle is larger than 160 ms.

If the SCell is unknown and belongs to FR1, provided that the side condition Es/Iot ≥ −2dB is fulfilled.

$T_{activation\_time}$ is:

- $T_{FirstSSB\_MAX}$ + $T_{SMTC\_MAX}$ + 2*$T_n$ + 5 ms

If the SCell being activated belongs to FR2 and if there is at least one active serving cell on that FR2 band, then $T_{activation\_time}$ is $T_{FirstSSB}$ + 5 ms provided:

- The UE is provided with SMTC for the target SCell and

- The SSBs in the serving cell(s) and the SSBs in the SCell fulfill the condition defined in clause 3.6.3.

- The parameter ssb-PositionsInBurst is same for the serving cell(s) and the SCell.

If the SCell being activated belongs to FR2 and if there is at least one active serving cell on that FR2 band, if the UE is not provided with any SMTC for the target SCell, $T_{activation\_time}$ is 3 ms, provided

- the RS (s) of SCell being activated is (are) QCL-TypeD with RS (s) of one active serving cell on that FR2 band.

If the SCell being activated belongs to FR2 and if there is no active serving cell on that FR2 band provided that PCell or PSCell is in FR1 or FR2:

If the target SCell is known to UE and semi-persistent CSI-RS is used for CSI reporting, then $T_{activation\_time}$ is:

- 3 ms + max($T_{uncertainty\_MAC}$ + $T_{FineTiming}$ + 2 ms, $T_{uncertainty\_SP}$), where $T_{uncertainty\_MAC}$=0 and $T_{uncertainty\_SP}$=0 if UE receives the SCell activation command, semi-persistent CSI-RS activation command and TCI state activation command at the same time.

If the target SCell is known to UE and periodic CSI-RS is used for CSI reporting, then $T_{activation\_time}$ is:

- max($T_{uncertainty\_MAC}$ + 5 ms + $T_{Finetiming}$, $T_{uncertainty\_SP}$ + $T_{RPC\_delay}$$T_{HARQ}$), where $T_{uncertainty\_MAC}$=0 if UE receives the SCell activation command and TCI state activation commands at the same time.

If the PCell/PSCell and the target SCell are in a band pair with independent beam mangement and the target SCell is unknown to UE and semi-persistent CSI-RS is used for CSI reporting, provided that the side condition Es/Iot ≥ −2dB is fulfilled, than $T_{activation\_time}$ is:

- 6 ms + $T_{FirstSSB\_Max}$ + 15*$T_{SMTC\_MAX}$ + 8*$T_n$ + $T_{L1\text{-}RSPP,measure}$ + $T_{L1\text{-}RSPP,report}$ + $T_{HARQ}$ + max($T_{uncertainty\_MAC}$ + $T_{FineTiming}$ + 2 ms, $T_{uncertainty\_SP}$).

If the PCell/PSCell and the target SCell are in a band pair with independent beam management and the target SCell is unknown to UE and periodic CSI-RS is used for CSI reporting, provided that the side condition Es/Iot ≥ −2dB is fulfilled, then $T_{activation\_time}$ is:

- 3 ms + $T_{FirstSSB\_Max}$ + 15*$T_{SMTC\_MAX}$ + 8*$T_n$ + $T_{L1-RSPP,measure}$ + $T_{L1-RSRP,report}$ + {($T_{HARQ}$ + $T_{uncertainty\_MAC}$ + 5 ms + $T_{FineTuning}$),
    ($T_{uncertainty\_RRC}$ + $T_{RRC\_delay}$)}.
  where,
  $T_{SMTC\_MAX}$:
    - In FR1, in case of intra-band SCell activation, $T_{SMTC\_MAX}$ is the longer SMTC periodicity between active
      serving cells and SCell being activated provided the cell specific reference signals from the active serving
      cells and the SCells being activated or released are available in the same slot; in case of inter-band SCell
      activation, $T_{SMTC\_MAX}$ is the SMTC periodicity of SCell being activated.
    - In FR2, $T_{SMTC\_MAX}$ is the longer SMTC periodicity between active serving cells and SCell being activated
      provided that in Rel-15 only support FR2 intra-band CA.
    - $T_{SMTC\_MAX}$ is bounded to a minimum value of 10 ms.
    $T_n$ is the SMTC periodicity of the SCell being activated if the UE has been provided with an SMTC configuration
    for the SCell in SCell addition message, otherwise $T_n$ is the SMTC configured in the measObjectNR having the same
    SSB frequency and subcarrier spacing. If the UE is not provided SMTC configuration of measurement object on this
    frequency, the requirement which involves $T_n$ is applied with $T_n$ = 5 ms assuming the SSB transmission periodicity is
    5 ms. There are no requirements if the SSB transmission periodicity is not 5 ms
    $T_{FirstSSB}$: is the time to the end of the first complete SSB burst indicated by the SMTC after $$\text{slot } n + T_{HARQ} + \frac{T_{HARQ} + 3 \text{ ms}}{NR \text{ slot length}}$$

$T_{FirstSSB\_MAX}$: Is the time to the end of the first complete SSB burst indicated by the SMTC after $$\text{slot } n + \frac{T_{HARQ} + 3 \text{ ms}}{NR \text{ slot length}}.$$

further fulfilling:
    - In FR1, in case of intra-band SCell activation, the occasion when all active serving cells and SCells
      being activated or released are transmitting SSB bursts in the same slot; in case of inter-band SCell
      activation, the first occasion when the SCell being activated is transmitting SSB burst.
    - In FR2, the occasion when all active serving cells and SCells being activated or released are transmitting
      SSB bursts in the same slot.
    $T_{FineTiming}$ is the time period between UE finish processing the last activation command for PDCCH TCL PDSCH
    TCI (when applicable) and semi-persistent CSI-RS (when applicable) and the timing of first complete available
    SSB corresponding to the TCI state.
    $T_{L1-RSRP,measure}$ is L1-RSRP measurement delay $T_{L1-Measurement\_Period\_SSB}$ ms or $T_{L1-RSpp\_Measurement\_Period\_CSI-RS}$
    based on applicability as defined in clause 9.5 assuming M = 1.
    $T_{L1-RSRP,report}$ is delay of acquiring CSI reporting resources
    $T_{uncertainty\_MAC}$ is the time period between reception of the last activation command for PDCCH TCL PDSCH TCI
    (when applicable) and semi-persistent CSI-RS for CQI reporting (when applicable) relative to
    - SCellactivation command for known case.
    - First valid L1-RSRP reporting for unknown case.
    $T_{uncertainty\_RRC}$ is the time period between reception of the RRC configuration message for TCI of periodic CSI-RS for
CQI
    reporting (when applicable) relative to
    - SCellactivation command for known case.
    - First valid L1-RSRP reporting for unknown case.
    $T_{RRC\_delay}$ is the RRC procedure dely as specified in TS38.331 [2].
    Longer delays for RRM measurement requirements, ans in case of FR2 also SSB based
    RLM/BFD/CBD/L1-RSRP measurement requirements, can be expected during the cell detection time for
    unknown SCell activation.
  $T_{CSI\_reporting}$ is the delay (in ms) including uncertainty in acquiring the first available downlink CSI reference
  resource, UE processing time for CSI reporting and uncertainty in acquiring the first available CSI reporting
  resources as specified in TS 38.331[2]
SCell in FR1 is known if it has been meeting the following conditions:
  - During the period equal to max(5*measCycleSCell, 5*DRX cycles) for FR1 before the reception of the SCell
    activation command:
    - the UE has sent a valid measurement report for the SCell being activated and
    - the SSB measured remains detectable according to the cell identification conditions specified in clause 9.2
      and 9.3.
    - the SSB measured during the period equal to max(5*measCycleSCell, 5*DRX cycles) also remains detectable
      during the SCell activation delay according to the cell identification conditions specified in clause 9.2 and 9.3.
Otherwise SCell in FR1 is unknown
For the first SCell activation in FR2 bands. the SCell is known if it has been meeting the following conditions:
  - During the period equal to 4s for UE supporting power class1 and 3s for UE supporting power class 2/3/4
    before UE receives the last activation command for PDCCH TCL PDSCH TCI (when applicable) and semi-
    persistent CSI-RS for CQI reporting (when applicable):
    - the UE has sent a valid L3-RSRP measurement report with SSB index
    - SCell activation command is received after L3-RSRP reporting and no later than the time when UE
      receives MAC-CE command for TCI activation
    - During the period from L3-RSRP reporting to the valid CQL reporting, the reported SSBs with indexes remain
      detectable according to the cell identification conditions specified in clauses 9.2 and 9.3. and the TCI state is
      selected based on one of the latest reported SSB indexes.
Otherwise, the SCell in FR2 band is unknown. The requirement for unknown SCell applies provided that the
activation commands for PDCCH TCL PDSCH TCI (when applicable), semi-persistent CSI-RS for CQI reporting
(when applicable); and configuration message for TCI of periodic CSI-RS for CQI reporting (when applicable) are
based on the latest valid L1-RSRP reporting.

TABLE 35-continued

If the UE has been provided with higher layer in TS 38.331 [2] signaling of smtc2 prior to the activation command.
$T_{SMTC\_Scell}$ follows smtc1 or smtc2 according to the physical cell ID of the target cell being activated. $T_{SMTC\_MAX}$
follows smtc1 or smtc2 according to the physical cell IDs of the target cells being activated and the serving cells.
In addition to CSI reporting defined above, UE shall also apply other actions related to the activation command
specified in TS 38.331 [2] for a SCell at the first opportunities for the corresponding actions once the SCell is
activated.
The interruption on PSCell or any activated SCell in SCG for EN-DC mode specified in clause 8.2 shall not occur before $$\text{slot } n + 1 + \frac{T_{HARQ}}{NR \text{ slot length}} \text{ and not occur after}$$

$$\text{slot } n + 1 + \frac{T_{HARQ} + 3 \text{ ms} + T_{SMTC\_MAX} + T_{SMTC\_duration}}{NR \text{ slot length}}.$$

The interruption on PCell or any activated SCell in MCG for NR standalone mode specified in clause 8.2 shall not
occur before $$\text{slot } n + 1 + \frac{T_{HARQ}}{NR \text{ slot length}} \text{ and not occur after}$$

$$\text{slot } n + 1 + \frac{T_{HARQ} + 3 \text{ ms} + T_{SMTC\_MAX} + T_{SMTC\_duration}}{NR \text{ slot length}}.$$

Starting from the slot specified in clause 4.3 of TS 38.213 [3] (timing for secondary Cell activation/deactivation) and
until the UE bas completed the SCell activation, the UE shall report out of range if the UE has available uplink
resources to report CQI for the SCell.
Starting from the slot specified in clause 4.3 of TS 38.213 [3] (timing for secondary Cell activation/deactivation) and
until the UE has completed a first L1-RSRP measurement, the UE shall report lowest valid L1 SS-RSRP range if the
UE has available uplink resources to report L1-RSRP for the SCell.

As described above, the UE that has received an activation command for a secondary cell should perform a series of operations including channel measurement and reporting in order to activate the corresponding secondary cell, and accordingly, an activation delay time for the secondary cell occurs. In this case, the activation delay time for the secondary cell may be greatly influenced by the delay time according to the following operation.

Delay time #1: Delay time required for HARQ-ACK feedback for a PDSCH to which an MAC CE indicating the activation command for the secondary cell is delivered Delay time #2: Delay time required to measure a channel state for the secondary cell Delay time #3: Delay time required to report a channel state for the secondary cell The disclosure proposes various methods for reducing an activation delay time for the secondary cell.

Hereinafter, higher layer signaling may be signaling corresponding to at least one of the following signaling or one or more combination thereof.

Master information block (MIB)

System information block (SIB) or SIB X (X=1, 2, . . . )

Radio resource control (RRC)

Medium access control (MAC) control element (CE)

UE capability reporting

UE assistance information or message

Further, L1 signaling may be signaling corresponding to at least one of the following physical layer channels or signaling methods or one or more combination thereof.

Physical downlink control channel (PDCCH)

Downlink control information (DCI)

UE-specific DCI

Group common DCI

Common DCI

Scheduling DCI (e.g., DCI used for the purpose of scheduling downlink or uplink data)

Non-scheduling DCI (e.g., DCI that is not for the purpose of scheduling downlink or uplink data)

Physical uplink control channel (PUCCH)

Uplink control information (UCI)

Hereinafter, the definition of each mathematical operator is as follows.

floor(X): A function that outputs the largest number among integers smaller than X ceil(X): A function that outputs the smallest number among integers greater than X A mod B: A function (modulo operator) that outputs the remainder when A is divided by B max(X, Y): A function that outputs the larger number between X and Y min(X, Y): A function that outputs the smaller number between X and Y Embodiment 1

Upon receiving an activation command for a secondary cell, in order to activate the corresponding secondary cell, the UE should perform a series of operations including measurement and reporting of a channel, and accordingly, an activation delay time for the secondary cell occurs. In this case, the activation delay time for the secondary cell may be greatly influenced by a delay time according to the following operation.

Delay time #1: Delay time required for HARQ-ACK feedback for a PDSCH to which an MAC CE indicating the activation command for the secondary cell is delivered Delay time #2: Delay time required to measure a channel state for the secondary cell Delay time #3: Delay time required to report a channel state for the secondary cell The delay time #1 corresponds to a delay time that may occur in feeding back an HARQ-ACK for a PDSCH received by the UE as MAC CE signaling is used with an activation command for the secondary cell. Accordingly, the delay time #1 may be effectively reduced in the case that an activation command for the secondary cell is indicated using L1 signaling, for example, DCI that does not require HARQ-ACK feedback.

The delay time #2 may greatly increase in the case that the UE measures a channel state based on a periodic/semi-permanent reference signal (e.g., synchronization signal block, periodic CSI-RS, or semi-permanent CSI-RS). In the case of a periodic/semi-permanent reference signal, because the corresponding reference signal is transmitted at a preset time point, the UE should stand by until a time point at which the corresponding reference signal is actually transmitted; thus, the delay time may greatly increase.

The delay time #3 may greatly increase in the case that the UE reports the channel state based on periodic/semi-permanent channel state reporting (e.g., periodic CSI report, semi-permanent CSI report). In the case of periodic/semi-permanent channel state reporting, the UE may report the channel state to the base station through an uplink channel (e.g., physical uplink control channel (PUCCH)) transmitted at a preset time point, and accordingly, the UE should stand by until a time point at which an uplink channel for reporting the corresponding channel state exists; thus, the delay time may greatly increase.

Accordingly, in order to reduce the activation delay time for the secondary cell, the following methods may be considered.

Indicate an activation command for the secondary cell using DCI

Channel state measurement using an aperiodic reference signal (e.g., channel state measurement using an aperiodic CSI-RS)

Aperiodic channel state reporting (e.g., aperiodic CSI reporting)

In an embodiment of the disclosure, the UE may receive an activation command for the secondary cell through an MAC CE, and receive an indicator requesting an aperiodic channel state report through the MAC CE. In this case, the MAC CE for the activation command for the secondary cell and the MAC CE requesting the aperiodic channel state report may be received by the UE at the same time point (or the same slot) or at different time points (or different slots). For example, the MAC CE requesting an aperiodic channel state report may be received by the UE after a time point that receives the MAC CE for the activation command for the secondary cell.

In an embodiment of the disclosure, the UE may receive an activation command for the secondary cell through an MAC CE, and receive an indicator requesting an aperiodic channel state report through DCI. In this case, the MAC CE for the activation command for the secondary cell and DCI requesting the aperiodic channel state report may be received by the UE at the same time point (or the same slot) or at different time points (or different slots). For example, the DCI requesting the aperiodic channel state report may be received by the UE after a time point that receives the MAC CE for the activation command for the secondary cell.

In an embodiment of the disclosure, the UE may receive an activation command for the secondary cell through DCI, and receive an indicator requesting an aperiodic channel state report through DCI. In this case, the DCI for the activation command for the secondary cell and the DCI requesting the aperiodic channel state report may be received by the UE at the same time point (or the same slot) or at different time points (or different slots). For example, the DCI requesting an aperiodic channel state report may be received by the UE after a time point that receives DCI for the activation command for the secondary cell.

Figure 18:
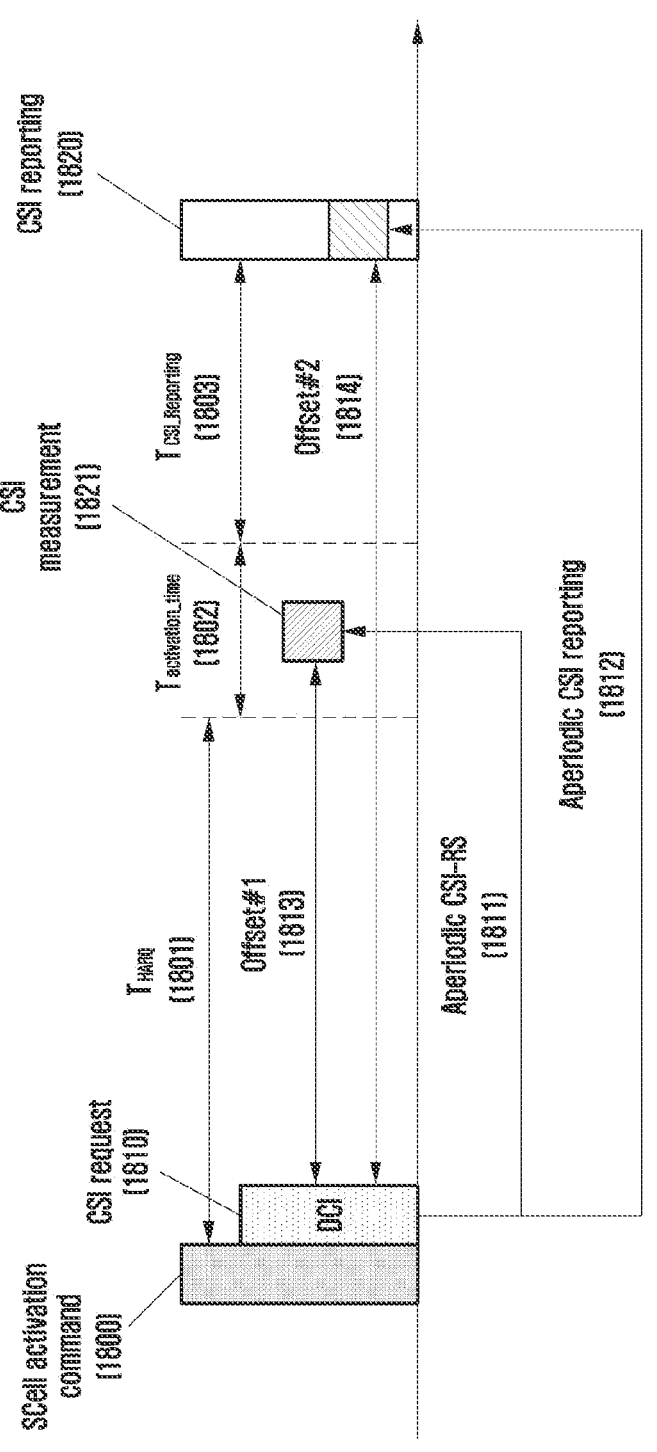
FIG. 18 is a diagram illustrating an example of a method of activating a secondary cell in a wireless communication system according to various embodiments of the disclosure.

FIG. 18 is a diagram illustrating an example of a method of activating a secondary cell in a wireless communication system according to various embodiments of the disclosure.

Specifically, FIG. 18 illustrates a specific operation of a UE and a corresponding delay time for an example in which an activation command for a secondary cell is indicated to the UE through a MAC CE and in which a CSI request indicator is indicated to the UE through DCI for activation of the secondary cell. The UE may receive an activation command 1800 for the secondary cell through an MAC CE at a specific time point and additionally receive a CSI request indicator 1810 requesting CSI measurement and reporting for a cell indicated for activation through DCI at the same time point or another time point. The UE may transmit an HARQ-ACK for the MAC CE at a specific time point, and accordingly, a delay time THARQ 1801 according to HARQ-ACK feedback may occur. The UE may perform CSI measurement 1821 and CSI reporting 1820 operations based on contents of the CSI request indicator 1810 received through DCI. In this case, an aperiodic reference signal 1811 indicated by the CSI request indicator 1810 may be transmitted at a time point separated by a specific offset #1, 1813 from a time point that receives the DCI, and an aperiodic CSI reporting operation 1812 of the UE may be performed at a time point separated by a specific offset #2, 1814 from a time point that receives the DCI. In this case, a time point at which the aperiodic reference signal 1811 is transmitted may correspond to a time point later than a time point at which the UE feeds back the HARQ-ACK for the MAC CE, and in consideration of this, a value of the offset #1, 1813 may be appropriately indicated to the UE or the UE may regard it as a specific value. Alternatively, a time point at which the aperiodic reference signal 1811 is transmitted may correspond to a time point prior to a time point at which the UE feeds back a HARQ-ACK for the MAC CE, and in consideration of this, a value of the offset #1, 1813 may be appropriately indicated to the UE or the UE may regard it as a specific value. The UE may perform a series of operations for activating the secondary cell, and accordingly, a specific delay time $T_{activation\_time}$ 1802 may be consumed. Thereafter, the UE may perform a CSI reporting operation for the activated secondary cell, and accordingly, a specific delay time $T_{CSI\_Reporting}$ 1803 may occur.

Figure 19:
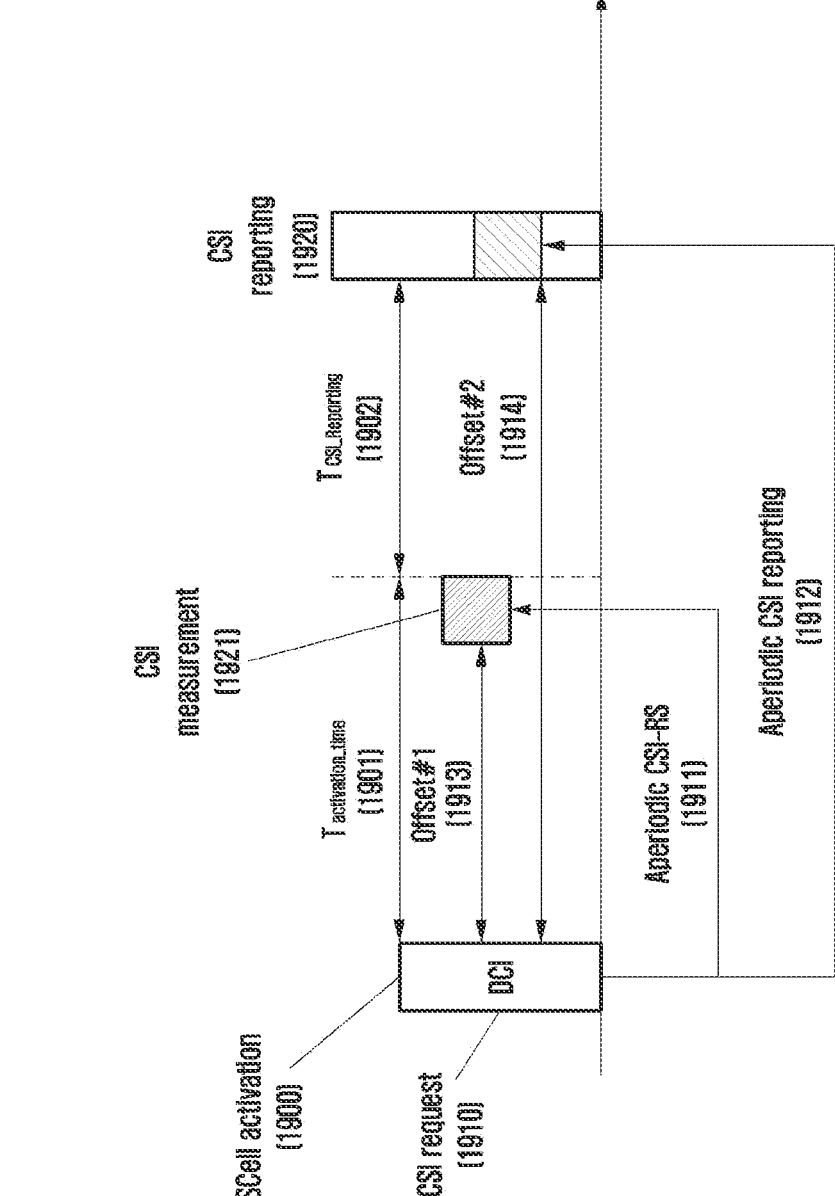
FIG. 19 is a diagram illustrating an example of a method of activating a secondary cell in a wireless communication system according to various embodiments of the disclosure.

FIG. 19 is a diagram illustrating an example of a method of activating a secondary cell in a wireless communication system according to various embodiments of the disclosure.

Specifically, FIG. 19 illustrates a specific operation of a UE and a corresponding delay time for an example in which an activation command for a secondary cell is indicated to the UE through DCI and in which a CSI request indicator is indicated to the UE through DCI for activation of the secondary cell. The UE may receive an activation command 1900 for the secondary cell through DCI at a specific time point and additionally receive a CSI request indicator 1910 requesting CSI measurement and reporting for a cell indicated for activation through DCI at the same time point or another time point. An activation command 1900 indicator for the secondary cell and the CSI request indicator 1910 may be transmitted in different DCI formats or in the same DCI format. In this case, because the activation command 1900 for the secondary cell is transmitted through the DCI, the UE does not have to transmit an HARQ-ACK for the activation command for the secondary cell; thus, a delay time may be reduced. The UE may perform CSI measurement 1921 and CSI reporting 1920 operations based on contents of the CSI request indicator 1910 received through DCI. In this case, an aperiodic reference signal 1911 indicated by the CSI request indicator 1910 may be transmitted at a time point separated by a specific offset #1, 1913 from a time point that receives the DCI, and an aperiodic CSI reporting operation 1912 of the UE may be performed at a time point separated by a specific offset #2, 1914 from a time point that receives the DCI. The offset #1, 1911 and the offset #2, 1912 may be determined based on the content indicated by the CSI request indicator 1910. The UE may perform a series of operations for activating the secondary cell, and accordingly, a specific delay time $T_{activation\_time}$ 1901 may occur. Thereafter, the UE may perform a CSI reporting operation for the activated secondary cell, and accordingly, a specific delay time $T_{CSI\_Reporting}$ 1902 may occur.

Embodiment 2

Each field value (or equally, code point) of the CSI request indicator may be associated with a CSI trigger state, and each CSI trigger state may be associated with a CSI report setting and CSI resource setting. The CSI report setting may be set to be associated with a specific cell through a cell index (ServCellIndex) parameter, and the CSI resource setting may be associated with a specific bandwidth part through a bandwidth part index (bwp-id) parameter. After acquiring DCI, the UE may generate CSI by measuring the CSI resource transmitted in the bandwidth part corresponding to the bandwidth part index in the CSI resource setting in a cell corresponding to a cell index in the CSI report setting indicated by the CSI request indicator in the DCI. The UE may report the generated CSI to the base station using an uplink channel (e.g., uplink data channel, physical uplink share channel (PUSCH)) scheduled by the DCI.

In this case, one CSI trigger state may be associated with one or a plurality of CSI report settings and CSI resource settings. Further, the UE may perform CSI measurement and reporting operations for an activated cell and an activated bandwidth part within the activated cell. Similarly, the UE may not perform CSI measurement and reporting operations for a deactivated cell or a deactivated bandwidth part in an activated cell.

Table 36 represents an example of a CSI request indicator. In Table 36, for example, if '01' is indicated as a CSI request field, this may be interpreted as indicating a CSI trigger state #1. In this case, one CSI trigger state may be associated with one or a plurality of CSI report settings and CSI resource settings. In the example of Table 36, the CSI trigger state #1 is associated with {CSI report setting #1, CSI resource setting #1} and {CSI report setting #2, CSI resource setting #2}, and the CSI report setting #1 and the CSI report setting #2 are associated with a cell having a cell index of 1 (referred to as a cell #1), and the CSI resource setting #1 is associated with a bandwidth part (referred to as a bandwidth part #1) having a bandwidth part index of 1, and the CSI resource setting #2 is associated with a bandwidth part (referred to as a bandwidth part #2) having a bandwidth part index of 2.

In this case, the UE may perform CSI reporting on the activated cell and activated bandwidth part.

For example, when the UE receives '01' as the CSI request indicator and is indicated to the CSI trigger state #1, the cell #1 set to the UE is in an activated state, and the bandwidth part #1 in the cell #1 is activated, the UE may perform CSI measurement and reporting operations based on CSI settings, that is, {CSI report setting #1, CSI resource setting #1} corresponding to the currently activated bandwidth part #1 among {CSI report setting #1, CSI resource setting #1} and {CSI report setting #2, CSI resource setting #2} associated with the CSI trigger state #1, and omit a CSI measurement and reporting operation for CSI settings, that is, {CSI report setting #2, CSI resource setting #2} corresponding to a bandwidth part #2 that is not currently activated.

As another example, in the case that the UE receives '10' as the CSI request indicator and is indicated to the CSI trigger state #2 and that the cell #2 set to the UE and the bandwidth part #1 in the cell #2 are in an activated state and that a cell #3 is in a deactivated state, the UE may perform CSI measurement and reporting operations based on CSI settings, that is, {CSI report setting #3, CSI resource setting #3} corresponding to the bandwidth part #1 of the currently activated cell #2 among {CSI report setting #3, CSI resource setting #3} and {CSI report setting #4, CSI resource setting #4} associated with the CSI trigger state #2 and omit CSI measurement and reporting operations for CSI settings, that is, {CSI report setting #4, CSI resource setting #4} corresponding to the cell #3 that is not currently activated.

As in the example of Table 36, one CSI request indicator value may be associated with a plurality of CSI report settings and CSI resource settings. In this case, cell indexes in a plurality of CSI report settings associated with one CSI request indicator value may be the same as or different from each other. Further, bandwidth part indexes in a plurality of CSI resource settings associated with one CSI request indicator value may be the same as or different from each other.

TABLE 36

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 (ServCellIndex = 1) | CSI resource#1, (bwp-id = 1) |
| | | CSI report#2 (ServCellIndex = 1) | CSI resource#2 (bwp-id = 2) |
| 10 | CSI trigger state#2 | GSI report#3 (ServCellIndex = 2) | CSI resource#3 (bwp-id = 1) |
| | | CSI report#4 (ServCellIndex = 3) | CSI resource#4 (bwp-id = 1) |
| 11 | CSI trigger state#3 | CSI report#5 (ServCellIndex = 4) | CSI resource#5 (bwp-id = 1) |
| | | CSI report#6 (ServCallIndex = 5) | CSI resource#6 (bwp-id = 2) |

In an embodiment of the disclosure, for activation of a secondary cell, channel state measurement and reporting using an aperiodic reference signal may be considered.

In an embodiment of the disclosure, the following reference signals may be, for example, considered as aperiodic reference signals.
Aperiodic CSI-RS
Aperiodic TRS (or CSI-RS resource set for the same tracking use, that is, in the case that the CSI-RS resource set is set to trs-Info)

In an embodiment of the disclosure, for the purpose of activating a secondary cell, the UE may perform channel state measurement and reporting using an aperiodic TRS. The UE may not perform a channel state report on a channel state measured by an aperiodic TRS for an activated cell. More specifically, the UE may expect that an upper layer parameter report quantity (reportQuantity) is always set to 'none' for the channel measurement report setting (CSI- ReportConfig) associated with the aperiodic TRS resource. In the case that the report quantity is set to none, the UE may not perform channel state reporting on a reference signal associated with the corresponding channel state report setting. In the current standard, it is described in the following sentence.

[TS 38.214 Phrase]

A UE does not expect to be configured with a CSI-ReportConfig with the higher layer parameter reportQuantity set to other than 'none' for aperiodic NZP CSI-RS resource set configured with trs-Info.

In order to reduce an activation delay time of the secondary cell considered in the disclosure, a channel state report for the aperiodic TRS may be required in a situation in which an aperiodic TRS is used when the secondary cell is activated. Hereinafter, various embodiments of measuring a channel state report for an aperiodic TRS are proposed.

Embodiment 2-1

According to an embodiment of the disclosure, the UE may receive an activation command for a secondary cell (e.g., cell #2) through an MAC CE, and receive a CSI request indicator for the cell #2 through DCI.

In an embodiment of the disclosure, in the case that the UE receives an activation command through the MAC CE for a cell that is not currently activated and receives a CSI request indicator for the corresponding cell, the UE may perform CSI measurement and reporting operations triggered by the corresponding CSI request indicator. For example, when the UE receives an activation command for the cell #2 that is not currently activated through the MAC CE and receives a CSI request indicator triggering CSI measurement and reporting for the cell #2 through DCI, the UE may perform CSI measurement and reporting operations for the cell #2.

In this case, because there is always at least one activated bandwidth part during CSI measurement and reporting operations for the currently activated cell, it is possible to perform CSI measurement and reporting operations in the currently activated bandwidth part, but because a currently activated bandwidth part does not exist in a cell that is not activated, it is necessary to define a bandwidth part that performs CSI measurement and reporting.

Accordingly, the UE may perform CSI measurement and reporting operations on the bandwidth part set to a "first active bandwidth part (firstActiveDownlinkBWP-Id)" among bandwidth parts set to a cell #2 indicated by the activation command. The "first active downlink bandwidth part" corresponds to a bandwidth part initially activated when a random cell is first activated, which may be preset through higher layer signaling (e.g., RRC signaling). For example, when two bandwidth parts, a bandwidth part #1 and a bandwidth part #2 are set to a specific cell #X, and the bandwidth part #1 is set to a first active bandwidth part, in the case that the corresponding cell #X is activated, the UE may assume that the bandwidth part #1 is initially activated and perform subsequent transmission and reception operations in the bandwidth part #1. That is, by performing CSI measurement and reporting operations for an initially activated bandwidth part after the currently deactivated cell is activated, the base station and the UE may more effectively perform transmission and reception operations in an initially activated bandwidth part after the corresponding cell is activated.

Accordingly, the operation of Table 37 may be defined.

TABLE 37

When a UE is triggered with a CSI report for a DL BWP that is non-active
when expecting to receive the most recent occasion, no later than the CSI reference resource, of the associated NZP CSI-RS.
- if the non-active DL BWP corresponds to the DL BWP provided by firstActiveDownlinkBWP-I for the SCell being activated, the UE reports the CSI.
- otherwise, the UE is not expected to report the CSI for the non-active DL BWP and the CSI report associated with that BWP is omitted.

In an embodiment of the disclosure, in the case that the LIE receives an activation command through an MAC CE for a cell that is not currently activated and receives a CSI request indicator for the corresponding cell, the corresponding CSI request indicator may indicate measurement and reporting on the aperiodic TRS. More specifically, a CSI trigger state indicated by the CSI request indicator may be associated with CSI resource setting including an aperiodic TRS. In this case, even if a "reportQuantity" setting of the CSI report setting associated with the indicated aperiodic TRS resource is set to "none", the UE may assume a "report quantity" setting of the corresponding CSI report setting to a specific value and perform a CSI reporting operation. For example, the UE may assume the "report quantity" of the CSI report setting for the aperiodic TRS to at least one or one or more parameters of the following values.

cri-RSRP
    ssb-Index-RSRP
    cri-SINR-r16
    ssb-Index-SINR-r16
    trs-RSRP (newly defined reportQuantity for CSI reporting for TRS)
    trs-SINR (newly defined reportQuantity for CSI reporting for TRS)

In the report quantity setting, reference signal received power (RSRP) may mean a value obtained by measuring received signal intensity for a reference signal, and a signal-to-noise-plus-interference ratio (SINR) may mean a value obtained by measuring a signal-to-noise and interference ratio value measured with a reference signal.

In an embodiment of the disclosure, in the case that the UE receives an activation command through an MAC CE for a cell that is not currently activated and receives a CSI request indicator for the corresponding cell, the corresponding CSI request indicator may indicate measurement and reporting on the aperiodic TRS. More specifically, a CSI trigger state indicated by the CSI request indicator may be associated with CSI resource setting including an aperiodic TRS. In this case, a "reportQuantity" setting of the CSI report setting associated with the indicated aperiodic TRS resource may be set to a specific value. For example, the UE may set the "report quantity" of the CSI report setting for the aperiodic TRS to at least one or one or more parameters of the following values.

cri-RSRP
    ssb-Index-RSRP
    cri-SINR-r16
    ssb-Index-SINR-r16
    trs-RSRP (newly defined reportQuantity for CSI reporting for TRS)

trs-SINR (newly defined reportQuantity for CSI reporting for TRS)

In this case, a "report quantity" setting for the above-described aperiodic TRS may be set within the CSI report setting or may be set independently of the CSI report setting. For example, the "report quantity" setting for the above-described aperiodic TRS may be set as part of upper layer parameters defined for the purpose of reducing an activation delay time for the secondary cell.

Accordingly, in the case that the UE receives an activation command through an MAC CE for a cell that is not currently activated and receives a CSI request indicator for the cell and that the corresponding CSI request indicator indicates measurement and reporting for aperiodic TRS, the UE may perform a CSI reporting operation for the corresponding aperiodic TRS. In this case, when the UE receives a CSI request indicator requesting measurement and reporting on the aperiodic TRS for the currently activated cell, even if a "report quantity" parameter of the CSI report setting associated with the aperiodic TRS resource setting is set to a specific value, the UE may ignore the corresponding setting and may not perform a CSI reporting operation.

In an embodiment of the disclosure, the UE may apply the content of the CSI request indicator indicating CSI measurement and reporting for activation of a secondary cell to the secondary cell indicated by the most recently received secondary cell activation command. Specifically, in the case that the UE receives an activation command for a cell #2 in a slot n, an activation command for a cell #3 in a slot n+1, and a CSI request indicator in a slot n+2, the UE may perform CSI measurement and reporting operations on the cell #3 indicated by the activation command indicator for the secondary cell most recently received based on the time point that receives the CSI request indicator.

Embodiment 2-2

According to an embodiment of the disclosure, the UE may receive an activation command for a secondary cell (e.g., cell #2) through DCI and receive a CSI request indicator for the cell #2 through DCI.

According to an embodiment of the disclosure, the UE may receive an activation command for a secondary cell and a CSI request indicator through one DCI format. That is, a field indicating an activation command for a secondary cell and a CSI request indicator field may exist in one DCI format. In this case, the field indicating the activation command for the secondary cell may be composed of an N-bit bitmap, and each bit of the N-bit bitmap may be mapped to a cell group composed of a plurality of secondary cells or one secondary cell. The UE may apply CSI measurement and reporting operations indicated by the CSI request indicator to the cell indicated by the field indicating the secondary cell activation command.

According to an embodiment of the disclosure, the UE may receive an activation command for a secondary cell and a CSI request indicator through different DCI formats, respectively. That is, a field indicating an activation command for a secondary cell may be included in one DCI format, and a CSI request indicator field may exist in another DCI format. In this case, the field indicating the activation command for the secondary cell may be composed of an N-bit bitmap, and each bit of the N-bit bitmap may be mapped to a cell group composed of a plurality of secondary cells or one secondary cell. For a cell indicated in a DCI format including a field indicating a secondary cell activation command, the UE may apply CSI measurement and reporting operations indicated by a CSI request indicator transmitted in a different DCI format. A DCI format including the activation command indicator for the secondary cell and a DCI format including the CSI request indicator may be received by the UE at the same time point or at different points. For example, the UE may first receive a DCI format indicating an activation command for the secondary cell and receive a DCI format including a CSI request indicator indicating CSI measurement and reporting for secondary cell activation at the same time point or later.

In an embodiment of the disclosure, in the case that the UE receives an activation command through DCI for a cell that is not currently activated and receives a CSI request indicator for the corresponding cell, the UE may perform CSI measurement and reporting operations triggered by the corresponding CSI request indicator. For example, when the UE receives an activation command for a cell #2 that is not currently activated through DCI and receives a CSI request indicator triggering CSI measurement and reporting for the cell #2 through DCI, the UE may perform CSI measurement and reporting operations for the cell #2.

In this case, because there is always at least one activated bandwidth part during CSI measurement and reporting operations for the currently activated cell, it is possible to perform CSI measurement and reporting operations in the currently activated bandwidth part, but because a currently activated bandwidth part does not exist in a cell that is not activated, it is necessary to define a bandwidth part that performs CSI measurement and reporting.

Accordingly, the UE may perform CSI measurement and reporting operations on a bandwidth part set to a "first active bandwidth part (firstActiveDownlinkBWP-Id)" among bandwidth parts set to a cell #2 indicated by the activation command. The "first active downlink bandwidth part" corresponds to a bandwidth part initially activated when a random cell is first activated, which may be preset through higher layer signaling (e.g., RRC signaling). For example, when two bandwidth parts, a bandwidth part #1 and a bandwidth part #2 are set to a specific cell #X, and the bandwidth part #1 is set as a first active bandwidth part, in the case that the corresponding cell #X is activated, the UE may assume that the bandwidth part #1 is initially activated and perform subsequent transmission and reception operations in the bandwidth part #1. That is, by performing CSI measurement and reporting operations for an initially activated bandwidth part after the currently deactivated cell is activated, the base station and the UE may more effectively perform transmission and reception operations in an initially activated bandwidth part after the corresponding cell is activated.

Accordingly, the operation of Table 38 may be defined.

TABLE 38

When a UE is triggered with a CSI report for a DL BWP that is non-active
when expecting to receive the most recent occasion, no later than the CSI reference resource, of the associated NZP CSI-RS.
- if the non-active DL BWP corresponds to the DL BWP provided by firstActiveDownlinkBWP-I for the SCell being activated, the UE reports the CSI.
- otherwise, the UE is not expected to report the CSI for the non-active DL BWP and the CSI report associated with that BWP is omitted.

In an embodiment of the disclosure, in the case that the UE receives an activation command through DCI for a cell that is not currently activated and receives a CSI request indicator for the corresponding cell, the corresponding CSI request indicator may indicate measurement and reporting on an aperiodic TRS. More specifically, a CSI trigger state indicated by the CSI request indicator may be associated with a CSI resource setting including an aperiodic TRS. In this case, even if a "reportQuantity" setting of the CSI report setting associated with the indicated aperiodic TRS resource is set to "none", the UE may assume the "report quantity" setting of the corresponding CSI report setting to a specific value and perform a CSI reporting operation. For example, the UE may assume the "report quantity" of the CSI report setting for the aperiodic TRS to at least one or one or more parameters among the following values.

cri-RSRP ssb-Index-RSRP cri-SINR-r16 ssb-Index-SINR-r16 trs-RSRP (newly defined reportQuantity for CSI reporting for TRS)

trs-SINR (newly defined reportQuantity for CSI reporting for TRS)

In the report quantity setting, reference signal received power (RSRP) may mean a value obtained by measuring received signal intensity for a reference signal, and a signal-to-noise-plus-interference ratio (SINR) may mean a value obtained by measuring a signal-to-noise and interference ratio value measured with a reference signal.

In an embodiment of the disclosure, in the case that the UE receives an activation command through DCI for a cell that is not currently activated and receives a CSI request indicator for the corresponding cell, the corresponding CSI request indicator may indicate measurement and reporting on an aperiodic TRS. More specifically, a CSI trigger state indicated by the CSI request indicator may be associated with a CSI resource setting including an aperiodic TRS. In this case, a "reportQuantity" setting of a CSI report setting associated with the indicated aperiodic TRS resource may be set to a specific value. For example, the UE may be set to at least one or one or more parameters among the following values for the "report quantity" of the CSI report setting for the aperiodic TRS.

cri-RSRP ssb-Index-RSRP cri-SINR-r16 ssb-Index-SINR-r16 trs-RSRP (newly defined reportQuantity for CSI reporting for TRS)

trs-SINR (newly defined reportQuantity for CSI reporting for TRS)

In this case, the "report quantity" setting for the above-described aperiodic TRS may be set within the CSI report setting or may be set independently of the CSI report setting. For example, the "report quantity" setting for the above-described aperiodic TRS may be set as part of upper layer parameters defined for the purpose of reducing an activation delay time for the secondary cell.

Accordingly, in the case that the UE receives an activation command through DCI for a cell that is not currently activated, receives a CSI request indicator for the corresponding cell and that the corresponding CSI request indicator indicates measurement and reporting for the aperiodic TRS, the UE may perform a CSI reporting operation for the corresponding aperiodic TRS. In this case, when the UE receives a CSI request indicator requesting measurement and reporting on the aperiodic TRS for the currently activated cell, even if a "report quantity" parameter of the CSI report setting associated with the aperiodic TRS resource setting is set to a specific value, the UE may ignore the corresponding setting and may not perform the CSI reporting operation.

In an embodiment of the disclosure, the UE may apply the content of the CSI request indicator indicating CSI measurement and reporting for activation of a secondary cell to the secondary cell indicated by the most recently received secondary cell activation command. Specifically, in the case that the UE receives an activation command for a cell #2 in a slot n, receives an activation command for a cell #3 in a slot n+1, and receives a CSI request indicator in a slot n+2, the UE may perform CSI measurement and reporting operations on the cell #3 indicated by the activation command indicator for the secondary cell most recently received based on a time point that receives the CSI request indicator.

Whether the above-described embodiments are implemented may be set by the base station to the UE. The UE may receive setting information on whether the above-described embodiments are implemented from the base station, and differently control operations for each embodiment based on the corresponding setting information.

Whether the above-described embodiments may be implemented may be notified from the UE to the base station based on the UE capability report. The base station may acquire information on whether functions of the above-described embodiments are supported through a capability report from the UE, and appropriately control the operation based on the above-described embodiments to the corresponding UE based on this.

The above-described embodiments may be operated in combination with each other.

Methods according to the embodiments described in the claims or specifications of the disclosure may be implemented in the form of hardware, software, or a combination of hardware and software.

In the case of being implemented in software, a computer readable storage medium storing one or more programs (software modules) may be provided. One or more programs stored in the computer readable storage medium are configured for execution by one or more processors in an electronic device. One or more programs include instructions for causing an electronic device to execute methods according to embodiments described in claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or magnetic cassettes. Alternatively, such programs may be stored in a memory composed of a combination of some or all thereof. Further, each constitution memory may be included in the plural.

Further, the program may be stored in an attachable storage device that may access through a communication network such as Internet, Intranet, a local area network (LAN), a wide area network (WAN), or a storage area network (SAN), or a communication network composed of a combination thereof. Such a storage device may access a device implementing an embodiment of the disclosure through an external port. Further, a separate storage device on the communication network may access the device implementing the embodiment of the disclosure.

In the specific embodiments of the disclosure described above, components included in the disclosure are expressed in the singular or the plural according to presented specific embodiments. However, the singular or plural expression is appropriately selected for presented situation for convenience of description, and the disclosure is not limited to the singular or plural components, and even if the component is expressed in the plural, the component may be composed of the singular, or even if the component is expressed in the singular, the component may be composed of the plural.

Although specific embodiments have been described in the detailed description of the disclosure, various modifications are possible without departing from the scope of the disclosure. Therefore, the scope of the disclosure should not be limited to the described embodiments and should be defined by the claims described below as well as equivalents to the claims.

The invention claimed is:

1. A method performed by a terminal of a wireless communication system, the method comprising:

receiving, from a base station, a first message including first information for activating a secondary cell (SCell);

receiving, from the base station, a second message including downlink control information (DCI) including second information requesting a channel state report for the SCell to be activated; and measuring a channel state for the SCell based on the second information and transmitting, to the base station, the channel state report including a result of the measured channel state, wherein the second information comprises a resource setting for an aperiodic tracking reference signal (TRS), and wherein the terminal is configured to measure the channel state of the SCell to be activated based on the aperiodic TRS.

2. The method of claim 1, wherein the first message comprises a medium access control (MAC) control element (CE) or DCI.

3. The method of claim 1, wherein the first message and the second message are received at the same time.

4. A method performed by a base station of a wireless communication system, the method comprising:

transmitting, to a terminal, a first message including first information for activating a secondary cell (SCell);

transmitting, to the terminal, a second message including downlink control information (DCI) including second information requesting a channel state report for the SCell to be activated; and receiving, from the terminal, the channel state report including a result of a measured channel state for the SCell based on the second information, wherein the second information comprises a resource setting for an aperiodic tracking reference signal (TRS), and wherein the channel state of the SCell to be activated is measured based on the aperiodic TRS.

5. The method of claim 4, wherein the first message comprises a medium access control (MAC) control element (CE) or DCI.

6. The method of claim 4, wherein the first message and the second message are transmitted at the same time.

7. A terminal of a wireless communication system, the terminal comprising:

a transceiver; and a controller configured to:

receive, from a base station through the transceiver, a first message including first information for activating a secondary cell (SCell), receive, from the base station through the transceiver, a second message including downlink control information (DCI) including second information requesting a channel state report for the SCell to be activated, measure a channel state of the SCell based on the second information, and transmit, to the base station through the transceiver, the channel state report including a result of the measured channel state, wherein the second information comprises a resource setting for an aperiodic tracking reference signal (TRS), and wherein the controller is configured to measure the channel state of the SCell to be activated based on the aperiodic TRS.

8. The terminal of claim 7, wherein the first message comprises a medium access control (MAC) control element (CE) or DCI.

9. The terminal of claim 7, wherein the first message and the second message are received at the same time.

10. A base station of a wireless communication system, the base station comprising:

a transceiver; and a controller configured to:

transmit, to a terminal through the transceiver, a first message including first information activating a secondary cell (SCell), transmit, to the terminal through the transceiver, a second message including downlink control information (DCI) including second information requesting a channel state report for the SCell to be activated, and receive, from the terminal through the transceiver, the channel state report including a result of a measured channel state for the SCell based on the second information, wherein the second information comprises a resource setting for an aperiodic tracking reference signal (TRS), and wherein the channel state of the SCell to be activated is measured based on the aperiodic TRS.

11. The base station of claim 10, wherein the first message comprises a medium access control (MAC) control element (CE) or DCI.

12. The base station of claim 10, wherein the first message and the second message are transmitted at the same time.

* * * * *